(12) United States Patent
Anderson et al.

(10) Patent No.: US 12,305,888 B2
(45) Date of Patent: May 20, 2025

(54) CONCENTRATED SOLAR ENERGY COLLECTION, THERMAL STORAGE, AND POWER GENERATION SYSTEMS AND METHODS WITH OPTIONAL SUPPLEMENTAL FUEL PRODUCTION

(71) Applicant: 247Solar Inc., Great Falls, VA (US)

(72) Inventors: Bruce N. Anderson, Great Falls, VA (US); William Dean Treece, La Mesa, CA (US); James S. Nash, North Hampton, NH (US); Douglas A. Hamrin, Laguna Beach, CA (US)

(73) Assignee: 247Solar Inc., Great Falls, VA (US)

( * ) Notice: Subject to any disclaimer, the term of this patent is extended or adjusted under 35 U.S.C. 154(b) by 0 days.

(21) Appl. No.: 17/958,192

(22) Filed: Sep. 30, 2022

(65) Prior Publication Data

US 2023/0250997 A1 Aug. 10, 2023

Related U.S. Application Data

(63) Continuation of application No. PCT/US2021/025473, filed on Apr. 1, 2021.
(Continued)

(51) Int. Cl.
*F24S 20/20* (2018.01)
*F01K 7/16* (2006.01)
(Continued)

(52) U.S. Cl.
CPC ............... *F24S 20/20* (2018.05); *F01K 7/16* (2013.01); *F02C 1/05* (2013.01); *F03G 6/0055* (2021.08);
(Continued)

(58) Field of Classification Search
CPC .. F24S 20/20; F24S 20/40; F24S 60/00; F24S 70/60; F01K 7/16; Y02E 10/46;
(Continued)

(56) References Cited

U.S. PATENT DOCUMENTS 246,626 A 9/1881 Morse
608,755 A 8/1898 Cottle et al.
(Continued)

FOREIGN PATENT DOCUMENTS

AT 412911 B 8/2005
CN 1161741 A 10/1997
(Continued)

OTHER PUBLICATIONS

Invitation to Pay Additional Fees for International Application No. PCT/US2021/025473 dated Aug. 6, 2021.
(Continued)

*Primary Examiner* — Loren C Edwards
(74) *Attorney, Agent, or Firm* — Wolf, Greenfield & Sacks, P.C.

(57) ABSTRACT

Systems related to concentrated solar combination heating and power generation; solar heating; industrial heat driven power generation; thermal storage systems and heat exchanger and power generation systems therefore, including any of the above with optional supplemental fuel production, and associated methods, are generally described.

18 Claims, 17 Drawing Sheets

Related U.S. Application Data

(60) Provisional application No. 63/092,486, filed on Oct. 15, 2020, provisional application No. 63/004,468, filed on Apr. 2, 2020, provisional application No. 63/004,463, filed on Apr. 2, 2020.

(51) Int. Cl.
*F02C 1/05* (2006.01)
*F03G 6/00* (2006.01)
*F24S 20/40* (2018.01)
*F24S 60/00* (2018.01)

(52) U.S. Cl.
CPC .............. *F03G 6/071* (2021.08); *F24S 20/40* (2018.05); *F24S 60/00* (2018.05); *Y02E 10/46* (2013.01)

(58) Field of Classification Search
CPC .......... Y02P 80/20; F02C 1/05; F03G 6/0055; F03G 6/04; F03G 6/064; F03G 6/065; F03G 6/068; F03G 6/071; F03G 6/127
See application file for complete search history.

(56) References Cited

U.S. PATENT DOCUMENTS

| | | |
|---|---|---|
| 2,680,565 A | 6/1954 | Lof |
| 2,692,760 A | 10/1954 | Flurschutz |
| 2,925,880 A | 2/1960 | Munters |
| 2,965,361 A | 12/1960 | Schwartz |
| 3,183,649 A | 5/1965 | Teller |
| 3,216,486 A | 11/1965 | Hall et al. |
| 3,216,487 A | 11/1965 | Gallagher |
| 3,369,541 A | 2/1968 | Thomason |
| 3,918,516 A | 11/1975 | Carrasse et al. |
| 3,918,517 A | 11/1975 | Silverstone et al. |
| 3,953,744 A | 4/1976 | Kawagoe |
| 3,960,135 A | 6/1976 | Angilletta |
| 3,970,524 A | 7/1976 | Funk |
| 3,981,151 A | 9/1976 | St. Clair |
| 3,987,780 A | 10/1976 | Nozik et al. |
| 4,011,731 A | 3/1977 | Meckler |
| 4,024,910 A | 5/1977 | Werner |
| 4,033,325 A | 7/1977 | Walker |
| 4,057,102 A | 11/1977 | Guillot |
| 4,085,590 A | 4/1978 | Powell et al. |
| 4,085,729 A | 4/1978 | Schmidt |
| 4,088,120 A | 5/1978 | Anderson |
| 4,117,682 A | 10/1978 | Smith |
| 4,121,564 A | 10/1978 | Schwartz |
| 4,123,003 A | 10/1978 | Winston |
| 4,135,489 A | 1/1979 | Jarvinen |
| 4,164,124 A | 8/1979 | Taylor et al. |
| 4,165,612 A | 8/1979 | Fujioka et al. |
| 4,167,856 A | 9/1979 | Seidel et al. |
| 4,176,523 A | 12/1979 | Rousseau |
| 4,188,571 A | 2/1980 | Brunson |
| 4,193,441 A | 3/1980 | Scaringe |
| 4,203,489 A | 5/1980 | Swiadek |
| 4,215,553 A | 8/1980 | Poirier et al. |
| 4,219,203 A | 8/1980 | Bellavia, Jr. et al. |
| 4,257,477 A | 3/1981 | Maloney |
| 4,259,836 A | 4/1981 | Finckh |
| 4,262,484 A | 4/1981 | Jubb et al. |
| 4,262,653 A | 4/1981 | Holland |
| 4,262,735 A | 4/1981 | Courrege et al. |
| 4,281,686 A | 8/1981 | Gerlitz |
| 4,304,585 A | 12/1981 | Oda et al. |
| 4,312,324 A | 1/1982 | Ross et al. |
| 4,318,393 A | 3/1982 | Goldstein |
| 4,347,892 A | 9/1982 | Clyne et al. |
| 4,360,977 A | 11/1982 | Frohbieter |
| 4,362,149 A | 12/1982 | Thomson |
| 4,373,512 A | 2/1983 | Hirt |
| 4,387,574 A | 6/1983 | Becker et al. |
| 4,394,859 A | 7/1983 | Drost |
| 4,401,103 A | 8/1983 | Thompson |
| 4,403,601 A | 9/1983 | Hunt |
| 4,405,010 A | 9/1983 | Schwartz |
| 4,433,551 A | 2/1984 | Dibrell |
| 4,446,698 A | 5/1984 | Benson |
| 4,449,573 A | 5/1984 | Pettersson et al. |
| 4,485,803 A | 12/1984 | Wiener |
| 4,489,774 A | 12/1984 | Ogawa et al. |
| 4,524,756 A | 6/1985 | Laverman |
| 4,546,758 A | 10/1985 | Ebernard |
| 4,581,897 A | 4/1986 | Sankrithi |
| 4,583,520 A | 4/1986 | Dietrich et al. |
| 4,589,938 A | 5/1986 | Drosdick |
| 4,602,614 A | 7/1986 | Percival et al. |
| 4,627,485 A | 12/1986 | Osborn |
| 4,727,930 A | 3/1988 | Bruckner et al. |
| 4,777,934 A | 10/1988 | De Laquil, III |
| 4,885,216 A | 12/1989 | Naik |
| 4,889,182 A | 12/1989 | Kosters |
| 4,901,787 A | 2/1990 | Zornes |
| 4,942,736 A | 7/1990 | Bronicki |
| 4,945,731 A | 8/1990 | Parker et al. |
| 4,947,825 A | 8/1990 | Moriarty |
| 4,953,627 A | 9/1990 | Ito et al. |
| 5,145,011 A | 9/1992 | Seike et al. |
| 5,178,785 A | 1/1993 | Dolan et al. |
| 5,182,912 A | 2/1993 | Parker et al. |
| 5,234,048 A | 8/1993 | Seike et al. |
| 5,241,824 A | 9/1993 | Parker et al. |
| 5,245,985 A | 9/1993 | Holland |
| 5,245,986 A | 9/1993 | Karni |
| 5,259,444 A | 11/1993 | Wilson |
| 5,316,072 A | 5/1994 | Seike et al. |
| 5,323,764 A | 6/1994 | Karni et al. |
| 5,397,649 A | 3/1995 | Schienle et al. |
| 5,404,723 A | 4/1995 | Parker et al. |
| 5,417,052 A | 5/1995 | Bharathan et al. |
| 5,421,322 A | 6/1995 | Karni et al. |
| 5,444,972 A | 8/1995 | Moore |
| 5,448,889 A | 9/1995 | Bronicki |
| 5,449,568 A | 9/1995 | Micheli et al. |
| 5,483,950 A | 1/1996 | Keintzel et al. |
| 5,507,276 A | 4/1996 | Holland |
| 5,517,822 A | 5/1996 | Haws et al. |
| 5,529,054 A | 6/1996 | Shoen |
| 5,577,551 A | 11/1996 | Kritzler et al. |
| 5,634,339 A | 6/1997 | Lewis et al. |
| 5,685,289 A | 11/1997 | Yogev |
| 5,796,892 A | 8/1998 | Karni et al. |
| 5,850,831 A | 12/1998 | Marko |
| 5,851,309 A | 12/1998 | Kousa |
| 5,862,800 A | 1/1999 | Marko |
| 5,873,250 A | 2/1999 | Lewis et al. |
| 5,876,250 A | 3/1999 | Deng |
| 5,894,838 A | 4/1999 | Yogey |
| 5,899,071 A | 5/1999 | Stone et al. |
| 5,931,158 A | 8/1999 | Buck |
| 5,947,114 A | 9/1999 | Kribus et al. |
| 5,968,680 A | 10/1999 | Wolfe et al. |
| 5,979,438 A | 11/1999 | Nakamura |
| 5,979,439 A | 11/1999 | Hoffschmidt et al. |
| 5,997,292 A | 12/1999 | Tanaka et al. |
| 6,000,211 A | 12/1999 | Bellac et al. |
| 6,003,508 A | 12/1999 | Hoffschmidt et al. |
| 6,041,599 A | 3/2000 | Obermoser |
| 6,085,829 A | 7/2000 | Neuhaus et al. |
| 6,099,671 A | 8/2000 | Pearson et al. |
| 6,099,931 A | 8/2000 | Heller et al. |
| 6,188,820 B1 | 2/2001 | Yogev |
| RE37,134 E | 4/2001 | Wilson |
| 6,237,337 B1 | 5/2001 | Bronicki et al. |
| 6,321,539 B1 | 11/2001 | Bronicki et al. |
| 6,484,506 B1 | 11/2002 | Bellac et al. |
| 6,510,695 B1 | 1/2003 | Fisher |
| 6,516,794 B2 | 2/2003 | Karni et al. |
| 6,557,804 B1 | 5/2003 | Carroll |
| 6,629,413 B1 | 10/2003 | Wendt et al. |
| 6,648,063 B1 | 11/2003 | Andraka et al. |

(56) References Cited

U.S. PATENT DOCUMENTS

| | | | |
|---|---|---|---|
| 6,668,555 B1 | 12/2003 | Moriarty | |
| 6,681,557 B2 | 1/2004 | Wilson | |
| 6,694,738 B2 | 2/2004 | Bronicki et al. | |
| 6,701,711 B1 | 3/2004 | Litwin | |
| 6,708,687 B2 | 3/2004 | Blackmon et al. | |
| 6,735,946 B1 | 5/2004 | Otting et al. | |
| 6,736,134 B2 | 5/2004 | Marko | |
| 6,764,279 B2 | 7/2004 | Meshenky | |
| 6,814,544 B2 | 11/2004 | Tsukamoto et al. | |
| 6,832,485 B2 | 12/2004 | Sugarmen et al. | |
| 6,838,485 B1 | 1/2005 | Quintero | |
| 6,864,198 B2 | 3/2005 | Merkel | |
| 6,886,339 B2 | 5/2005 | Carroll et al. | |
| 6,899,097 B1 | 5/2005 | Mecham | |
| 6,911,110 B2 | 6/2005 | Blackmon et al. | |
| 6,929,056 B2 | 8/2005 | Meshenky et al. | |
| 6,931,851 B2 | 8/2005 | Litwin | |
| 6,941,759 B2 | 9/2005 | Bellac et al. | |
| 6,957,536 B2 | 10/2005 | Litwin et al. | |
| 6,968,991 B2 | 11/2005 | Renteria et al. | |
| 6,979,911 B2 | 12/2005 | Otting et al. | |
| 7,011,086 B2 | 3/2006 | Litwin | |
| 7,024,857 B2 | 4/2006 | Karni et al. | |
| 7,026,722 B1 | 4/2006 | Otting et al. | |
| 7,028,481 B1 | 4/2006 | Morrow | |
| 7,051,529 B2 | 5/2006 | Murphy et al. | |
| 7,055,519 B2 | 6/2006 | Litwin | |
| 7,084,518 B2 | 8/2006 | Otting et al. | |
| 7,172,016 B2 | 2/2007 | Meshenky et al. | |
| 7,191,597 B2 | 3/2007 | Goldman | |
| 7,240,675 B2 | 7/2007 | Eickhoff | |
| 7,263,992 B2 | 9/2007 | Zhang | |
| 7,278,472 B2 | 10/2007 | Meshenky et al. | |
| 7,294,316 B2 | 11/2007 | Harada et al. | |
| 7,296,410 B2 | 11/2007 | Litwin | |
| 7,299,633 B2 | 11/2007 | Murphy et al. | |
| 7,325,401 B1 | 2/2008 | Kesseli et al. | |
| 7,331,178 B2 | 2/2008 | Goldman | |
| 7,555,891 B2 | 7/2009 | Muller et al. | |
| 7,954,321 B2 | 6/2011 | Shinnar | |
| 9,726,155 B2 | 8/2017 | Anderson et al. | |
| 10,280,903 B2 | 5/2019 | Anderson et al. | |
| 10,876,521 B2 | 12/2020 | Anderson et al. | |
| 11,242,843 B2 | 2/2022 | Anderson et al. | |
| 2002/0073712 A1 | 6/2002 | Kopko | |
| 2002/0083946 A1 | 7/2002 | Karni et al. | |
| 2002/0124991 A1 | 9/2002 | Wilson | |
| 2003/0145596 A1 | 8/2003 | Noelscher | |
| 2004/0083731 A1 | 5/2004 | Lasker | |
| 2004/0088979 A1 | 5/2004 | Talbott et al. | |
| 2004/0112374 A1 | 6/2004 | Litwin | |
| 2004/0139960 A1 | 7/2004 | Blackmon et al. | |
| 2004/0139961 A1 | 7/2004 | Blackmon et al. | |
| 2005/0150225 A1 | 7/2005 | Gwiazda et al. | |
| 2005/0151324 A1 | 7/2005 | Plona et al. | |
| 2006/0054301 A1 | 3/2006 | McRay et al. | |
| 2006/0174866 A1 | 8/2006 | Zhang | |
| 2006/0225729 A1 | 10/2006 | Litwin | |
| 2007/0089283 A1 | 4/2007 | Wilson et al. | |
| 2007/0186921 A1 | 8/2007 | Swanepoel | |
| 2008/0011290 A1 | 1/2008 | Goldman et al. | |
| 2008/0066736 A1 | 3/2008 | Zhu | |
| 2008/0072425 A1 | 3/2008 | Whittenberger et al. | |
| 2008/0250788 A1 | 10/2008 | Nuel et al. | |
| 2008/0251234 A1 | 10/2008 | Wilson et al. | |
| 2008/0276616 A1 | 11/2008 | Flynn et al. | |
| 2008/0302314 A1 | 12/2008 | Gonzalez et al. | |
| 2008/0308152 A1 | 12/2008 | Grip | |
| 2009/0000761 A1 | 1/2009 | Wilson et al. | |
| 2009/0000762 A1 | 1/2009 | Wilson et al. | |
| 2009/0107485 A1 | 4/2009 | Reznik et al. | |
| 2009/0121495 A1 | 5/2009 | Mills | |
| 2009/0133685 A1 | 5/2009 | Pham et al. | |
| 2009/0173337 A1 | 7/2009 | Tamaura et al. | |
| 2009/0217921 A1 | 9/2009 | Gilon et al. | |
| 2009/0241938 A1 | 10/2009 | Arbogast et al. | |
| 2009/0241939 A1 | 10/2009 | Heap et al. | |
| 2009/0261592 A1 | 10/2009 | Kay | |
| 2009/0322089 A1 | 12/2009 | Mills et al. | |
| 2010/0034690 A1 | 2/2010 | Nishiyama et al. | |
| 2010/0101621 A1 | 4/2010 | Xu | |
| 2010/0126171 A1 | 5/2010 | Smith | |
| 2010/0176602 A1 | 7/2010 | Shinnar | |
| 2010/0287933 A1 | 11/2010 | Niknafs et al. | |
| 2011/0005580 A1 | 1/2011 | Vandermeulen | |
| 2011/0209475 A1 | 9/2011 | Jeter et al. | |
| 2011/0220230 A1 | 9/2011 | Laird et al. | |
| 2011/0277471 A1 | 11/2011 | Shinnar | |
| 2011/0314813 A1 | 12/2011 | Cafri et al. | |
| 2012/0192564 A1* | 8/2012 | Mishima | F22B 33/18 60/660 |
| 2013/0139517 A1 | 6/2013 | Koyama et al. | |
| 2013/0257056 A1 | 10/2013 | Ma | |
| 2013/0298557 A1* | 11/2013 | Treece | F24S 80/20 60/641.15 |
| 2015/0033740 A1* | 2/2015 | Anderson | F24S 80/50 60/641.15 |
| 2016/0047361 A1 | 2/2016 | Al-Sulaiman | |
| 2016/0222947 A1* | 8/2016 | Venkatachalam | H02K 7/1823 |
| 2019/0353146 A1 | 11/2019 | Anderson et al. | |
| 2020/0095899 A1 | 3/2020 | Merswolke et al. | |
| 2021/0190044 A1 | 6/2021 | Anderson et al. | |
| 2022/0235746 A1 | 7/2022 | Anderson et al. | |
| 2023/0272785 A1 | 8/2023 | Anderson et al. | |

FOREIGN PATENT DOCUMENTS

| | | |
|---|---|---|
| CN | 2374819 Y | 4/2000 |
| CN | 1804502 A | 7/2006 |
| CN | 1821679 A | 8/2006 |
| CN | 1912477 A | 2/2007 |
| CN | 101413719 A | 4/2009 |
| CN | 101592136 A | 12/2009 |
| CN | 101655078 A | 2/2010 |
| CN | 2014-88319 U | 5/2010 |
| CN | 2014-88353 U | 5/2010 |
| CN | 101705925 A | 5/2010 |
| CN | 101726116 A | 6/2010 |
| CN | 101825072 A | 9/2010 |
| CN | 201963504 U | 9/2011 |
| DE | 2401334 | 8/1974 |
| DE | 2939416 A | 4/1981 |
| DE | 2945969 | 5/1981 |
| DE | 2948355 C | 6/1981 |
| DE | 3100090 A1 | 8/1982 |
| DE | 10149806 A | 4/2003 |
| DE | 10208487 A | 9/2003 |
| DE | 102004026517 B3 | 10/2005 |
| DE | 102004031917 A1 | 1/2006 |
| EP | 151045 | 8/1985 |
| EP | 0 400 701 A1 | 12/1990 |
| EP | 0552732 A1 | 7/1993 |
| EP | 0364106 B | 11/1995 |
| EP | 960598 | 12/1999 |
| EP | 1610073 | 12/2005 |
| EP | 1 872 002 A1 | 1/2008 |
| EP | 2 441 925 A1 | 4/2012 |
| ES | 2279658 A1 | 8/2007 |
| FR | 2 401 334 A1 | 3/1979 |
| GB | 666889 | 2/1952 |
| GB | 917307 | 1/1963 |
| GB | 1255262 | 12/1971 |
| JP | 2009-191762 | 8/2009 |
| RU | 2253429 C1 | 6/2005 |
| WO | WO 1983/00995 | 3/1983 |
| WO | WO 90/12989 A1 | 11/1990 |
| WO | WO 95/35469 A1 | 12/1995 |
| WO | WO 95/35470 A1 | 12/1995 |
| WO | WO 96/12918 A1 | 5/1996 |
| WO | WO 1997/11321 | 3/1997 |
| WO | WO 01/61254 A1 | 8/2001 |
| WO | WO 2001/096791 | 12/2001 |
| WO | WO 2003/021160 | 3/2003 |
| WO | WO 2003/021161 | 3/2003 |

(56) References Cited

FOREIGN PATENT DOCUMENTS

| | | |
|---|---|---|
| WO | WO 03/104629 A1 | 12/2003 |
| WO | WO 2004/023048 | 3/2004 |
| WO | WO 2005/011503 | 2/2005 |
| WO | WO 2005/071325 | 8/2005 |
| WO | WO 2005/077265 | 8/2005 |
| WO | WO 2006/030441 | 3/2006 |
| WO | WO 2006/061825 | 6/2006 |
| WO | WO 2006/111362 A1 | 10/2006 |
| WO | WO 2008/069426 | 6/2008 |
| WO | WO 2008/118980 | 10/2008 |
| WO | WO 2008/153922 | 12/2008 |
| WO | WO 2008/154599 | 12/2008 |
| WO | WO 2009/015388 | 1/2009 |
| WO | WO 2009/027986 | 3/2009 |
| WO | WO 2009/048458 | 4/2009 |
| WO | WO 2009/048479 | 4/2009 |
| WO | WO 2009/101586 | 8/2009 |
| WO | WO 2009/121030 | 10/2009 |
| WO | WO 2009/121987 | 10/2009 |
| WO | WO 2010/004545 | 1/2010 |
| WO | WO 2010/055439 A2 | 5/2010 |
| WO | WO 2010/116162 A2 | 10/2010 |
| WO | WO 2011/000045 A1 | 1/2011 |
| WO | WO 2012/037532 A2 | 3/2012 |
| WO | WO 2013/124899 A1 | 8/2013 |
| WO | WO 2013/142275 A2 | 9/2013 |

OTHER PUBLICATIONS

International Search Report and Written Opinion for International Application No. PCT/US2021/025473 dated Oct. 4, 2021.

International Preliminary Report on Patentability (Chapter 1) for International Application No. PCT/US2021/025473 dated Oct. 13, 2022.

Office Communication for IN Application No. 201918029100 dated Mar. 20, 2024.

Office Action for AU Application No. 2022241480 dated Jun. 13, 2024 and claims pending as of Jun. 13, 2024.

Email Communication for AU Application No. 2022241480 dated Jun. 24, 2024.

Office Communication for CN Application No. 201710257929.6 dated Apr. 11, 2024.

Hearing Notice for IN Application No. 201918007508 dated Aug. 7, 2024.

Interview Summary for U.S. Appl. No. 17/666,426 dated Apr. 24, 2024.

Office Action for U.S. Appl. No. 17/666,426 dated Jul. 25, 2024 and claims pending as of Jul. 25, 2024.

Office Action for U.S. Appl. No. 17/981,207 dated May 9, 2024 and claims pending.

Buck et al., Solar-Hybrid Gas Turbine-based Power Tower Systems (REFOS). J Sol Energy Eng. Feb. 2002;124(1):2-9.

[No Author Listed], High Concentration Solar Receiver. Rotem Industries, Ltd. 2007.

[No Author Listed], Solgate Solar hybrid gas turbine electric power system. European Commission. EUR 21615. Project Report. 2005.

Adkins et al., Heat Pipe Solar Receiver Development Activities at Sandia National Laboratories. The renewable and advanced energy conference for the $21^{st}$ century conference. Apr. 1999.

Amsbeck et al., Development of a tube receiver for a solar-hybrid microturbine system. 14th Biennial CSP Solarpaces Symposium. 2008.

Bai, One dimensional thermal analysis of silicon carbide ceramic foam used for solar air receiver. Int. J Thermal Sci. Dec. 2010;49(12):2400-2404.

Brower et al., Conceptual design of advanced central receiver power systems. Sanders Associates Inc. proposal submitted by Energy Research and Development Administrations, (ERDA). vol. II. 1979.

Forsberg et al., High-Temperature Liquid-Fluoride-Salt Closed-Brayton-Cycle Solar Power Towers. J. Solar Energy Eng. May 2007;129:141-146.

Gallup, A solarized Brayton engine based on turbo-charger technology and DLR receiver. Sandia National Labs., Albuquerque, NM; James Kesseli, Northern Research & Engineering Corp., Woburn, MA. Aug. 1994:1719-24.

Klein et al., Experimental Evaluation of Particle Consumption in a Particle Seeded Solar Receiver. J. Sol Energy Eng. Dec. 2007;130(1):1-8.

Konstandopoulos et al., Hydrosol advanced monolithic reactors for hydrogen generation from solar water splitting. Revue des Energies Renouvelables. 2006;9(3):121-126.

Roger et al., Multiple Air-Jet Window Cooling for High-Temperature Pressurized Volumetric Receivers: Testing, Evaluation, and Modeling. Sol. Energy Eng. Mar. 2006. 128(3):265-274.

Schwarzbözl et al., Solar Gas Turbine Systems: Design, Cost and Perspectives. Solar Energy. 2006;80;1231-1240.

Wang, Technical Process in Refrigeration Air Conditioner. Shanghai Jiao Tong University Press. Nov. 30, 2003:13 pages.

Office Action for U.S. Appl. No. 17/981,207 dated Nov. 27, 2024 and pending claims.

\* cited by examiner

US 12,305,888 B2

CONCENTRATED SOLAR ENERGY COLLECTION, THERMAL STORAGE, AND POWER GENERATION SYSTEMS AND METHODS WITH OPTIONAL SUPPLEMENTAL FUEL PRODUCTION

RELATED APPLICATIONS

This Application is a Continuation of International Patent Application Serial No. PCT/US2021/025473, filed Apr. 1, 2021, entitled "CONCENTRATED SOLAR ENERGY COLLECTION, THERMAL STORAGE, AND POWER GENERATION SYSTEMS AND METHODS WITH OPTIONAL SUPPLEMENTAL FUEL PRODUCTION", which claims priority under 35 U.S.C. § 119 to U.S. Provisional Application Ser. No. 63/092,486, filed Oct. 15, 2020, entitled "SERIES HEAT EXCHANGER ARRAY FOR OPERATION OF A GAS TURBINE ENGINE WITH A REMOTE HEAT SOURCE". Application PCT/US2021/025473 also claims priority under 35 U.S.C. § 119 to U.S. Provisional Application Ser. No. 63/004,468, filed Apr. 2, 2020, entitled "CONCENTRATED SOLAR ENERGY COLLECTION, STORAGE AND POWER GENERATION SYSTEMS WITH SUPPLEMENTAL FUEL PRODUCTION, and U.S. Provisional Application Ser. No. 63/004,463, filed Apr. 2, 2020, entitled "CONCENTRATED SOLAR ENERGY COLLECTION AND STORAGE SYSTEMS FOR INDUSTRIAL HEAT TRANSFER APPLICATIONS AND/OR POWER SUPPLY", each application of which is herein incorporated by reference it its entirety.

FIELD OF INVENTION

Systems related to concentrated solar combination heating and/or power generation with optional supplemental fuel production, and associated methods, are generally described.

BACKGROUND

Mounting concerns over the effect of greenhouse gases on global climate have stimulated research focused on limiting greenhouse gas emissions. Solar heating and power generation is particularly appealing because substantially no greenhouse gases are produced when solar radiation is converted to thermal energy.

Concentrated solar power (CSP) generation using solar receivers is known in the art. Briefly, concentrated solar power systems use lenses, mirrors, or other elements to focus sunlight incident on a relatively large area onto a small area called a solar receiver. The concentrated sunlight can be used to heat a fluid within the solar receiver. The fluid heated within the solar receiver can then be used to drive a turbine to generate power. Current systems for solar power generation and CSP often lack the capability to provide consistent and reliable power generation in circumstances when the sun is not shining (e.g., during nighttime operation) and/or lack the flexibility to produce energy for use in applications other than or in addition to power generation. Furthermore, solar power generation and CSP systems further lack the ability on the input side to utilize non-solar sources of heat energy that may otherwise not be exploited. Accordingly, advances like those described below would be beneficial.

SUMMARY OF THE INVENTION

Systems related to concentrated solar combination heating and/or power generation with optional supplemental fuel production, and associated methods, are generally described.

According to certain embodiments, a concentrated solar combination heating and power generation system is described. The concentrated solar combination heating and power generation system comprises, in some embodiments, a solar receiver comprising a fluid chamber comprising a fluid inlet, a fluid outlet, and an opening for receiving concentrated solar radiation, a solar absorber housed within the fluid chamber, and a transparent object that defines at least a portion of a wall of the fluid chamber, wherein concentrated solar radiation received through the opening passes through the transparent object into the fluid chamber and impinges upon the solar absorber to produce a heated first fluid having a first pressure that is less than 2 atmospheres. In some embodiments, the concentrated solar combination heating and power generation system comprises a thermal storage unit comprising a vessel containing a thermal storage medium therein, and having a fluid inlet in valved fluid communication with the fluid outlet of the fluid chamber of the solar receiver and a fluid outlet. In certain embodiments, the concentrated solar combination heating and power generation system comprises a power generation system comprising a heat exchange system comprising at least a first heat exchange unit, the heat exchange system positioned downstream of the solar receiver and the thermal storage unit and having an inlet in valved fluid communication with the fluid outlet of the fluid chamber of the solar receiver and in valved fluid communication with the fluid outlet of the thermal storage unit, such that the heat exchange system can receive the heated first fluid selectively from either or both of the fluid chamber of the solar receiver and the thermal storage unit, the heat exchange system being configured to transfer heat from the heated first fluid to a second fluid to produce a heated second fluid having a second pressure, the second pressure being greater than the first pressure, and a gas turbine in fluid communication with and downstream of an outlet of the heat exchange system, configured to receive the heated second fluid at a gas turbine inlet and generate power therefrom. In certain embodiments, the concentrated solar combination heating and power generation system comprises a heated fluid diversion outlet conduit for diverting at least a portion of the heated first fluid from the power generation system, the outlet conduit having an inlet in valved fluid communication with the fluid outlet of the fluid chamber of the solar receiver and with the thermal storage unit and positioned upstream of the inlet of the heat exchange system and the inlet of the thermal storage unit.

In some embodiments, a concentrated solar combination heating and power generation system comprises a solar receiver comprising a fluid chamber comprising a fluid inlet, a fluid outlet, and an opening for receiving concentrated solar radiation, a solar absorber housed within the fluid chamber, and a transparent object that defines at least a portion of a wall of the fluid chamber, wherein concentrated solar radiation received through the opening passes through the transparent object into the fluid chamber and impinges upon the solar absorber to produce a heated first fluid having a first pressure that is less than 2 atmospheres. In certain embodiments, the concentrated solar combination heating and power generation system comprises a thermal storage unit comprising a vessel containing a thermal storage medium therein, and having a fluid inlet in valved fluid communication with the fluid outlet of the fluid chamber of the solar receiver and a fluid outlet. In some embodiments, the concentrated solar combination heating and power generation system comprises a power generation system comprising a heat exchange system comprising at least a first heat exchange unit, the heat exchange system positioned downstream of the solar receiver and the thermal storage unit and having an inlet in valved fluid communication with the fluid outlet of the fluid chamber of the solar receiver and in valved fluid communication with the fluid outlet of the thermal storage unit such that the heat exchange system can receive the heated first fluid selectively from either or both of the fluid chamber of the solar receiver and the thermal storage unit, the heat exchange system being configured to transfer heat from the heated first fluid to a second fluid to produce a heated second fluid having a second pressure, the second pressure being greater than the first pressure, and a gas turbine in fluid communication with and downstream of an outlet of the heat exchange system, configured to receive the heated second fluid at a gas turbine inlet and generate power therefrom. According to some embodiments, the concentrated solar combination heating and power generation system comprises a fuel-fired combustion unit positioned upstream of the heat exchange system in fluid communication with the heat exchange system, the fluid chamber of solar receiver, and the thermal storage unit, and configured to further heat the heated first fluid prior to introduction to the heat exchange system and/or to independently provide a sufficient quantity of the heated first fluid to the heat exchange system to power the gas turbine.

In some embodiments, a combination heating and power generation system is described. The combination heating and power generation system comprises, in some embodiments, an industrial source of heated fluid between greater than or equal to 200° C. and less than or equal to 2000° C. and at a pressure of less than or equal to 2 atmospheres. In certain embodiments, the combination heating and power generation system comprises a thermal storage unit comprising a vessel containing a thermal storage medium therein, and having a fluid inlet in valved fluid communication with a fluid outlet of the industrial source of heated fluid and a fluid outlet. According to some embodiments, the combination heating and power generation system comprises a power generation system comprising a heat exchange system comprising at least a first heat exchange unit, the heat exchange system positioned downstream of the industrial source of heated fluid and the thermal storage unit and having an inlet in valved fluid communication with the fluid outlet of the industrial source of heated fluid and in valved fluid communication with the fluid outlet of the thermal storage unit, such that the heat exchange system can receive the heated fluid selectively from either or both of the industrial source of heated fluid and the thermal storage unit, the heat exchange system being configured to transfer heat from the heated fluid to a second fluid to produce a heated second fluid having a second pressure, the second pressure being greater than the first pressure, and a gas turbine in fluid communication with and downstream of an outlet of the heat exchange system, configured to receive the heated second fluid at a gas turbine inlet and generate power therefrom. In certain embodiments, the combination heating and power generation system comprises a heated fluid diversion outlet conduit for diverting at least a portion of the heated first fluid from the power generation system, the outlet conduit having an inlet in valved fluid communication with the fluid outlet of the industrial source of heated fluid and with the thermal storage unit and positioned upstream of the inlet of the heat exchange system and the inlet of the thermal storage unit.

In certain embodiments, a combination heating and power generation system comprises an industrial source of heated fluid between greater than or equal to 200° C. and less than or equal to 2000° C. and at a pressure of less than or equal to 2 atmospheres. In some embodiments, the combination heating and power generation system comprises a thermal storage unit comprising a vessel containing a thermal storage medium therein, and having a fluid inlet in valved fluid communication with a fluid outlet of the industrial source of heated fluid and a fluid outlet. According to certain embodiments, the combination heating and power generation system comprises a power generation system comprising a heat exchange system comprising at least a first heat exchange unit, the heat exchange system positioned downstream of the industrial source of heated fluid and the thermal storage unit and having an inlet in valved fluid communication with the fluid outlet of the industrial source of heated fluid and in valved fluid communication with the fluid outlet of the thermal storage unit, such that the heat exchange system can receive the heated fluid selectively from either or both of the industrial source of heated fluid and the thermal storage unit, the heat exchange system being configured to transfer heat from the heated fluid to a second fluid to produce a heated second fluid having a second pressure, the second pressure being greater than the first pressure, and a gas turbine in fluid communication with and downstream of an outlet of the heat exchange system, configured to receive the heated second fluid at a gas turbine inlet and generate power therefrom. In certain embodiments, the combination heating and power generation system comprises a fuel-fired combustion unit positioned upstream of the heat exchange system in fluid communication with the heat exchange system, the industrial source of heated fluid, and the thermal storage unit, and configured to further heat the heated fluid prior to introduction to the heat exchange system and/or to independently provide a sufficient quantity of the heated fluid to the heat exchange system to power the gas turbine.

According to certain embodiments, a method of selectively generating power or heat with a concentrated solar receiver is described. The method comprises, in some embodiments, flowing a fluid having a pressure less than 2 atmospheres through the concentrated solar receiver to produce a heated fluid, selectively flowing the heated fluid to at least one of: a power generating system comprising a heat exchanger configured to transfer heat from the heated fluid to a second pressurized fluid, which is fed to a gas turbine to generate power; a thermal storage unit configured to store heat derived from the heated fluid; and a heated fluid diversion outlet conduit positioned upstream of the power generating system and configured to provide heat for an industrial process, wherein each of the power generating system, the thermal storage unit, and the heated fluid diversion outlet conduit are fluidically connected to the solar receiver.

In some embodiments, a concentrated solar combination heating system with thermal storage is described. The concentrated solar combination heating system with thermal storage comprises, in some embodiments, a solar receiver comprising a fluid chamber comprising a fluid inlet, a fluid outlet, and an opening for receiving concentrated solar radiation, a solar absorber housed within the fluid chamber, and a transparent object that defines at least a portion of a wall of the fluid chamber, wherein concentrated solar radiation received through the opening passes through the transparent object into the fluid chamber and impinges upon the solar absorber to produce a heated first fluid having a first pressure that is less than 2 atmospheres. According to certain embodiments, the concentrated solar combination heating system with thermal storage comprises a thermal storage unit comprising a vessel containing a thermal storage medium therein, and having a fluid inlet in valved fluid communication with the fluid outlet of the fluid chamber of the solar receiver and a fluid outlet. In some embodiments, the concentrated solar combination heating system with thermal storage comprises a heat exchange system comprising at least a first heat exchange unit, the heat exchange system positioned downstream of the solar receiver and the thermal storage unit and having an inlet in valved fluid communication with the fluid outlet of the fluid chamber of the solar receiver and in valved fluid communication with the fluid outlet of the thermal storage unit such that the heat exchange system can receive the heated first fluid selectively from either or both of the fluid chamber of the solar receiver and the thermal storage unit, the heat exchange system being configured to transfer heat from the heated first fluid to a second fluid to produce a heated second fluid, wherein the heated second fluid is used to supply heat to an industrial processing unit or is used for space heating purposes, and wherein the industrial processing unit is free of any gas turbines and is not used for generating electrical power.

In certain embodiments, a heat supply and storage system for providing heat to an industrial processing unit is described. The heat supply and storage system for providing heat to an industrial processing unit comprises, in some embodiments, an industrial source of heated fluid between greater than or equal to 200° C. and less than or equal to 2000° C. and at a pressure of less than or equal to 2 atmospheres. According to certain embodiments, the heat supply and storage system for providing heat to an industrial processing unit comprises a thermal storage unit comprising a vessel containing a thermal storage medium therein, and having a fluid inlet in valved fluid communication with a fluid outlet of the industrial source of heated fluid and a fluid outlet. In some embodiments, the heat supply and storage system for providing heat to an industrial processing unit comprises a heat exchange system comprising at least a first heat exchange unit, the heat exchange system positioned downstream of the industrial source of heated fluid and the thermal storage unit and having an inlet in valved fluid communication with the fluid outlet of the industrial source of heated fluid and in valved fluid communication with the fluid outlet of the thermal storage unit such that the heat exchange system can receive the heated fluid selectively from either or both of the industrial source of heated fluid and the thermal storage unit, the heat exchange system being configured to transfer heat from the heated fluid to a second fluid to produce a heated second fluid, wherein the heated second fluid is used to supply heat to an industrial processing unit or is used for space heating purposes, and wherein the industrial processing unit is free of any gas turbines and is not used for generating electrical power.

According to certain embodiments, a concentrated solar combination heating and power generation system is described. The concentrated solar combination heating and power generation system comprises, in some embodiments, a solar receiver comprising a fluid chamber comprising a fluid inlet, a fluid outlet, and an opening for receiving concentrated solar radiation, a solar absorber housed within the fluid chamber, and a transparent object that defines at least a portion of a wall of the fluid chamber, wherein concentrated solar radiation received through the opening passes through the transparent object into the fluid chamber and impinges upon the solar absorber to produce a heated first fluid having a first pressure that is less than 2 atmospheres. In certain embodiments, the concentrated solar combination heating and power generation system comprises a thermal storage unit comprising a vessel containing a thermal storage medium therein, and having a fluid inlet in valved fluid communication with the fluid outlet of the fluid chamber of the solar receiver and a fluid outlet. In some embodiments, the concentrated solar combination heating and power generation system comprises a fuel-fired combustion unit positioned upstream of the heat exchange system in fluid communication with the heat exchange system, the fluid chamber of solar receiver, and the thermal storage unit, and configured to further heat the heated first fluid prior to introduction to the heat exchange system and/or to independently provide a sufficient quantity of the heated first fluid to the heat exchange system to power the gas turbine. According to certain embodiments, the concentrated solar combination heating and power generation system comprises a power generation system comprising a heat exchange system comprising at least a first heat exchange unit, the heat exchange system positioned downstream of the solar receiver and the thermal storage unit and having an inlet in valved fluid communication with the fluid outlet of the fluid chamber of the solar receiver and in valved fluid communication with the fluid outlet of the thermal storage unit, such that the heat exchange system can receive the heated first fluid selectively from either or both of the fluid chamber of the solar receiver and the thermal storage unit, the heat exchange system being configured to transfer heat from the heated first fluid to a second fluid to produce a heated second fluid having a second pressure, the second pressure being greater than the first pressure, a gas turbine in fluid communication with and downstream of an outlet of the heat exchange system, configured to receive the heated second fluid at a gas turbine inlet and generate power therefrom via an electric generator, and a fuel energy system positioned downstream of the heat exchange system and having an inlet in valved fluid communication with a second outlet of the heat exchange system, configured to receive one or more of the heated first fluid from the heat exchange system, and/or electricity produced by the electric generator, wherein the fuel energy system produces one or more of a combustible fuel suitable to be combusted by the fuel-fired combustion unit, electrical power, and/or a pressurized working fluid suitable to power the gas turbine.

In some embodiments, a combination heating and power generation system, comprising is described. The combination heating and power generation system comprises, in some embodiments, an industrial source of heated fluid between greater than or equal to 200° C. and less than or equal to 2000° C. and at a pressure of less than or equal to 2 atmospheres. In certain embodiments, the combination heating and power generation system comprises a thermal storage unit comprising a vessel containing a thermal storage medium therein, and having a fluid inlet in valved fluid communication with a fluid outlet of the industrial source of heated fluid and a fluid outlet. According to some embodiments, the combination heating and power generation system comprises a fuel-fired combustion unit positioned upstream of the heat exchange system in fluid communication with the heat exchange system, the industrial source of heated fluid, and the thermal storage unit, and configured to further heat the heated fluid prior to introduction to the heat exchange system and/or to independently provide a sufficient quantity of the heated fluid to the heat exchange system to power the gas turbine. In certain embodiments, the combination heating and power generation system comprises a power generation system comprising a heat exchange system comprising at least a first heat exchange unit, the heat exchange system positioned downstream of the industrial source of heated fluid and the thermal storage unit and having an inlet in valved fluid communication with the fluid outlet of the industrial source of heated fluid and in valved fluid communication with the fluid outlet of the thermal storage unit, such that the heat exchange system can receive the heated fluid selectively from either or both of the industrial source of heated fluid and the thermal storage unit, the heat exchange system being configured to transfer heat from the heated fluid to a second fluid to produce a heated second fluid having a second pressure, the second pressure being greater than the first pressure, a gas turbine in fluid communication with and downstream of an outlet of the heat exchange system, configured to receive the heated second fluid at a gas turbine inlet and generate power therefrom via an electric generator, and a fuel energy system positioned downstream of the heat exchange system and having an inlet in valved fluid communication with a second outlet of the heat exchange system, configured to receive one or more of the heated first fluid from the heat exchange system, and/or electricity produced by the electric generator, wherein the fuel energy system produces one or more of a combustible fuel suitable to be combusted by the fuel-fired combustion unit, electrical power, and/or a pressurized working fluid suitable to power the gas turbine.

In certain embodiments, a power generation system able to generate power from a solar receiver and/or an industrial source of heated fluid between 700° C. and 1300° C., or between 700° C. and 1800° C. and at a first pressure of less than or equal to 2 atmospheres is described. In some embodiments, the power generation system comprises a heat exchange system comprising at least a first heat exchange unit and a second heat exchange unit configured in series, the heat exchange system positioned downstream of the solar receiver and/or industrial source of heated fluid and having an inlet in valved fluid communication with the fluid outlet of the solar receiver and/or industrial source of heated fluid, wherein the heat exchange system is configured to transfer heat from the heated fluid to a second fluid to produce a heated second fluid. In certain embodiments, the power generation system comprises a gas turbine in fluid communication with and downstream of an outlet of the heat exchange system, configured to receive the second heated fluid at a gas turbine inlet and generate power therefrom.

According to certain embodiments, a power generation system able to generate power from solar receiver and/or an industrial source of heated fluid up to 1700° C., or up to 1800° C., and in certain cases up to 2000° C. or more, and at a first pressure of less than or equal to 2 atmospheres comprises a heat exchange system comprising at least a first heat exchange unit and a second heat exchange unit configured in series, the heat exchange system positioned downstream of the solar receiver and/or industrial source of heated fluid and having an inlet in valved fluid communication with the fluid outlet of the solar receiver and/or industrial source of heated fluid, wherein the heat exchange system is configured to transfer heat from the heated fluid to a second fluid to produce a heated second fluid. In certain embodiments, the power generation system comprises a gas turbine in fluid communication with and downstream of an outlet of the heat exchange system, configured to receive the second heated fluid at a gas turbine inlet and generate power therefrom.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
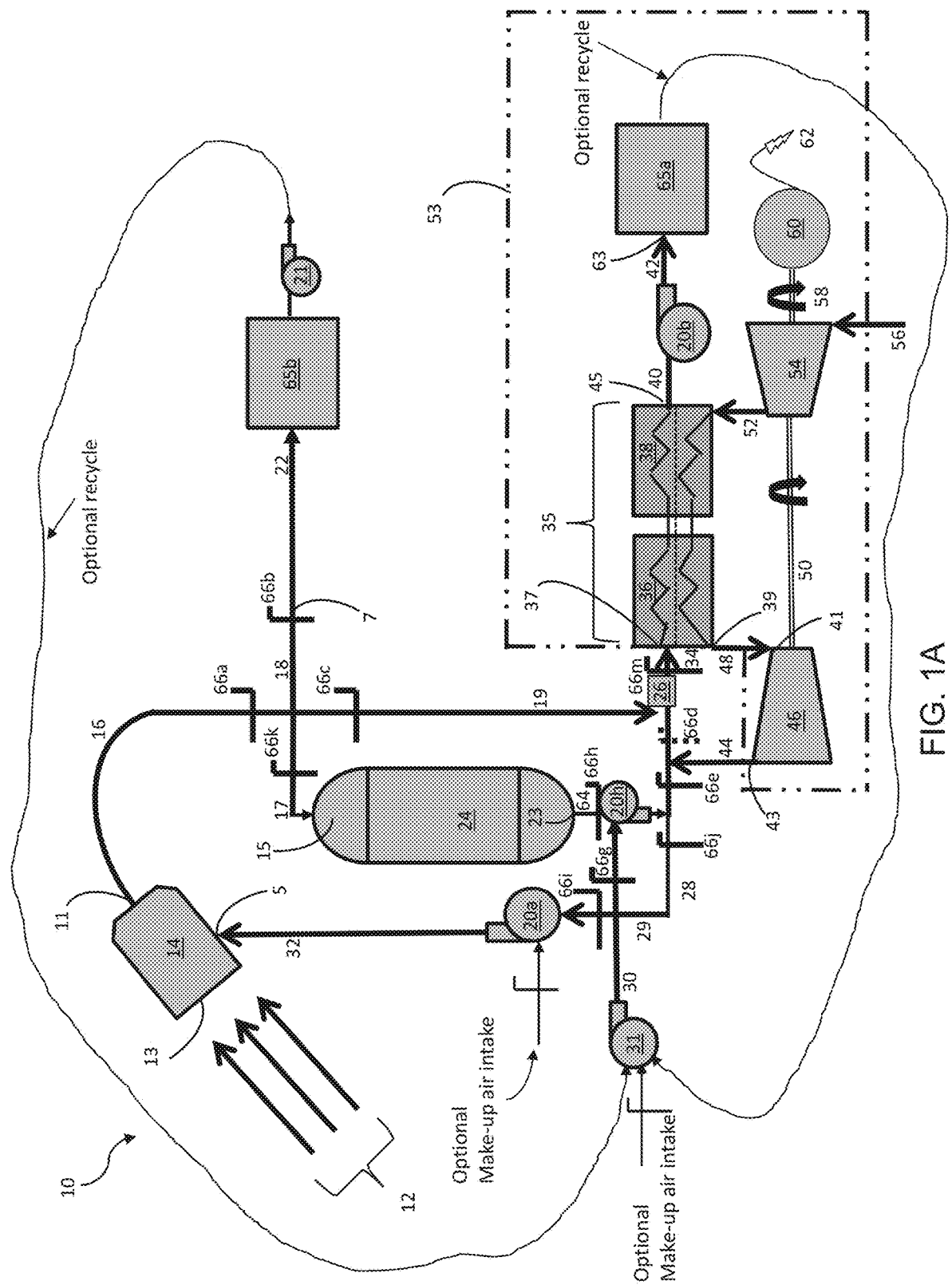
FIG. 1A shows, in accordance with certain embodiments, a schematic diagram of sunlight operation of a concentrated solar combination heating and power generation system for both heat energy production and power generation.

Systems related to concentrated solar combination heat energy production and power generation, and associated methods, are generally described. In some embodiments, the concentrated solar combination heat energy production and power generation systems include a solar receiver configured to heat a fluid at a relatively low-pressure (e.g., less than or equal to 2 atmospheres). In certain such embodiments, the working fluid that is heated is ambient air, and power generation utilizes a Brayton thermodynamic cycle system, as described in further detail below and in International Patent Application Serial No. PCT/US2011/052051, filed Sep. 16, 2011, and entitled, "Concentrated Solar Power Generation Using Solar Receivers" and International Patent Application Serial No. PCT/US2013/031627, filed Mar. 21, 2012, and entitled "Multi-Thermal Storage Unit Systems, Fluid Flow Control Devices, and Low Pressure Solar Receivers for Solar Power Systems and Related Components and Uses Thereof", both of which are incorporated herein by reference in their entirety. Alternatively, an industrial source of heated fluid (e.g., hot air or combustion gases, such as from a flue-gas stack) may be used in place of or in addition to/in parallel with the solar receiver to provide the heated fluid for use in the power generation/heat energy production system at a relatively low-pressure. The low-pressure heated fluid may then be selectively transferred (e.g., from the solar receiver or the industrial source of heated fluid) to a thermal storage system, a heat exchange system, a power generation system, and/or a heated fluid diversion outlet conduit.

The thermal storage system may be used to store sensible heat from the low-pressure heated fluid. which can be used during periods of little or no sunlight, such as during cloudy days or nighttime operation. The thermal storage system can be useful for operating the power cycle during periods of little or no sunlight, such as during nighttime operation, for example, by providing heat to the low-pressure working fluid in addition to or in place of the heat provided by the solar receiver and/or industrial source of heated fluid.

The heat exchange system may be used to transfer heat from the low-pressure heated working fluid to a compressed high-pressure fluid, which can then be used to power a turbine (e.g., a gas turbine) as part of, for example, a Brayton cycle. In some aspects, power produced by the turbine may be used, for example, to add to an electricity distribution grid and/or to power an industrial processing unit, such as a desalination system. In addition, the exhaust of the gas turbine, which may in some cases be recycled and used as (or supplement) the low-pressure heated fluid, may be selectively transferred to the thermal storage system and/or the solar receiver. Certain embodiments described herein may utilize a heat exchange unit to provide a high-pressure or a low-pressure heated fluid for industrial or residential space heating or other purposes where thermal energy is needed without including a power generation system.

Even in certain systems with power generation capabilities, for added flexibility and utility, a heated diversion outlet conduit is provided that may be configured such that at least a portion of the low-pressure heated fluid (e.g., from the solar receiver or the thermal storage unit) can be diverted away from the power generation system (e.g., the heat exchange system and turbine). The diverted heated fluid may be used to provide heat for general space heating purposes and/or to provide heat for an industrial process.

The systems described herein may also utilize a fuel-fired combustion unit that is configured to further heat (e.g., boost) the low-pressure heated fluid prior to introducing the heated first fluid to the heat exchange system for use in power generation or heat energy production. In order to increase the overall efficiency of the system, a make-up inlet conduit may also be used to introduce make-up and/or recycled fluid (e.g., from the industrial processing unit and/or the turbine exhaust, as described above) into the system. In some cases, the make-up inlet conduit may be configured to provide additional ambient air to the system, which may be useful, for example, for regulating the flow of fluid through the system.

Some embodiments may be used in coordination with solar power tower systems (also known as central tower solar power plants or heliostat solar power plants). In certain embodiments, such systems include a plurality of heliostats arranged to redirect sunlight toward the top of a collector tower, sometimes called a central tower, on which one or more solar receivers are mounted. In some embodiments, a gas turbine and/or compressor, used for power generation, can be mounted, along with the solar receiver, at the top of or otherwise within or in proximity to and operatively associated with the solar tower. In certain embodiments, other components, such as a thermal storage system can also be mounted at the top of, or within other parts of, or operatively associated with the tower. In some embodiments, provision is made for adjusting the angle of the solar receiver relative to the ground and to ground-mounted heliostats. The angle can be adjusted, in certain embodiments, based on tower height, heliostat field size and/or shape, and/or latitude.

Solar Receiver

In certain embodiments, the solar receiver described herein is also described in International Patent Application Serial No. PCT/US2011/052051, filed Sep. 16, 2011, and entitled, "Concentrated Solar Power Generation Using Solar Receivers" and International Patent Application Serial No. PCT/US2013/031627, filed Mar. 21, 2012, and entitled "Multi-Thermal Storage Unit Systems, Fluid Flow Control Devices, and Low Pressure Solar Receivers for Solar Power Systems and Related Components and Uses Thereof", which are both incorporated by reference in their entirety as mentioned above. In some embodiments, a solar receiver (e.g., low-pressure solar receiver) is provided that may be used in conjunction with systems and methods disclosed herein. The solar receiver functions, at least in part, to convert solar radiation energy to thermal energy of a working fluid (e.g., a working fluid of the system). In certain embodiments, the solar receiver comprises a fluid chamber (e.g., a low-pressure fluid chamber). In some embodiments, the solar receiver comprises a solar absorber housed within the fluid chamber. In some embodiments, the fluid chamber is designed and constructed, at least in part, to provide an insulated casing that acts to reduce or eliminate thermal losses from the solar receiver, to contain a working fluid (e.g., a low-pressure working fluid), and/or to provide a support structure for a solar absorber. According to some embodiments, the fluid chamber comprises a fluid inlet, a fluid outlet, and an opening for receiving concentrated solar radiation.

According to certain embodiments, the solar receiver comprises one or more transparent objects (e.g., individually or together forming a window(s)). In some embodiments, the transparent object defines at least a portion of a wall, which may be the outermost wall, of the fluid chamber. For example, in some embodiments, the transparent object may be positioned adjacent to the opening for receiving solar radiation. The transparent object functions, at least in part, to contain the working fluid (e.g., low-pressure working fluid), to permit solar radiation to pass into the solar receiver, where the radiation impinges the solar absorber), and to eliminate or reduce thermal losses associated with re-radiation from the solar absorber. In some cases, as described below, to reduce manufacturing and/or construction costs and/or to provide fluid gaps for providing fluid communication between the fluid chamber of the solar receiver and a surrounding environment to maintain ambient or near ambient operating pressures, the window may be segmented and formed from a plurality of adjacent transparent objects with gaps between the segments that are not fluid pressure tight.

In some embodiments, secondary concentrators are provided. The secondary concentrator may provide, at least in part, a mechanism for collecting concentrated solar radiation from a primary concentrator (e.g., a heliostat field), and directing that solar radiation into the opening of the fluid chamber. The secondary concentrator can improve the solar collection efficiency of the solar receiver. In some embodiments, the second concentrator is constructed with a plurality of reflective panels, each reflective panel typically having a reflective surface and a predetermined shape. The plurality of reflective panels are typically arranged in a configuration that facilitates reflection of incident solar radiation toward the receiver opening. In certain embodiments the secondary concentrator includes cooling pipes that function in part to deliver cooling fluid to and from a cooling passage within each reflective panel.

As mentioned above, in some embodiments, the solar receiver is designed and configured to operate at ambient or at low-pressure (e.g., less than or equal to 2 atmospheres, less than or equal to 1 atmospheres, at approximately 1 atmosphere absolute pressure). Therefore, the low-pressure components (e.g., solar receiver, fluid chamber, solar absorber, etc.) can be constructed using less material and fewer design constraints than is typically needed for solar receivers that are subjected to higher pressures, while also being relatively inexpensive to manufacture and relatively safe to operate. Moreover, the low-pressure design enables the use of relatively large (e.g., 1 meter to 5 meters in diameter) transparent objects that enable a high solar collection capacity, compared to pressurized systems in which large windows can rupture at high-pressures. Thus, according to some embodiments, the low-pressure solar receivers have a lower cost of production and a significantly larger collection capacity than currently available solar receivers.

Figure 1B:
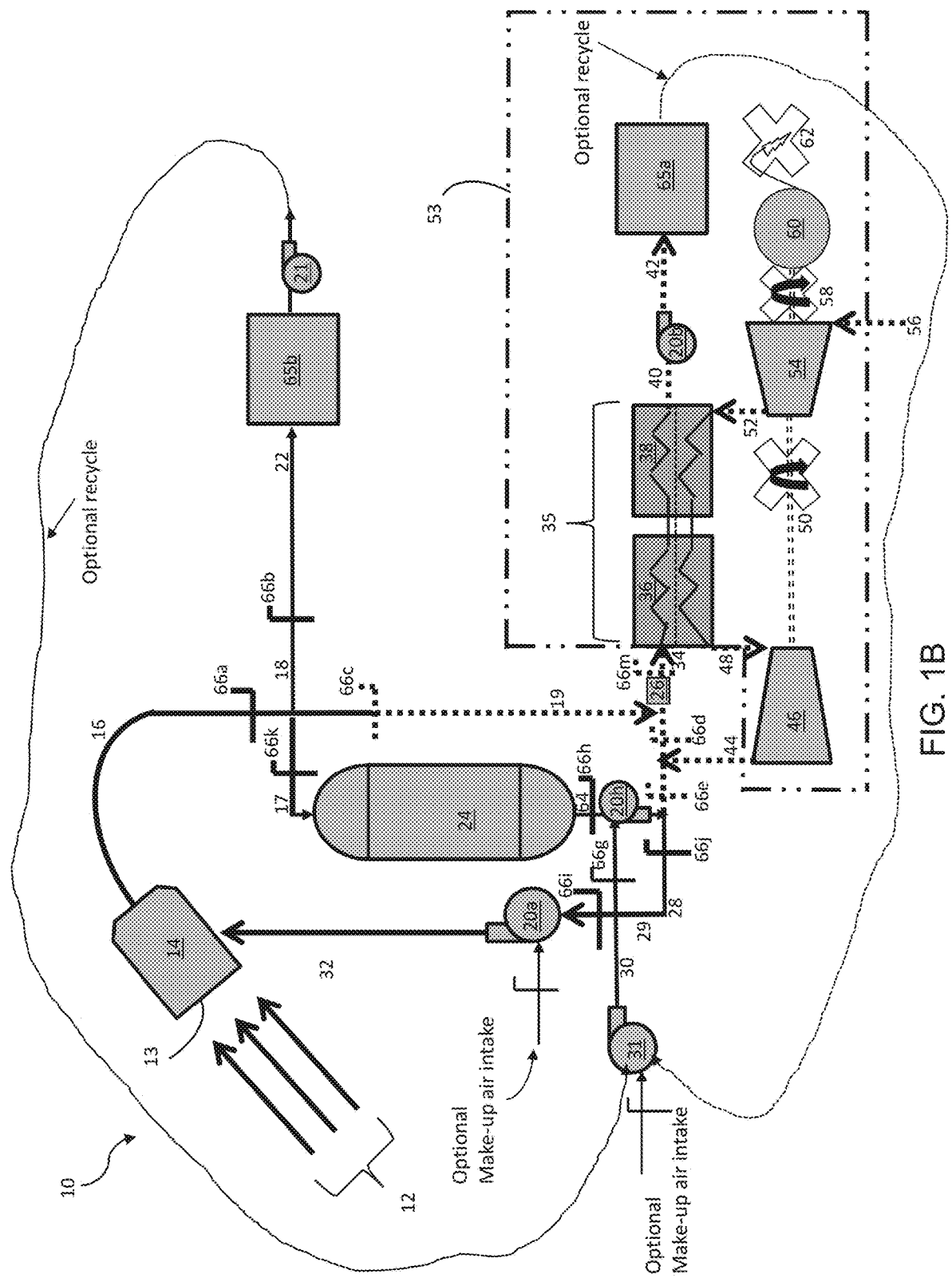
FIG. 1B shows, in accordance with certain embodiments, a schematic diagram of sunlight operation of a concentrated solar combination heating and power generation system for heat energy production only.
Figure 1C:
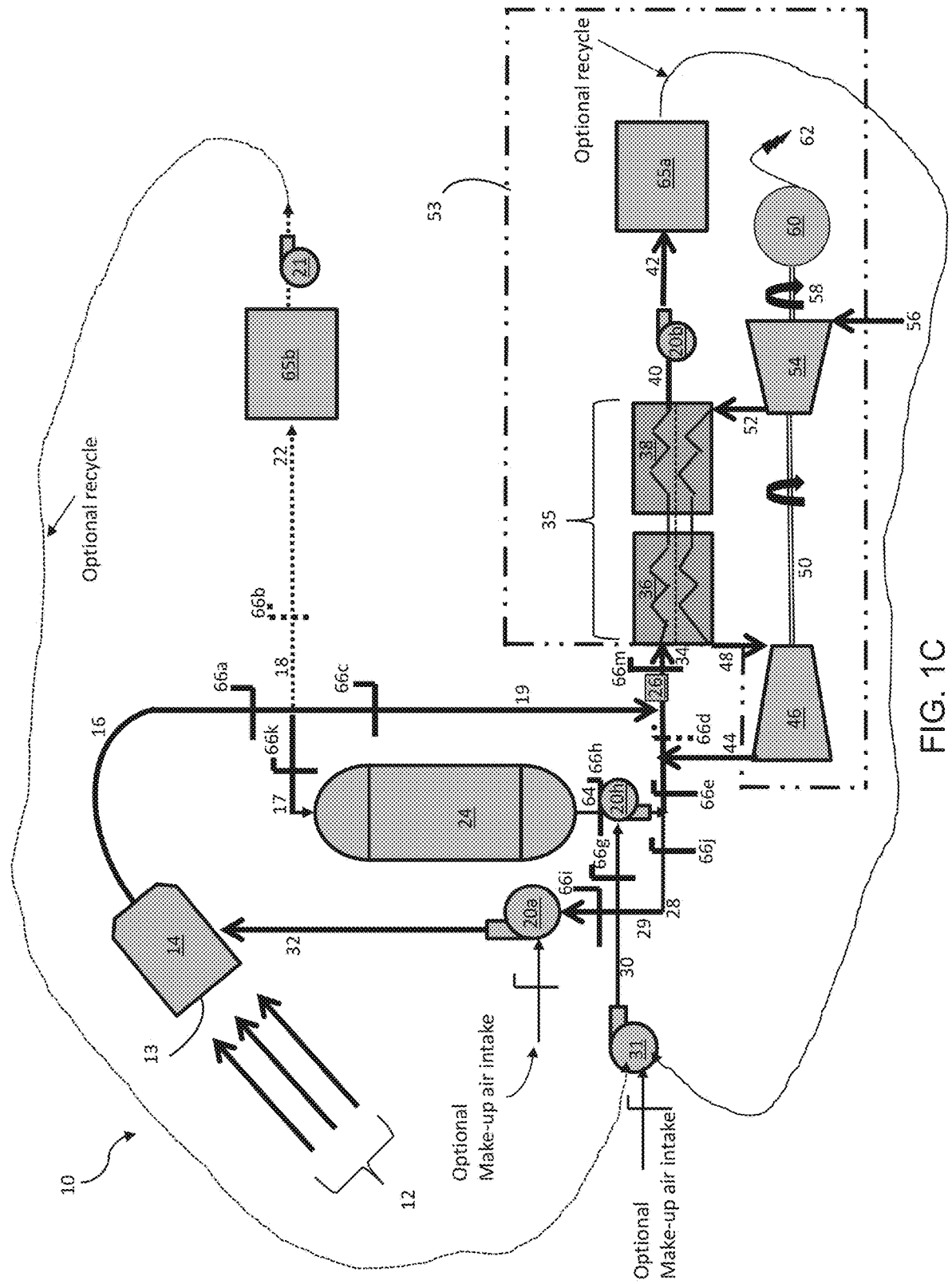
FIG. 1C shows, in accordance with certain embodiments, a schematic diagram of sunlight operation of a concentrated solar combination heat energy production and power generation system for power generation only.

FIGS. 1A-1C show, in accordance with certain embodiments, schematic diagrams of exemplary concentrated solar combination heating and power generation systems. The fluid streams in the figures can generally be divided into active streams containing a working fluid (illustrated as solid lines in the figures, such as, for example, streams 16 and 18 in FIG. 1B) and closed streams through which substantially no working fluid is being transported during the phase of operation being illustrated (illustrated as dotted lines in the figures, such as, for example, streams 28, 29, and 32 in FIG. 2A).

Concentrated Solar Radiation Producing Heated Fluid

FIG. 1A illustrates an exemplary combined power generation and heat energy production system as configured for daytime solar operation for heat and electricity. Referring to FIG. 1A, system 10 comprises solar receiver 14, which is constructed and arranged such that a least a portion of the solar receiver, such as window 13 in FIGS. 1A-1C, is exposed to incident solar radiation 12. In some embodiments, concentrated solar radiation is received, for example from one or more reflectors or heliostats, through the window and passes into the fluid chamber of the solar receiver. In certain embodiments, the concentrated solar radiation passes through the window 13 into the fluid chamber and impinges upon the solar absorber within the fluid chamber. The energy from the incident solar radiation can be used to heat a fluid within the solar receiver to produce a heated fluid (a heated first fluid). In certain embodiments, the working fluid that is heated by the solar receiver is air.

According to some embodiments, the heated fluid from the solar receiver may have any of a variety of suitable temperatures. For example, in some embodiments, the heated fluid from the solar receiver may have a temperature of greater than or equal to 200° C., greater than or equal to 300° C., greater than or equal to 400° C., greater than or equal to 500° C., greater than or equal to 600° C., greater than or equal to 700° C., greater than or equal to 800° C., greater than or equal to 900° C., greater than or equal to 1000° C., greater than or equal to 1100° C., greater than or equal to 1200° C., greater than or equal to 1300° C., or greater than or equal to 1400° C., greater than or equal to 1500° C., greater than or equal to 1600° C., greater than or equal to 1700° C., greater than or equal to 1800° C., or greater than or equal to 1900° C. In some embodiments, the heated fluid from the solar receiver has a temperature of less than or equal to 2000° C., less than or equal to 1900° C., less than or equal to 1800° C., less than or equal to 1700° C., less than or equal to 1600° C., less than or equal to 1500° C., less than or equal to 1400° C., less than or equal to 1300° C., less than or equal to 1200° C., less than or equal to 1100° C., less than or equal to 1000° C., less than or equal to 900° C., less than or equal to 800° C., less than or equal to 700° C., less than or equal to 600° C., less than or equal to 500° C., less than or equal to 400° C., or less than or equal to 300° C. Combinations of the above recited ranges are also possible (e.g., the heated fluid form the solar receiver has a temperature of greater than or equal to 200° C. and less than or equal to 2000° C., the heated fluid form the industrial source has a temperature of greater than or equal to 800° C. and less than or equal to 1000° C.). Other ranges are also possible. In certain embodiments, the heated fluid from the solar receiver may have temperatures greater than 1800° C., such as 2000° C. or more. In some such embodiments, or in any situation where a temperature of the heated fluid exceeds the safe operating limits of any equipment with which it will or may be in contact during operation of a system disclosed herein, the temperature can be adjusted (i.e., lowered) by mixing the heated fluid with a similar but lower temperature fluid (e.g., atmospheric air) (e.g. via a controllable inlet line in fluid communication with the atmosphere or other source of cooler fluid). Indeed, such mixing may be used generally used to adjust temperatures of process fluid to desired levels even in situations where the temperature may not initially exceed design or safe operating temperatures of the equipment. When any temperature or temperature range is described herein, it should be understood that it may be necessary or desirable to use the above described mixing/cooling technique to selectively reduce the temperature of the heated fluid to safe or desired levels at one or more points in the system handling the heated fluid.

In some embodiments, the solar receiver can be constructed and arranged to operate at ambient or relatively low-pressures. For example, in certain embodiments, the pressure of the fluid within the solar receiver (and/or within any fluidic pathway in direct fluid communication with the solar receiver) can be less than or equal to 2 atmospheres, less than or equal to 1.5 atmospheres, less than or equal to 1 atmosphere, or about 1 atmosphere absolute pressure. In some embodiments, the pressure of the fluid within the solar receiver is greater than or equal to 0.1 atmospheres, greater than or equal to 0.5 atmospheres, about 1 atmosphere, greater than or equal to 1 atmosphere, greater than or equal to 1.5 atmospheres. Combinations of the above recited ranges are also possible (e.g., the pressure of the fluid within the solar receiver is less than or equal to 2 atmospheres and greater than or equal to 0.1 atmospheres, the pressure of the fluid within the solar receiver is less than or equal to 1.5 atmospheres and greater than or equal to 0.5 atmospheres). Other ranges are also possible.

In some embodiments, the solar receiver can be constructed and arranged such that the fluid within the solar receiver is not compressed, with the exception of incidental compression that might occur due to the heating and/or transport of the fluid, before being transported to the solar receiver. For example, in some embodiments, the fluid within the solar receiver is substantially equal to the pressure of the surrounding environment. The reduced pressures within the solar receiver during operation can allow a "window" of the solar receiver (e.g., one or more transparent objects of the solar receiver through which sunlight passes to heat the fluid in the solar receiver) to be made significantly larger for a given thickness and weight, as compared to other relatively high-pressure solar receivers. For example, high-pressure solar receivers may be limited to a window size of no more than about 60 cm diameter, whereas a solar receiver in some embodiments described herein may have a window size up to about 150 cm or more. In some embodiments, the solar receivers have a window size of 4 meters or more. Additional details related to the design and operation of the solar receiver are described in more detail below.

As explained above, in some embodiments, the energy from the incident solar radiation can be used to heat a fluid within the solar receiver, thereby producing a heated fluid (e.g., a heated first fluid). In certain embodiments, the heated fluid may have any of a variety of suitable pressures (e.g., first pressures). For example, in some embodiments, the heated fluid has a pressure of less than 2 atmospheres. According to certain embodiments, the heated fluid has a pressure less than or equal to 1.9 atmospheres, less than or equal to 1.8 atmospheres, less than or equal to 1.7 atmospheres, less than or equal to 1.6 atmospheres, less than or equal to 1.5 atmospheres, less than or equal to 1.4 atmospheres, less than or equal to 1.3 atmospheres, less than or equal to 1.2 atmospheres, less than or equal to 1.1 atmospheres, less than or equal to 1 atmosphere, about 1 atmosphere, less than or equal to 0.9 atmospheres, less than or equal to 0.8 atmospheres, less than or equal to 0.7 atmospheres, less than or equal to 0.6 atmospheres, less than or equal to 0.5 atmospheres, less than or equal to 0.4 atmospheres, less than or equal to 0.3 atmospheres, or less than or equal to 0.2 atmospheres. In certain embodiments, the heated fluid has a pressure greater than or equal to 0.1 atmospheres, greater than or equal 0.2 atmospheres, greater than or equal 0.3 atmospheres, greater than or equal 0.4 atmospheres, greater than or equal 0.5 atmospheres, greater than or equal 0.6 atmospheres, greater than or equal 0.7 atmospheres, greater than or equal 0.8 atmospheres, greater than or equal 0.9 atmospheres, about 1 atmosphere, greater than or equal 1.0 atmospheres, greater than or equal 1.1 atmospheres, greater than or equal 1.2 atmospheres, greater than or equal 1.3 atmospheres, greater than or equal 1.4 atmospheres, greater than or equal 1.5 atmospheres, greater than or equal 1.6 atmospheres, greater than or equal 1.7 atmospheres, greater than or equal 1.8 atmospheres, or greater than or equal 1.9 atmospheres. Combinations of the above recited ranges are also possible (e.g., the heated fluid has a pressure less than or equal to 2 atmospheres and greater than or equal to 0.1 atmospheres, the heated fluid has a pressure less than or equal to 1.1 atmospheres and greater than or equal to 0.9 atmospheres). Other ranges are also possible.

In certain, non-limiting embodiments, the first fluid (e.g., heated first fluid) is air at ambient pressure.

Unless otherwise indicated, all pressures described herein refer to absolute pressures.

Industrial Source of Heated Fluid

Figure 5A:
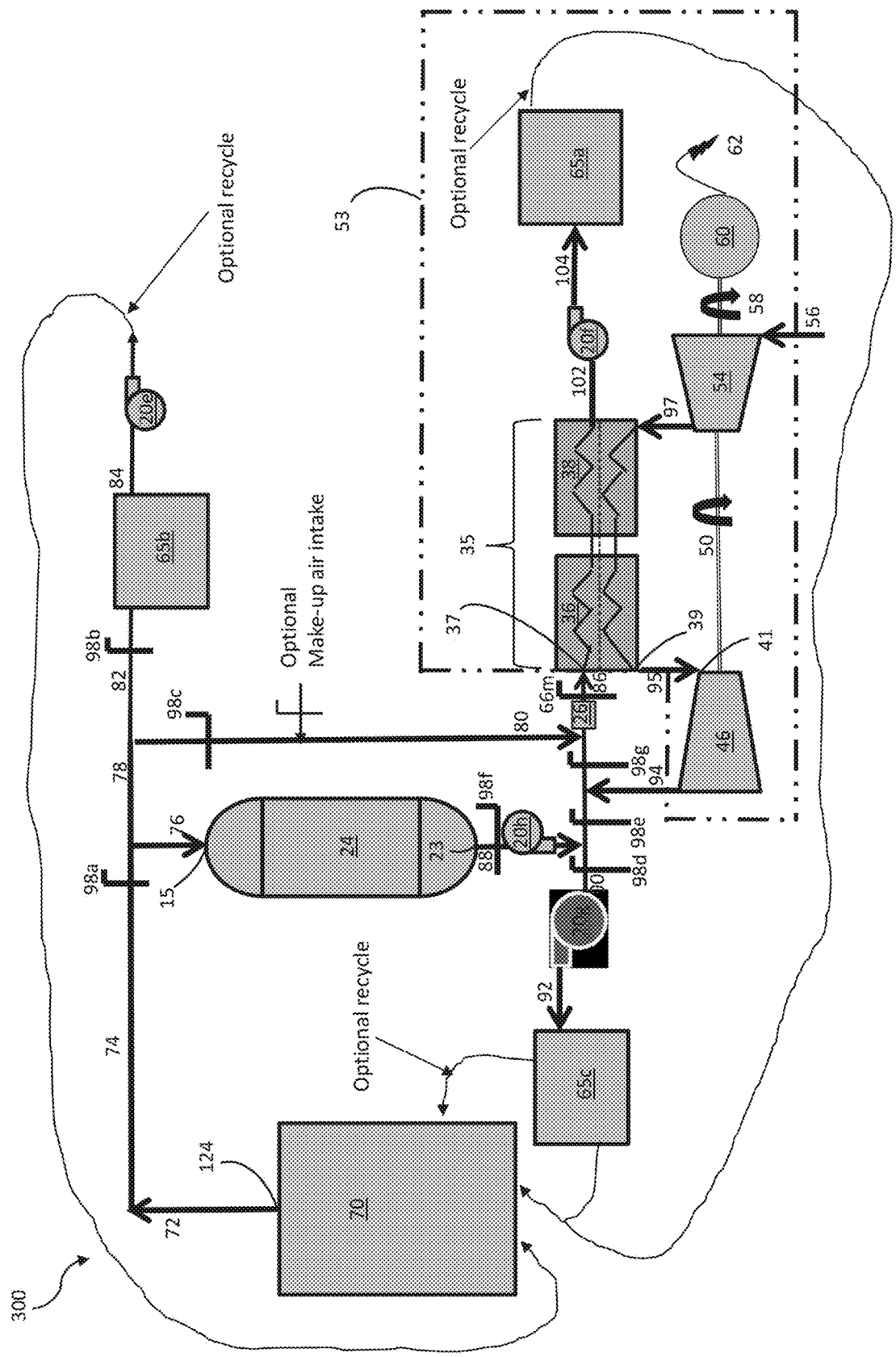
FIG. 5A shows, in accordance with certain embodiments, a schematic diagram of operation of a waste heat utilization and storage system for heat energy production and power generation.
Figure 5B:
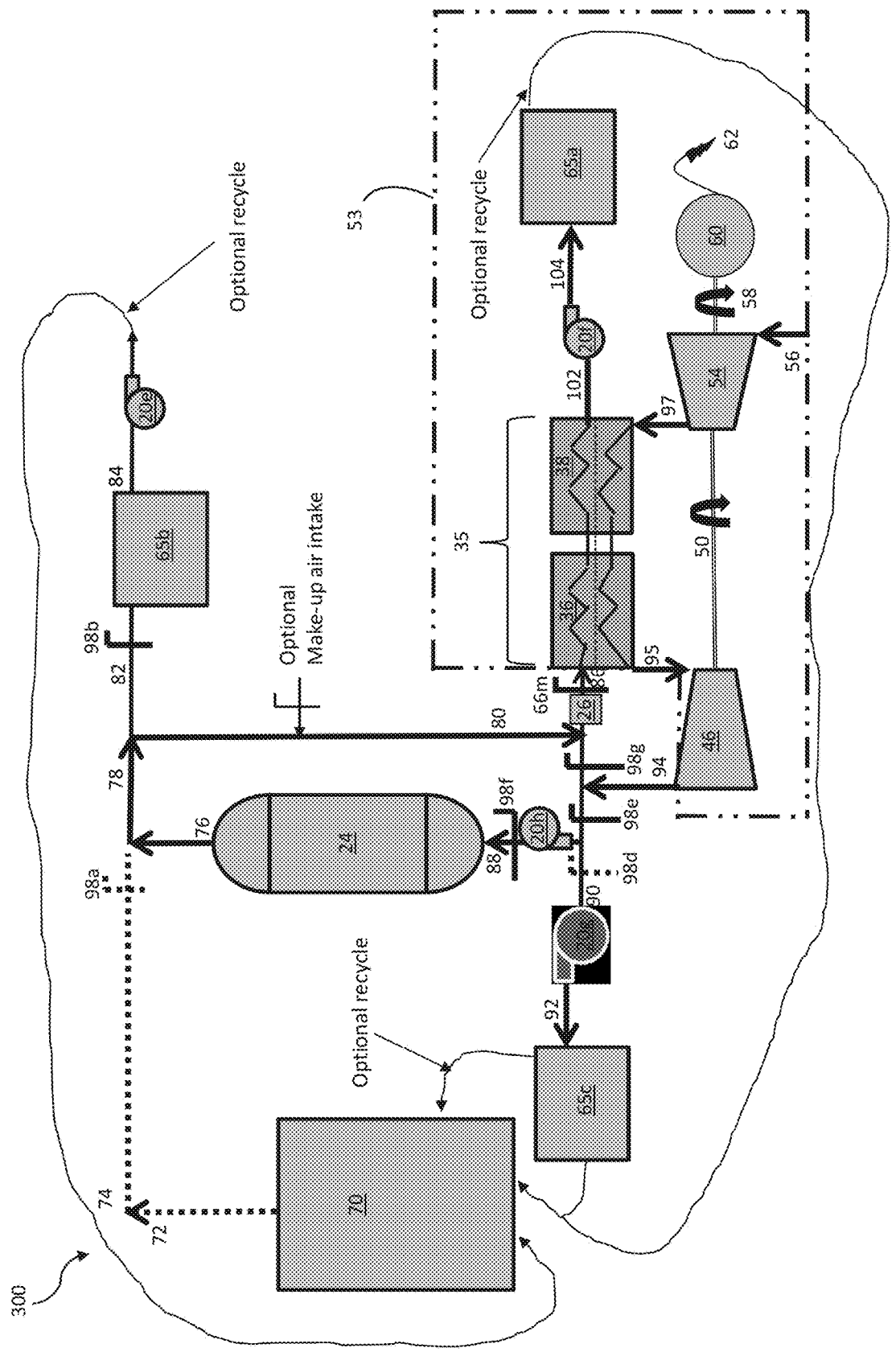
FIG. 5B shows, in accordance with certain embodiments, a schematic diagram of operation from storage of a waste heat utilization and storage system for heat energy production and power generation.

In certain embodiments, an industrial source of heated fluid is provided that may be used in conjunction with certain embodiments of systems and methods disclosed herein. In some embodiments, an industrial source heat or waste heat may be used, for example, to produce a heated fluid (e.g., via a heat exchanger in addition to or in place of heating a fluid within a solar receiver using solar radiation, as explained above). FIGS. 5A-5B show, in accordance with certain embodiments, schematic diagrams heat supply and storage systems for heating and power generation. As shown in FIG. 5A, system 300 comprises industrial source of heat or heated fluid 70.

Any of a variety of suitable industrial sources of heat or heated fluid may be provided. For example, in certain embodiments, the industrial source of heat or heated fluid is an industrial hot fluid producing system, such as a flue-gas stack, a smokestack, a chimney stack, etc. In certain such embodiments, the flue gas or other hot fluid produced by the industrial source may be used directly as the working fluid for operating the heat production and power generation capabilities of system 300. In other embodiments, the flue gas or other hot fluid produced by the industrial source may instead be used to heat another working fluid (e.g., air) used in system 300, for example via one or more heat exchangers within industrial source of heat or heated fluid 70. In yet other embodiments where industrial source of heat or heated fluid 70 produced heated solid surfaces, one or more devices may be used to heat a fluid (such as air) using the heated surfaces while cooling those surfaces, wherein the heated fluid can then be used as a working fluid for system 300 and/or to heat a working fluid for system 300 in a heat exchanger.

In some embodiments, the industrial source of heated fluid is a conventional air heating system, an infrared heating system, an induction heating system, an electrical resistance power heating system, etc. In some embodiments, the industrial source of heated fluid is an industrial heat source supplying heat to a heat exchanger to produce the heated fluid. In certain embodiments, the heated fluid (e.g., gas) from the industrial source may need to be cleaned, filtered, and/or separated prior to entering the heating and/or power generation system (e.g., to remove harmful and/or toxic fluids). Accordingly, in certain embodiments, the industrial source of heated fluid may comprise a filtration and/or separation system, such as a swing adsorption system (e.g., pressure swing adsorption system, a vacuum swing adsorption system, a temperature swing adsorption system), or a distillation system (e.g., a cryogenic distillation system).

In certain embodiments, the industrial source of heated fluid is used in combination with or as a supplement to a solar receiver, as described above.

According to some embodiments, the heated fluid from the industrial source may have any of a variety of suitable temperatures. For example, in some embodiments, the heated fluid from the industrial source may have a temperature of greater than or equal to 200° C., greater than or equal to 300° C., greater than or equal to 400° C., greater than or equal to 500° C., greater than or equal to 600° C., greater than or equal to 700° C., greater than or equal to 800° C., greater than or equal to 900° C., greater than or equal to 1000° C., greater than or equal to 1100° C., greater than or equal to 1200° C., greater than or equal to 1300° C., greater than or equal to 1400° C., greater than or equal to 1500° C., greater than or equal to 1600° C., greater than or equal to 1700° C., greater than or equal to 1800° C., or greater than or equal to 1900° C. In some embodiments, the heated fluid from the industrial source has a temperature of less than or equal to 2000° C., less than or equal to 1900° C., less than or equal to 1800° C., less than or equal to 1700° C., greater than or equal to 1600° C., less than or equal to 1500° C., less than or equal to 1400° C., less than or equal to 1300° C., less than or equal to 1200° C., less than or equal to 1100° C., less than or equal to 1000° C., less than or equal to 900° C., less than or equal to 800° C., less than or equal to 700° C., less than or equal to 600° C., less than or equal to 500° C., less than or equal to 400° C., or less than or equal to 300° C. Combinations of the above recited ranges are also possible (e.g., the heated fluid form the industrial source has temperature of greater than or equal to 200° C. and less than or equal to 2000° C., the heated fluid form the industrial source has a temperature of greater than or equal to 800° C. and less than or equal to 1000° C.). Other ranges are also possible. As described above, in certain embodiments, the heated fluid from the industrial source may have temperatures exceeding safe or desired operating temperatures, and the temperature may be adjusted (e.g., lowered) by mixing the heated fluid from the solar receiver with a lower temperature fluid (e.g., atmospheric air).

In certain embodiments, the heated fluid from the industrial source of heated fluid may have any of a variety of suitable pressures. For example, in some embodiments, the heated fluid from the industrial source has a pressure of less than 2 atmospheres. According to certain embodiments, the heated fluid form the industrial source has a pressure less than or equal to 1.9 atmospheres, less than or equal to 1.8 atmospheres, less than or equal to 1.7 atmospheres, less than or equal to 1.6 atmospheres, less than or equal to 1.5 atmospheres, less than or equal to 1.4 atmospheres, less than or equal to 1.3 atmospheres, less than or equal to 1.2 atmospheres, less than or equal to 1.1 atmospheres, about 1 atmosphere, less than or equal to 1 atmosphere, less than or equal to 0.9 atmospheres, less than or equal to 0.8 atmospheres, less than or equal to 0.7 atmospheres, less than or equal to 0.6 atmospheres, less than or equal to 0.5 atmospheres, less than or equal to 0.4 atmospheres, less than or equal to 0.3 atmospheres, or less than or equal to 0.2 atmospheres. In certain embodiments, the heated fluid form the industrial source o has a pressure greater than or equal to 0.1 atmospheres, greater than or equal 0.2 atmospheres, greater than or equal 0.3 atmospheres, greater than or equal 0.4 atmospheres, greater than or equal 0.5 atmospheres, greater than or equal 0.6 atmospheres, greater than or equal 0.7 atmospheres, greater than or equal 0.8 atmospheres, greater than or equal 0.9 atmospheres, about 1 atmosphere, greater than or equal 1.0 atmospheres, greater than or equal 1.1 atmospheres, greater than or equal 1.2 atmospheres, greater than or equal 1.3 atmospheres, greater than or equal 1.4 atmospheres, greater than or equal 1.5 atmospheres, greater than or equal 1.6 atmospheres, greater than or equal 1.7 atmospheres, greater than or equal 1.8 atmospheres, or greater than or equal 1.9 atmospheres. Combinations of the above recited ranges are also possible (e.g., the heated fluid form the industrial source has a pressure less than or equal to 2 atmospheres and greater than or equal to 0.1 atmospheres, the heated fluid form the industrial source has a pressure less than or equal to 1.1 atmospheres and greater than or equal to 0.9 atmospheres). Other ranges are also possible.

Thermal Storage Unit

In certain embodiments, the thermal storage unit described herein is also described in International Patent Application Serial No. PCT/US2011/052051, filed Sep. 16, 2011, and entitled, "Concentrated Solar Power Generation Using Solar Receivers" and International Patent Application Serial No. PCT/US2013/031627, filed Mar. 21, 2012, and entitled "Multi-Thermal Storage Unit Systems, Fluid Flow Control Devices, and Low Pressure Solar Receivers for Solar Power Systems and Related Components and Uses Thereof", which are both incorporated by reference in their entirety as mentioned above. In certain embodiments, a thermal storage system is provided that may be used in conjunction with systems and methods disclosed herein. In certain embodiments, the thermal storage system may comprise one or more thermal storage units or vessels (e.g., two thermal storage units, three thermal storage units, four thermal storage units, five thermal storage units, or more thermal storage units). According to some embodiments, the thermal storage unit(s) can enable a practical and cost-effective method to achieve thermal storage (e.g., of concentrated solar power energy) for use in generating heat and/or electricity (e.g., during hours with no or low sunlight). In some embodiments, the thermal storage unit comprises a vessel containing a thermal storage medium. In some such embodiments, the fluid heated by a solar receiver/industrial heat source flows through the thermal storage medium, and the thermal storage medium stores thermal energy derived from the heated fluid at relatively high temperatures, depending on the temperature of the fluid heated by the solar receiver/industrial heat source (e.g., at least about 900° C., at least about 1000° C., at least about 1100° C., at least about 1200° C., at least about 1300° C., at least about 1400° C., at least about 1500° C., at least about 1600° C., at least about 1700° C., at least about 1800° C., or at least about 1900° C. In some embodiments, the heated fluid from the solar receiver/industrial heat source has a temperature of less than or equal to 2000° C. or higher, as indicated by any of the temperatures or temperature ranges noted above).

Referring again to FIG. 1A, system 10 comprises thermal storage unit 24. Solar receiver 14 and the thermal storage system (e.g., thermal storage unit 24) can be fluidically interconnected, such that a relatively low-pressure fluid (e.g., the first heated fluid) can be transferred between solar receiver 14 and thermal storage unit 24. In this way, heat from the fluid heated in the solar receiver can be used to heat the media within the thermal storage system.

In certain embodiments, the thermal storage unit has fluid inlet and a fluid outlet. In some embodiments, the fluid inlet is in valved fluid communication with the fluid outlet of the fluid chamber of the solar receiver. Referring to FIG. 1A, for example, thermal storage unit 24 has fluid inlet 15 and fluid outlet 23, wherein fluid inlet 15 is in valved fluid communication with fluid outlet 11 of the fluid chamber of solar receiver 14 via streams 16 and 17.

In some embodiments, the fluid inlet of the thermal storage unit is in valved fluid communication with a fluid outlet of the industrial source of heated fluid. Referring to FIG. 5A, for example, thermal storage unit 24 has fluid inlet 15 in valved fluid communication with fluid outlet 124 of industrial source of heat or heated fluid 70 via streams 72, 74, and 76.

According to some embodiments, the thermal storage unit can be fabricated using any of a variety of materials capable of withstanding the contemplated operating temperatures and pressures, including, for example, metals (e.g., stainless steel refractory metals such as tungsten, and the like), ceramics—as materials of construction and/or thermal liners for insulation, and/or combinations thereof. In some embodiments, the thermal storage unit is configured such that it is a certified pressure vessel (e.g., ASME-certified, EN13445 certified, or a pressure vessel meeting a similar set of certification standards).

In certain embodiments, the thermal storage unit can be fabricated in sections, such that two or more of the sections may be bolted together to assemble a thermal storage unit having a desired volumetric capacity. Fabrication of the thermal storage unit in sections facilitates factory construction and transport and onsite assembly of storage units having relatively large volumetric capacity. In some configurations, sections of the thermal storage unit may be in the range of 8 feet to 16 feet in length/height and 8 feet to 16 feet in diameter. In some configurations, for example, sections of the thermal storage unit may be approximately 12 feet in length/height and 10 feet to 12 feet in diameter.

In some embodiments, individual thermal storage units can be sized to achieve relatively easy transport. For example, each thermal storage unit of a multi-unit system could be between about 2 and about 12 feet in diameter, and up to 40 feet long to enable easy shipment. The thermal storage units can be filled on site or prior to delivery to the site, which can allow for cost effective production and reduce on site construction cost and/or schedule delays.

A variety of fill media can be used in the thermal storage unit(s). The fill media can comprise a variety of materials with high heat capacities that are able to retain their structural integrity at high temperatures, such as ceramics and other refractory materials. Exemplary materials include, but are not limited to, materials comprising aluminum oxides, iron oxides, silicon oxides, and/or magnesium oxides such as sand, ceramic pellets, fire brick, mullite, magnetite, PYRO GRAN 35/38, PYRO KOR 60NR, PYRO KOR 95NK, and/or PYROFER 70. In some embodiments, the thermal storage media has a heat capacity of at least about 600 J/kg K, at least about 800 J/kg K, or at least about 900 J/kg K. It can be advantageous, in some embodiments, to use materials with relatively low densities (e.g., less than about 5 g/cm$^3$, less than about 3 g/cm$^3$, or less than about 2 g/cm$^3$).

The thermal storage media within the thermal storage unit(s) can be of any suitable form factor and size. For example, pellets (e.g., substantially spherical pellets or pellets with any of the shapes described below) with maximum cross-sectional diameters in mm, cm, or larger length scales can be used as the thermal storage media, in some instance. In some embodiments, the thermal storage media can comprise pellets, and at least about 50%, at least about 75%, at least about 90%, at least about 95%, or at least about 99% of the pellets have maximum cross-sectional diameters of less than about 100 cm, less than about 10 cm, less than about 1 cm, between about 1 mm and about 100 cm, or between about 1 cm and about 100 cm. Suitable pellet shapes include, but are not limited to, shapes that are substantially rectangular prisms (e.g., bricks, substantially rectangular or cubic shapes), substantially triangular prisms, substantially spherical shapes, bow ties, honeycombs, saddles, and the like. In one set of embodiments, the thermal storage media is in the form of elongated tubes through which heated fluid is transported.

In certain embodiments, the thermal storage media within the thermal storage unit(s) can be selected such that a step-function change in temperature does not occur during operation. That is to say, in such systems, the temperature profile of thermal storage media, when plotted linearly as a function of the distance along which fluid is transported through the thermal storage unit(s) exhibits non-step-function behavior. In certain such embodiments, one end of the thermal storage unit (e.g., an inlet region) would be at a relatively high temperature while the other end of the thermal storage unit (e.g., an outlet region) would be at a relatively cooler temperature, with a non-step function change in temperature (e.g., a linear change in temperature, a concave up change in temperature, or a concave down change in temperature) in between. Such profiles can be achieved, for example, by using thermal storage media with relatively low thermal conductivities, such as ceramics.

In some embodiments, the interior of the thermal storage unit(s) can be lined with a thermally insulating material and/or the outside of the thermal storage unit(s) can be covered with a thermally insulating material to reduce heat loss to the atmosphere. For example, when the tank is manufactured out of metal, the tank can be lined with and/or covered with a refractory material (e.g., ceramics such as alumina, silica, magnesia, and the like). In some embodiments, the refractory material can be cast in place and/or can comprise a multi-layered structure in which the density and/or heat capacity can vary from layer to layer. In some embodiments, the thickness of the thermally insulating lining within the unit(s) can be between about 5 inches and about 15 inches (e.g., for a tank with a diameter up to 12 feet and a length of up to 40 feet). In some embodiments, the thickness of the thermally insulating material on the exterior of the thermal storage unit(s) can be up to 1 foot or up to 2 feet in thickness.

In certain embodiments, the system may comprise multiple thermal storage systems (each of which can include one or more thermal storage units). In some such embodiments, a first thermal storage system can be used to store sensible heat provided by the solar receiver, while a second thermal storage system can be used to provide a heated fluid to the power generation system. The first thermal storage system, for example, can be operated at a pressure near or below atmospheric pressure, while the second thermal storage system can be operated at an elevated pressure. By operating the system in this way, one can eliminate the need for a heat exchange system that must exchange heat between a pressurized fluid and a non-pressurized fluid. In operation, a first thermal storage system or unit can be heated at low-pressure or atmospheric pressure by a working fluid heated by a solar receiver until it is fully charged. At that point, it may be placed in fluid communication with a higher-pressure working fluid system used for power generation to provide heat to generate power—see, for example, the discussion below. Meanwhile, a second thermal storage unit or system which had been serving such purpose but has cooled to the point of being spent can be placed in fluid communication with the solar receiver and recharged/reheated by the low-pressure working fluid heated by the solar receiver. Operating the system in this manner can ensure that a stored heat source is always available for providing a heated fluid to the power generation system. Thus, in some embodiments, substantially continuous operation of the power generation system can be achieved without (or as a supplement to) directly exchanging heat between a high-pressure fluid and a low-pressure fluid—as is described in the context of systems 10 and 300 as illustrated and discussed further immediately below.

Heat Exchange System

In certain embodiments, the heat exchange system described herein is also described in International Patent Application Serial No. PCT/US2011/052051, filed Sep. 16, 2011, and entitled, "Concentrated Solar Power Generation Using Solar Receivers" and International Patent Application Serial No. PCT/US2013/031627, filed Mar. 21, 2012, and entitled "Multi-Thermal Storage Unit Systems, Fluid Flow Control Devices, and Low Pressure Solar Receivers for Solar Power Systems and Related Components and Uses Thereof", which are both incorporated by reference in their entirety as mentioned above. According to certain embodiments, a heat exchange system is provided that may be used in conjunction with systems and methods disclosed herein. The heat exchange system may be configured, in some embodiments, to transfer heat from a relatively low-pressure fluid stream (e.g., the heated first fluid having a first pressure) to a relatively high-pressure fluid stream (e.g., a compressed second fluid having a higher second pressure).

In certain embodiments, the second pressure of the heated second fluid is greater than or equal to 2 atmospheres, greater than or equal to 5 atmospheres, greater than or equal to 10 atmospheres, greater than or equal to 15 atmospheres, greater than or equal to 20 atmospheres, greater than or equal to 25 atmospheres, greater than or equal to 30 atmospheres, greater than or equal to 35 atmospheres, greater than or equal to 40 atmospheres, or greater than or equal to 45 atmospheres. In some embodiments, the heated second fluid has a pressure of less than or equal to 50 atmospheres, less than or equal to 45 atmospheres, less than or equal to 40 atmospheres, less than or equal to 35 atmospheres, less than or equal to 30 atmospheres, less than or equal to 25 atmospheres, less than or equal to 20 atmospheres, less than or equal to 15 atmospheres, less than or equal to 10 atmospheres, or less than or equal to 5 atmospheres. Combinations of the above recited ranges are also possible (e.g., the heated second fluid has a pressure of greater than or equal to 2 atmospheres and less than or equal to 50 atmospheres, the heated second fluid has a pressure of greater than or equal to 20 atmospheres and less than or equal to 30 atmospheres). Other ranges are also possible.

Figure 4A:
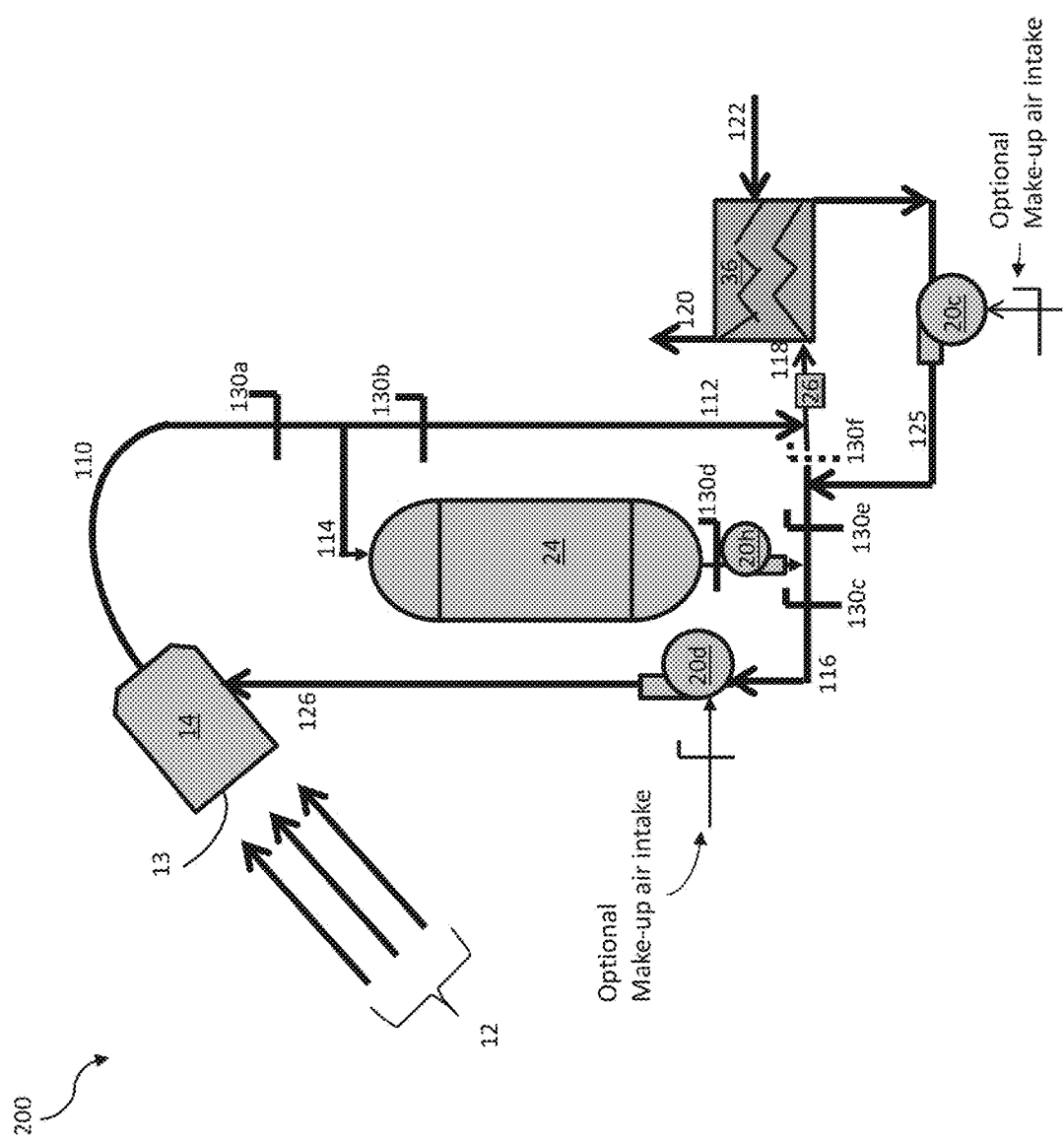
FIG. 4A shows, in accordance with certain embodiment, a schematic diagram of sunlight operation of a concentrated solar heating system.

According to certain embodiments, the heat exchange system comprises at least a first heat exchanger. In some embodiments, the heat exchange system may comprise more than one heat exchanger (e.g., two, three, four, five, or more heat exchangers). In certain embodiments, for example, the heat exchange system comprises a second heat exchanger positioned in series with a first heat exchanger. Referring to FIG. 1A, for example, heat exchange system 35 comprises a first heat exchanger 36 and second heat exchanger 38 positioned in series. It should be understood, however, that in some embodiments, the heat exchange system may comprise only one heat exchanger or more than two heat exchangers positioned in series, parallel, or in a series-parallel combination. Referring to FIG. 4A, for example, heat exchange system 35 comprises a single heat exchanger 36. In certain embodiments, one or more of the heat exchangers may be a gas-gas recuperator.

In some embodiments, the heat exchange system is positioned downstream of the solar receiver and the thermal storage unit. Referring to FIG. 1A, for example, heat exchange system 35 is positioned downstream of solar receiver 14 and thermal storage unit 24. In certain embodiments, the heat exchange system is positioned downstream of the industrial source of heated fluid and the thermal storage unit. Referring to FIG. 5A, for example, heat exchange system 35 is positioned downstream of industrial source of heat or heated fluid 70 and thermal storage unit 24.

According to certain embodiments, the heat exchange system has an inlet in valved fluid communication with the fluid outlet of the fluid chamber of the solar receiver and in valved fluid communication with the fluid outlet of the thermal storage unit. For example, referring to FIG. 1A, heat exchange system 35 has inlet 37 in valved fluid communication with fluid outlet 11 of the fluid chamber of solar receiver 14 via streams 16, 19, and 34 and in valved fluid communication with fluid outlet 23 of thermal storage unit 24 via streams 64, 28, and 34 and blower 20h. In this way, heat exchange system 35 may be configured to receive a heated first fluid selectively from either or both of the fluid chamber of solar receiver 14 and thermal storage unit 24. For example, in certain embodiments, heat exchange system 35 may receive a heated first fluid from the fluid chamber of solar receiver 14 via streams 16, 19, and 34. In some embodiments, heat exchange system 35 receives a heated first fluid from thermal storage unit 24 via streams 64, 28, and 34. In the illustrated embodiment, heat exchange system 35 may also receive a heated first fluid from both the fluid chamber of solar receiver 14 via streams 16, 19, and 34 and thermal storage unit 24 via streams 64, 28, and 34, with fluid motive force provided by any one or more of blowers 20a, 20b, or 31.

In addition, system 10 may be configured to selectively switch between which source (e.g., the fluid chamber of the solar receiver and/or the thermal storage unit) delivers the heated first fluid to the heat exchange system. For example, in some embodiments, heat exchange system 35 may first receive the heated first fluid from only the fluid chamber of solar receiver 14 (by, for example, having damper 66a and damper 66c in an open position and damper 66d in a closed position), followed by receiving the heated first fluid from only thermal storage unit 24 (by, for example, having damper 66a and damper 66c in a closed position and damper 66d in an open position). As used herein, the term "damper" generally refers to any type of suitable valve, plate, or other removable or adjustable flow restriction device able to selectively permit and prevent, and in certain embodiments regulate the flow rate of, a flow of air or other gas or fluid inside a duct, chimney, variable air volume (VAV) box, air handler, pipe or other air/fluid-handling equipment. In some other embodiments, heat exchange system 35 may first receive the heated first fluid from only thermal storage unit 24, followed by receiving the heated first fluid from only the fluid chamber of solar receiver 14. In yet another embodiment, heat exchange system 35 may first receive the heated first fluid from both the fluid chamber of solar receiver 14 and thermal storage unit 24, followed by receiving the heated first fluid from only the fluid chamber of solar receiver 14 or thermal storage unit 24.

Figure 2A:
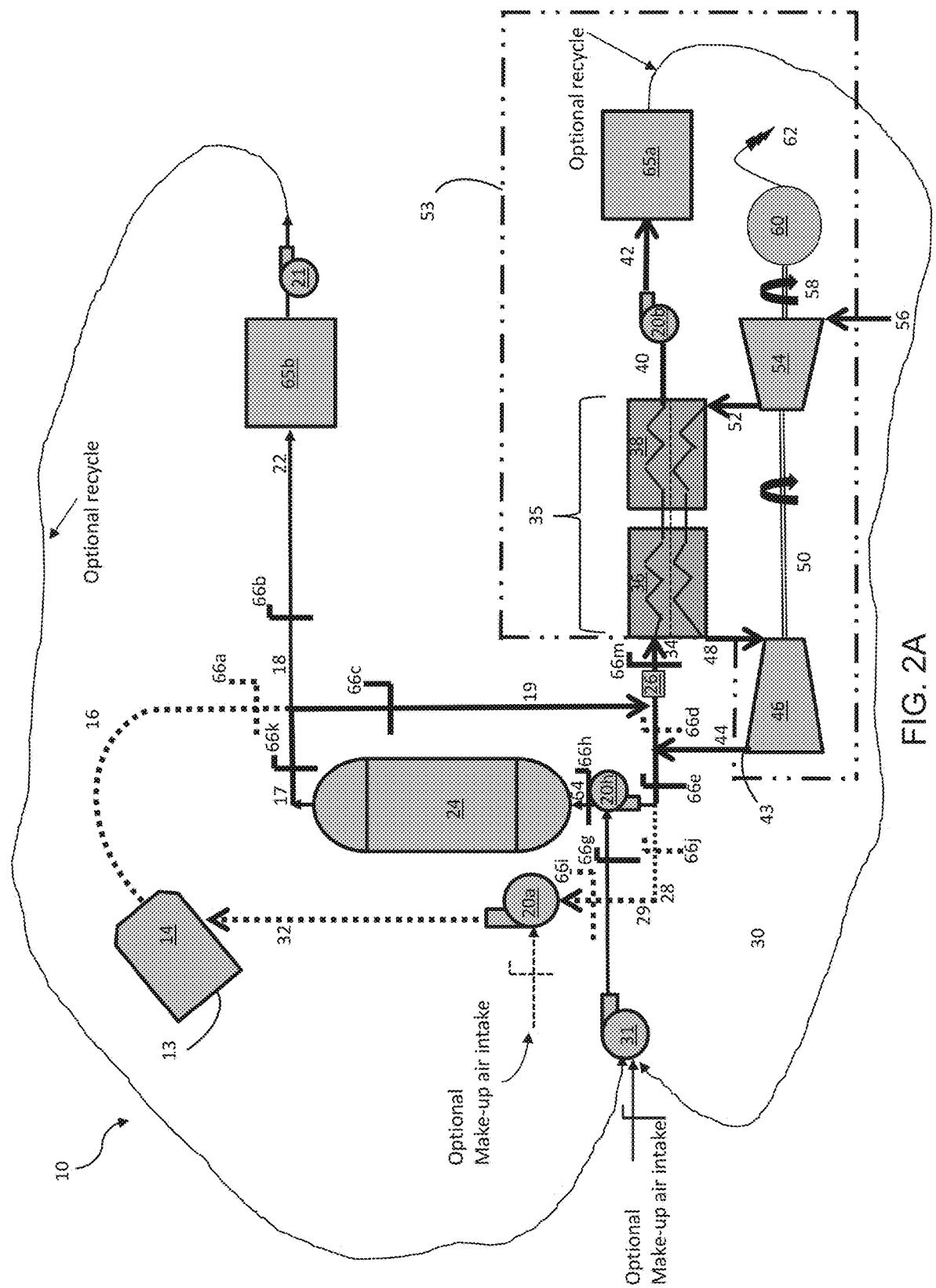
FIG. 2A shows, in accordance with certain embodiments, a schematic diagram of operation from storage of a concentrated solar combination heat energy production and power generation system for both heat energy production and power generation.

According to some embodiments, during hours of no or low sunlight (e.g., nighttime), the heat exchange system may be configured to receive the heated first fluid from storage (e.g., the thermal storage unit). FIG. 2A shows, in accordance with certain embodiments, a schematic diagram of operation from storage of a concentrated solar combination heating and power generation system for both heating and power generation. Referring to FIG. 2A, in conditions when solar receiver does not receive incident solar radiation, damper 66a can be closed so substantially no fluid is transported through the solar receiver 14 and stream 16. In some such embodiments, heat exchange system 35 instead receives a heated first fluid circulated through thermal storage unit 24 via streams 17, 19, and 34, with fluid motive force provided by blower 20b and/or blower 31.

According to certain embodiments, the heat exchange system has an inlet in valved fluid communication with the fluid outlet of the industrial source of heated fluid and in valved fluid communication with the fluid outlet of the thermal storage unit. For example, referring to FIG. 5A, heat exchange system 35 has inlet 37 in valved fluid communication with fluid outlet 124 of industrial source of heat or heated fluid 70 via streams 72, 74, 78, 80, and 86 and an inlet in valved fluid communication with fluid outlet of thermal storage unit 24 via streams 88, 90, and 86. In this way, heat exchange system 35 may be configured to receive a heated first fluid selectively from either or both of industrial source of heat or heated fluid 70 and thermal storage unit 24. For example, in certain embodiments, heat exchange system 35 may receive a heated first fluid from industrial source of heat or heated fluid 70 via streams 72, 74, 78, 80, and 86. In some embodiments, heat exchange system 35 receives a heated first fluid from thermal storage unit 24 via streams 88, 90, and 86. According to some embodiments, heat exchange system 35 receives a heated first fluid from both the industrial source of heat or heated fluid 70 via streams 72, 74, 78, 80, and 86 and thermal storage unit 24 via streams 88, 90, and 86. Either or both of optional blowers 20g and 20f can be used to provide the motive force to circulate the first fluid. In some embodiments, for example, optional blower 20f may provide the motive force to provide heat to power industrial processing unit 65a from heat exchange system 35 via streams 102 and 104. In certain embodiments, system 300 may also comprise optional streams 82 and 84 and blower 20e, which may, for example, be configured to recover heat from industrial source of heat or heated fluid 70 via streams 72, 74, and 78. In some such embodiments, the recovered heat from industrial source of heat or heated fluid 70 at stream 84 may be used for general space heating purposes and/or to provide heat for an industrial process, such as industrial processing unit 65b. In some embodiments, a heat recovery process may be built into industrial source of heat or heated fluid 70. System 300 may also comprise, in some embodiments, industrial processing unit 65c, which may be powered, for example, using heat from industrial source of heat or heated fluid 70 via streams 72, 74, 78, 80, 90, and 92 (and/or 72, 74, 76, heat storage unit 24, 88, 90, and 92 if a lower temperature stream is desired) via optional blower 20g. In certain embodiments, the exhaust of turbine 46 (e.g., an expanded substantially unpressurized exhaust) may be supplied to industrial processing unit 65c via streams 94, 90, 92, and blower 20g.

In addition, system 300 may be configured to selectively switch between which source (e.g., the industrial source of heated fluid and/or the thermal storage unit) delivers the heated first fluid to the heat exchange system. For example, in some embodiments, heat exchange system 35 may first receive the heated first fluid from only the industrial source of heat or heated fluid 70, followed by receiving the heated first fluid from only thermal storage unit 24. In some other embodiments, heat exchange system 35 may first receive the heated first fluid from only thermal storage unit 24, followed by receiving the heated first fluid from only industrial source of heat or heated fluid 70. In yet another embodiment, heat exchange system 35 may first receive the heated first fluid from both industrial source of heat or heated fluid 70 and thermal storage unit 24, followed by receiving the heated first fluid from only industrial source of heat or heated fluid 70 or thermal storage unit 24.

According to some embodiments, during hours when the industrial source of heated fluid may not be operated, the heat exchange system may be configured to receive the heated first fluid from storage (e.g., the thermal storage unit). Referring to FIG. 5B, when industrial source of heat or heated fluid 70 is not operated, damper 98a can be closed so substantially no fluid is transported through streams 72 and 74. In some such embodiments, heat exchange system 35 is configured to receive a heated first fluid from thermal storage unit 24 via streams 76, 78, 80, and 86.

In some embodiments, at least one heat exchanger in the heat exchange system can be configured such that the heat exchange simultaneously contains the heated first fluid having a first pressure and the second fluid having a higher second pressure, which may, in certain embodiments involve simultaneous (e.g., countercurrent) flow of the first and second fluids through the heat exchange unit (e.g., in fluidically separate but thermally communicating flow paths within the heat exchangers). For example, in some embodiments, at least one heat exchanger in the heat exchange system comprises a first inlet through which the heated first fluid having a first pressure (e.g., gas at a relatively low-pressure, for example, of less than or equal to 2 atmospheres) is transported into and through the heat exchanger and a second inlet through which a second gas at a relatively high-pressure (e.g., above 2 atmospheres) is simultaneously transported into and through the heat exchanger. By configuring one or more heat exchangers in this manner, the efficiency and rate of heat transferred from the heated first fluid having a first pressure to the second fluid (e.g., having a second pressure) can be enhanced, relative to situations (e.g., as described above in the context of use of thermal storage units as heat exchangers for both the first (low-pressure) fluid circuit and the second (high pressure) fluid circuit) in which the first and second fluids are transported subsequently through the heat exchanger (e.g., due to heat dissipation from the heat exchange unit during the period between fluid flow). Heat exchange system 35 may be configured to operate in countercurrent or co-current mode (i.e. with first fluid and second fluid flow within the heat exchanger(s) in the opposite or same directions, respectively).

In some embodiments, one or more of the heat exchangers used to transfer heat from the heated first fluid to the second fluid can be a rotary heat exchanger (e.g., a ceramic rotary recuperator). Suitable rotary heat exchangers may be in the form of a rotary regenerator such as one or more of those described, for example, in U.S. Pat. No. RE37134, issued on Apr. 17, 2001, filed Mar. 25, 1995, entitled "Heat Exchanger Containing a Component Capable of Discontinuous Movement"; U.S. Publication No. 2007/0089283, published on Apr. 26, 2007, filed Oct. 17, 2006, entitled "Intermittent Sealing Device and Method"; U.S. Publication No. 2008/

0251234, published on Oct. 16, 2008, filed Apr. 16, 2007, entitled "Regenerator Wheel Apparatus"; U.S. Publication No. 2009/0000761, published on Jan. 1, 2009, filed Jun. 29, 2007, entitled "Regenerative Heat Exchanger with Energy-Storing Drive System"; U.S. Publication No. 2009/0000762, published on Jan. 1, 2009, filed Jun. 29, 2007, entitled "Brush-Seal and Matrix for Regenerative Heat Exchanger and Method of Adjusting Same"; and U.S. Publication No. 2006/0054301, published on Mar. 16, 2006, filed Dec. 16, 2004, entitled "Variable Area Mass or Area and Mass Species Transfer Device and Method."

Ceramic rotary heat exchangers can be capable of operating at relatively high temperatures (e.g., up to at least about 1200° C. in some cases), which can allow one to generate higher temperatures within the solar receiver and energy storage systems to supply the higher temperature second gas to power the gas turbine, thereby increasing system efficiency. The heat exchange system described herein is not limited to the use of rotary heat exchangers, and, in some embodiments, one or more of the heat exchangers (e.g., the heat exchangers used to transfer heat energy from the heated first fluid to the second fluid) can be any of a wide variety of suitable heat exchanger configurations, including, but not limited to, a plate heat exchanger, a tube heat exchanger (e.g., a shell and tube heat exchanger), and the like.

In some embodiments, at least one of the heat exchangers can be a metallic heat exchange unit. In certain embodiments, the first heat exchanger and any subsequent heat exchangers (e.g., the second heat exchange unit, the third heat exchange unit, etc.) may be different types. For example, in some embodiments, the first heat exchange unit (e.g., first heat exchanger 36 in FIG. 1A) may be a ceramic heat exchange unit (e.g., a ceramic rotary heat exchange unit, a ceramic plate heat exchange unit, a ceramic tube heat exchange unit, etc.), while the second heat exchanger (e.g., second heat exchanger 38 in FIG. 1A) may be a metallic heat exchanger. In some embodiments, the heated first fluid can be transported to a first ceramic heat exchanger (e.g., first heat exchanger 36 in FIG. 1A) (where a relatively high maximum temperature might be observed), and subsequently transported to a metallic heat exchange unit (e.g., second heat exchanger 38 in FIG. 1A) (where the maximum temperature might be lower than that observed in the ceramic heat exchanger).

In some embodiments, the system may comprise a heat exchanger that is configured to be operated at very high temperatures. For example, in some embodiments, the system can include one or more heat exchangers (e.g., first heat exchanger 36 and/or second heat exchanger 38 in FIG. 1A) that can be operated above temperatures of 800° C. and in some embodiments at temperatures of up to 1000° C. or more. In some embodiments, the system can include one or more heat exchangers that can be operated at temperatures of up to 1100° C. or even to 1400° C. or more. High temperature heat exchangers can comprise one or more materials configured to withstand high temperature operation including, for example, one or more ceramics (e.g., aluminum oxides, iron oxides, silicon oxides, magnesium oxides, etc.). In some embodiments, the heat exchanger can comprise one or more metals (e.g., a super alloy such as those comprising nickel, chromium, titanium, tungsten, molybdenum, tantalum, columbium, and the like, including any of the super alloys described elsewhere herein. As specific examples, all or part of a high temperature heat exchanger can be formed of Alloy 230®, Alloy 214®, and/or Alloy 556® from Haynes International.

Figure 4B:
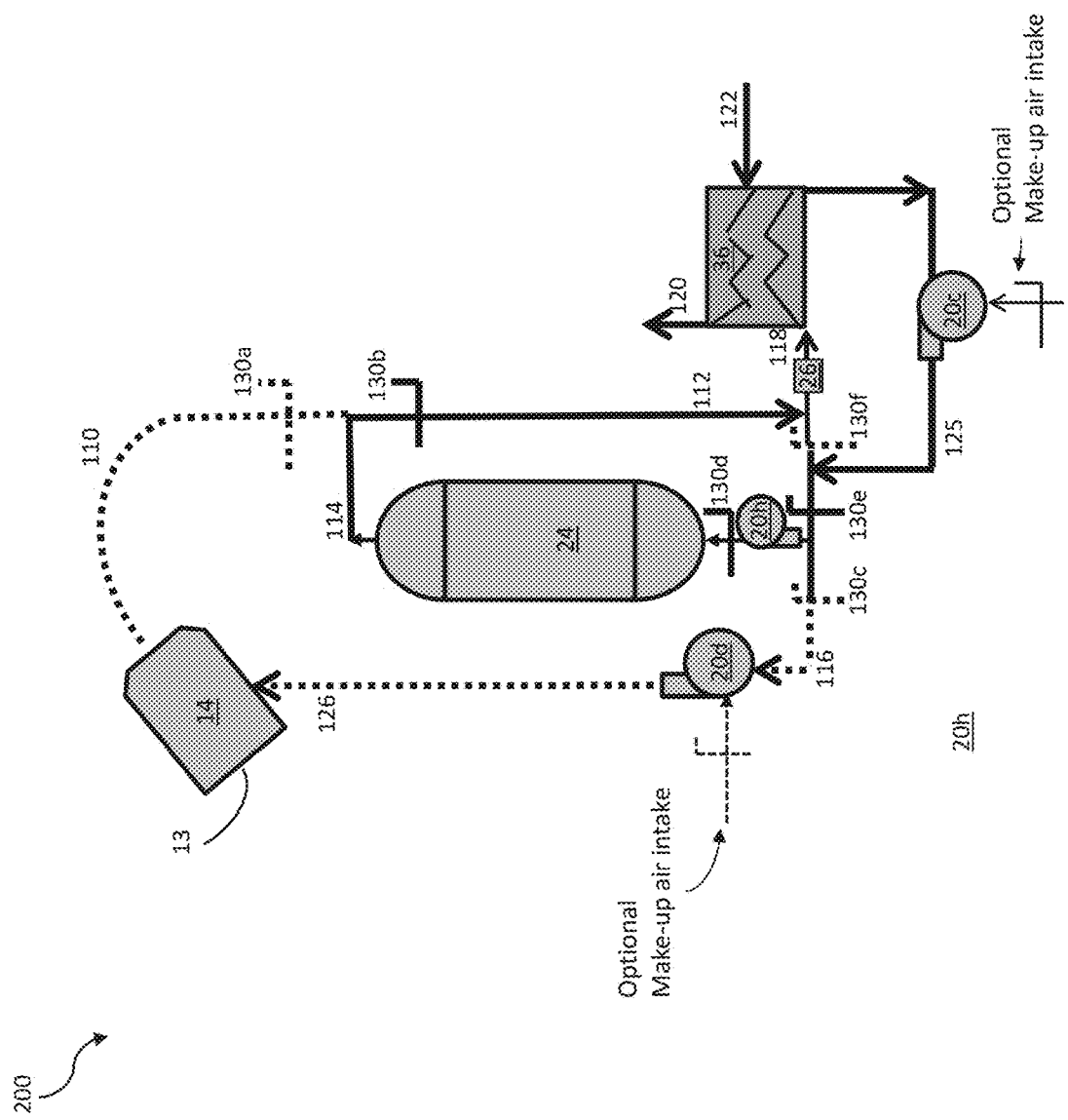
FIG. 4B shows, in accordance with certain embodiments, a schematic diagram of operation from storage of a concentrated solar heating system.

In some embodiments, the heat exchange system may be configured as a component of a power generation system (e.g., in conjunction with one or more turbines). Referring to FIG. 1A, for example, system 10 comprises heat exchange system 35 and turbine 46 in fluid communication with and downstream of fluid outlet 39 of heat exchange system 35. In some other embodiments, however, the heat exchange system may be included in the overall system without being incorporated into a power generation system. For example, FIG. 4A shows, in accordance with certain embodiments, a schematic diagram of sunlight operation of a concentrated solar heating system (e.g., without a power generation system). As shown in FIG. 4A, system 200 comprises heat exchanger 36, but FIG. 4A does not comprise a compressor or turbine. In some embodiments, for example, incident solar radiation 12 may be used to heat a fluid within the fluid chamber of solar receiver 14 to provide a heated fluid. In certain embodiments, the heated fluid may then be flowed through streams 110 and 114 to thermal storage unit 24, and/or via streams 110, 112, and 118 (e.g., with dampers 130a and 130b open), to heat exchanger 36 (e.g., air-to-air heat exchange unit, air-to-water/steam heat exchange unit). According to certain embodiments, it may be advantageous, in some embodiments, to operate a concentrated solar heating system from storage during periods of little or no sunlight (e.g., nighttime). FIG. 4B shows, in accordance with certain embodiments, a schematic diagram of operation from storage of a concentrated solar heating system. As shown in FIG. 4B, a first heated fluid may be flowed through streams 114, 112, and 118, to heat exchanger 36. Optional blower 20c may be provided, along stream 125, to provide the motive force to flow the first heated fluid. In addition, optional blower 20d may be provided (see FIG. 4A), which may be configured to feed the low-pressure fluid (e.g., the heated first fluid having a first pressure) exiting the heat exchange system to the fluid chamber of solar receiver 14 via streams 125, 116, and 126. In certain embodiments, during either daytime (e.g., FIG. 4A) or nighttime (e.g., FIG. 4B) operation, stream 122 may be used to flow air or water into heat exchanger 36, and stream 120 may be used to produce a heated second fluid, which may be used for general space heating purposes and/or to provide heat for an industrial process.

Power Generation System

In certain embodiments, the power generation system described herein is also described in International Patent Application Serial No. PCT/US2011/052051, filed Sep. 16, 2011, and entitled, "Concentrated Solar Power Generation Using Solar Receivers" and International Patent Application Serial No. PCT/US2013/031627, filed Mar. 21, 2012, and entitled "Multi-Thermal Storage Unit Systems, Fluid Flow Control Devices, and Low Pressure Solar Receivers for Solar Power Systems and Related Components and Uses Thereof", which are both incorporated by reference in their entirety as mentioned above. In some embodiments, a power generation system is provided that may be used in conjunction with systems and methods disclosed herein. Referring to FIG. 1A, for example, system 10 may comprise power generation system 53 comprising heat exchange system 35, turbine 46 (e.g., gas turbine), compressor 54, and generator 60, which may be used to generate power using, for example, primarily a Brayton cycle (or other appropriate thermodynamic power cycle). While a single turbine and compressor is illustrated in FIG. 1A, it should be understood the power generation system is not so limited, and that, in some embodiments, multiple turbines and/or compressors can be employed. Similarly, multiple generators may be employed in certain embodiments. For example, in some embodiments, the power generation system includes at least 2, at least 3, at least 4, at least 5, or more turbines, compressors, and/or generators. A single turbine and/or the combination of multiple turbines can be capable of producing any of a variety of suitable amounts of power (e.g., at least about 100 kW, at least about 500 kW, at least about 1 MW, at least about 4 MW). One of ordinary skill in the art would be capable of selecting an appropriate turbine and/or combination of turbines to use, given a desired power output requirement and system capacity.

In order to increase system efficiency, the gas supplied to turbine 46 can be relatively hot and relatively highly pressurized. To achieve high-pressures, compressor 54 may be used to compress a relatively low-pressure gas (e.g., ambient air) in stream 56 to produce relatively high-pressure stream 52. In some embodiments, the compressor can be used to produce a fluid stream (e.g., a gas stream) with a pressure of greater than or equal to 2 atmospheres, greater than or equal to 5 atmospheres, greater than or equal to 10 atmospheres, greater than or equal to 15 atmospheres, greater than or equal to 20 atmospheres, greater than or equal to 25 atmospheres, greater than or equal to 30 atmospheres, greater than or equal to atmospheres, greater than or equal to 40 atmospheres, or greater than or equal to 45 atmospheres.

In some embodiments, it may be particularly advantageous to flow essentially all of the heated first fluid from the fluid chamber of the solar receiver to the heat exchange system of the power generation system without diverting the heated first fluid to the heated fluid diversion outlet conduit (which is explained in greater detail herein). FIG. 1C shows, in accordance with certain embodiments, a schematic diagram of sunlight operation of a concentrated solar combination heating and power generation system for power generation. As shown in FIG. 1C, in some embodiments, incident solar radiation 12 may be used to heat a first fluid within the fluid chamber of solar receiver 14 to provide a heated first fluid. In certain embodiments, the heated first fluid is flowed, via streams 16, 19, and 34, to heat exchange system 35 without flowing any of the heated first fluid to heated fluid diversion outlet conduit 18. In some such embodiments, the heated first fluid may be flowed through fuel-fired combustion unit 26 (which is explained in greater detail below) prior to introducing the heated first fluid to the heat exchange system.

Figure 2B:
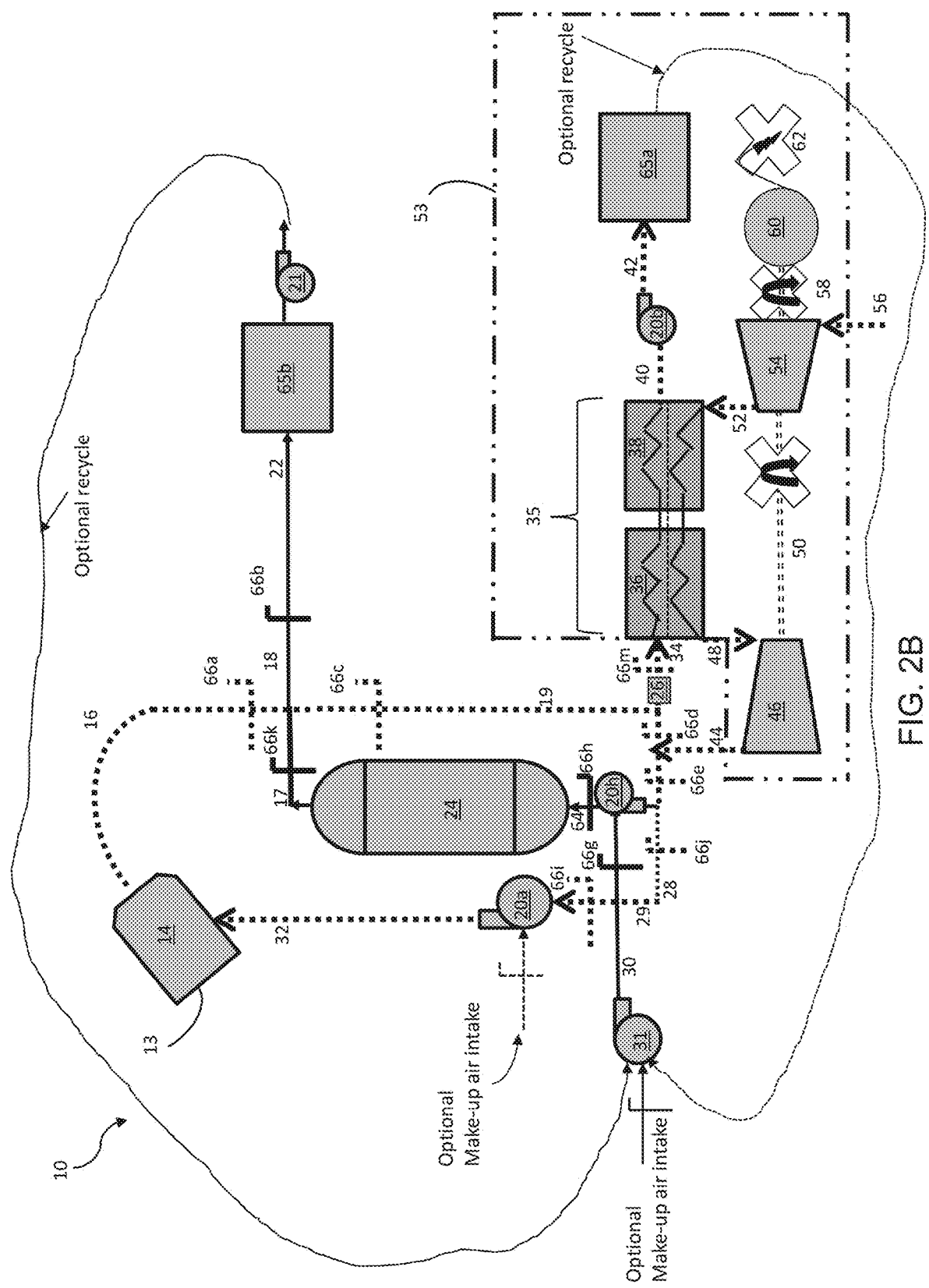
FIG. 2B shows, in accordance with certain embodiments, a schematic diagram of operation from storage of a concentrated solar combination heat energy production and power generation system for heat energy production only.
Figure 2C:
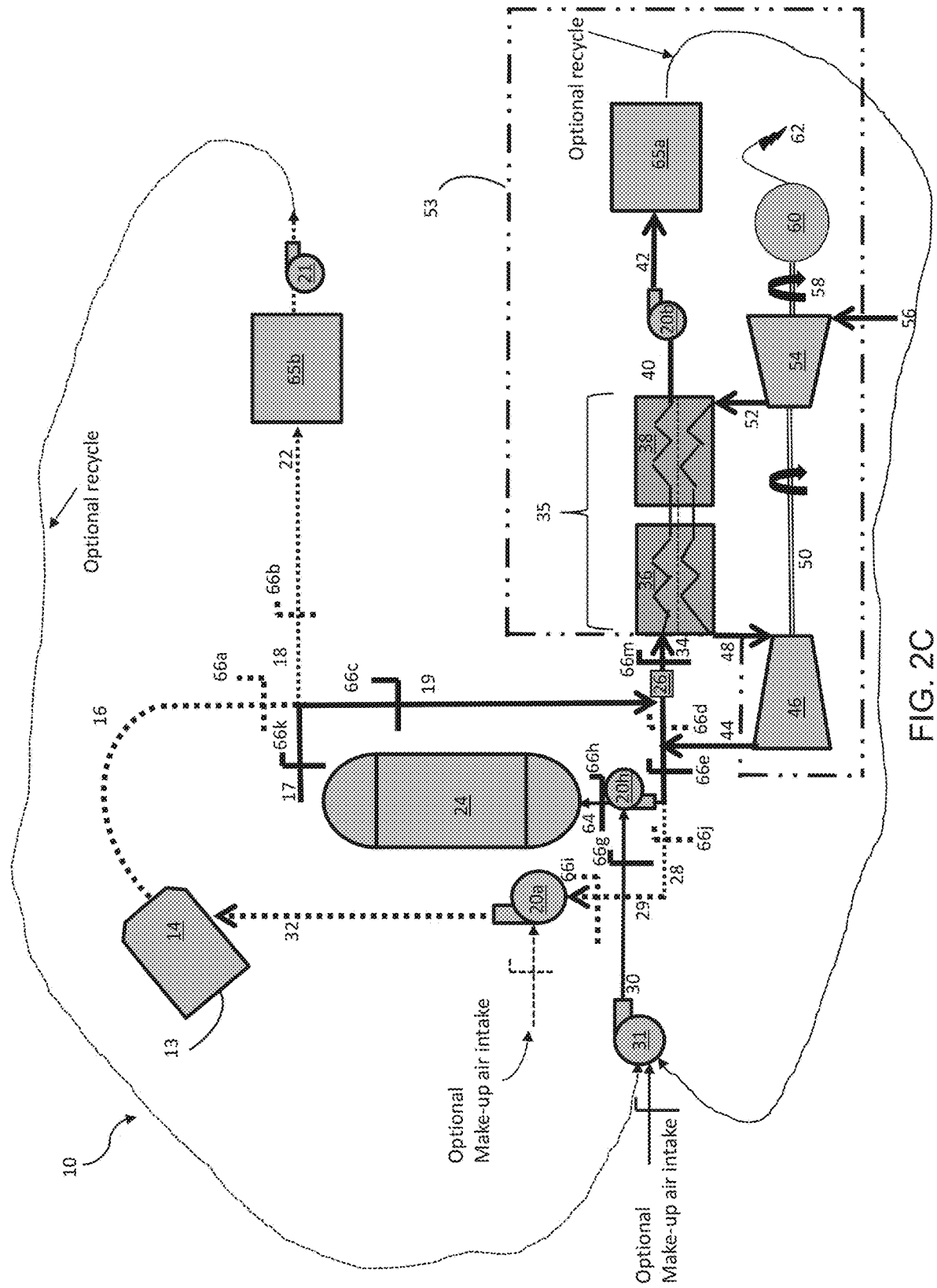
FIG. 2C shows, in accordance with certain embodiments, a schematic diagram of operation from storage of a concentrated solar combination heat energy production and power generation system for power generation only.

In certain embodiments, it may be advantageous to flow the heated first fluid from thermal storage to the power generation system during periods of little or no sunlight (e.g., nighttime). For example, referring to FIG. 2A, the heated first fluid is flowed from thermal storage unit 24, via streams 17, 19, and 34, to heat exchange system 35. In some embodiments, it may be advantageous to flow the heated first fluid from storage to the power generation system without flowing the heated first fluid to the heated fluid diversion outlet conduit. FIG. 2C shows, in accordance with certain embodiments, a schematic diagram of operation from thermal storage of a concentrated solar combination heating and power generation system for power generation. As shown in FIG. 2C, in certain embodiments, the heated first fluid is flowed from thermal storage unit 24, via streams 17, 19, and 34, to heat exchange system 35 without flowing the heated first fluid to heated fluid diversion outlet conduit 22. In some such embodiments, the heated first fluid may be flowed through fuel-fired combustion unit 26 prior to introducing the heated first fluid to the heat exchange system.

According to some embodiments, the heated second fluid (e.g., from the compressor) is used to drive a turbine (e.g., a gas turbine). In some embodiments, the gas turbine is in fluid communication with and downstream of an outlet of the heat exchange system. Referring to FIG. 1A, for example, turbine 46 is in fluid communication with and downstream of fluid outlet 39 of heat exchange system 35 via stream 48. See also FIG. 5A, in which turbine 46 is in fluid communication and downstream of fluid outlet 39 of heat exchange system via stream 95. The gas turbine may be configured, in some embodiments, to receive the heated second fluid at an inlet of the gas turbine and generate power therefrom. For example, in some embodiments turbine 46 is configured to receive a compressed heated second fluid at inlet 41 of the turbine 46 from fluid outlet 39 of heat exchanger 36 via stream 48 and generate power therefrom. In certain embodiments, electrical power 62 is generated by generator 60 via rotating shaft(s) 50 and 58, powered from turbine 46.

Figure 3:
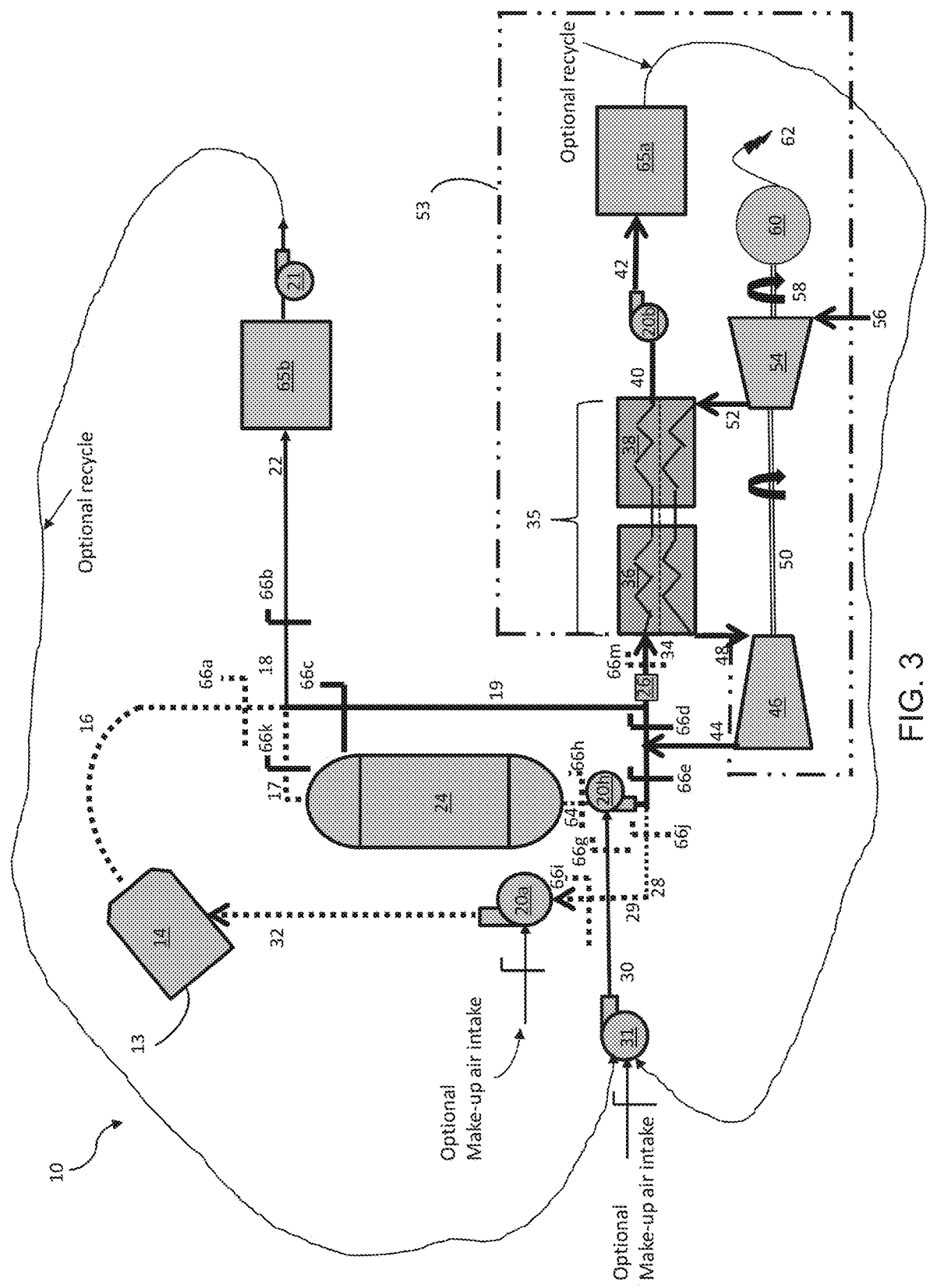
FIG. 3 shows, in accordance with certain embodiments, a schematic diagram of fuel operation of a concentrated solar combination heat energy production and power generation system for heat energy production and power generation.

According to certain embodiments, the power generation system may be operated without flowing the heated first fluid to the power generation system (e.g., the heat exchange unit of the power generation system). For example, in some embodiments, the power generation system may be completely fuel powered for periods of time (e.g., start-up) and may utilize fuel power as needed/desired for supplemental power and/or heating capacity. This option is described in more detail below in the context of the description of optional fuel combustor 26. It may be particularly advantageous to have a fuel operated power generation system during lengthy periods of little or no sunlight (e.g., cloudy days and/or nighttime). Briefly, FIG. 3 shows, in accordance with certain embodiments, a schematic diagram of fuel operation of a concentrated solar combination heating and power generation system for heating and power generation. In some embodiments, power generation system 53 (e.g., heat exchange system 35, turbine 46, compressor 54, generator 60) may be operated by a source of fuel (not shown in FIG. 3) using a fuel-fired combustor 26, without the use of a heated first fluid derived from either solar receiver 14 or thermal storage unit 24. While FIG. 3 illustrates that both power generation system 53 and heat energy utilization via withdraw of heated fluid through heated fluid diversion outlet conduit 22 may be employed for fuel fired operations, in some embodiments, only power generation system 53 is operated, with the heated fluid diversion conduit blocked by damper 66b and/or damper 66c.

In some embodiments, the gas turbine comprises an exhaust outlet in valved fluid communication with the fluid inlet of the fluid chamber and/or with the thermal storage unit. For example, referring to FIG. 1A, turbine 46 comprises exhaust outlet 43 in valved fluid communication with the fluid inlet 5 of the fluid chamber of solar receiver 14 via streams 44, 28, 29, and 32. Referring to FIG. 2A, turbine 46 comprises exhaust outlet 43 in valved fluid communication with thermal storage unit 24 via streams 44, 28, and 64. In this way, an expanded substantially unpressurized exhaust of the gas turbine (e.g., having a pressure of less than 2 atmospheres) may be selectively fed to either or both of the fluid chamber of the solar receiver and the thermal storage unit. In some embodiments, for example, the exhaust of turbine 46 can be fed to the fluid chamber of solar receiver 14 via streams 44, 28, 29, and 32. In certain embodiments, optional blower 20a may be in valved fluid communication with fluid inlet 5 of the fluid chamber of solar receiver 14, such that the exhaust of turbine 46 is fed through blower 20a prior to being fed to the fluid chamber of solar receiver 14 via stream 32. In some embodiments, in addition to or in place of having an inlet fluidically connected to stream 29, optional blower 20*a* may have an inlet fluidically connected to an atmosphere surrounding system 10, which may be configured to supply fluid (e.g., ambient air) to fluid chamber of solar receiver 14 via stream 32.

Any of a variety of suitable blowers (e.g., 20*a*-20*h*, 21, 31) may be incorporated in any of the systems at any location where fluid motive force or flow control is desired. For example, in some embodiments, the blower(s) can comprise an electric driven induction flow fan. In certain embodiments, an exhaust of turbine 46 can be fed to thermal storage unit 24 via streams 44, 28, and 64. According to certain embodiments, an exhaust of turbine 46 can be fed to the fluid chamber of solar receiver via streams 44, 28, 29, 32 (and optional blower 20*a*), and thermal storage unit 24 via streams 44, 28, and 64. Routing the exhaust from the turbine can be beneficial, as the turbine exhaust may contain residual heat that would otherwise be lost if the exhaust were vented directly to the atmosphere.

In addition, system 10 may be configured to selectively switch between which destination (e.g., the fluid chamber of the solar receiver and/or to the thermal storage unit) receives the exhaust of the turbine (e.g., gas turbine). For example, referring to FIG. 1A and FIG. 2A, in some embodiments, an exhaust of turbine 46 may first be fed to the fluid chamber of solar receiver 14 (by, for example, having dampers 66*e*, 66*j*, and 66*i* in an open position and damper 66*h* in a closed position), followed by feeding the exhaust of turbine 46 to thermal storage unit 24 (by, for example, having dampers 66*e* and 66*h* in an open position and damper 66*j* in a closed position). In some other embodiments, an exhaust of turbine 46 may first be fed to thermal storage unit 24, followed by feeding the exhaust of turbine 46 to the fluid chamber of solar receiver 14. In yet another embodiment, an exhaust of turbine 46 may first be to both the fluid chamber of solar receiver 14 and the thermal storage unit 24, followed by feeding the exhaust of turbine 46 to only the fluid chamber of solar receiver 14 or thermal storage unit 24.

In certain embodiments, the heated second fluid is used to supply heat to an industrial processing unit or is used for general space heating purposes.

Industrial Processing Unit

In certain embodiments, the power generation system may further comprise or be operatively associated with an industrial processing unit. The industrial processing unit may, in some cases, be powered using recovered heat from the spent low-pressure fluid (e.g., the heated first fluid having a first pressure) exiting the heat exchange system after heating the compressed second fluid used for power generation. In some embodiments, recovering the heat from the low-pressure fluid exiting the heat exchange system may advantageously improve the overall efficiency of the system by enabling the use of heat energy that may otherwise be wasted. The industrial processing unit, in some embodiments, may be positioned downstream of the heat exchange system and have an inlet in valved fluid communication with a second outlet of the low-pressure side of the heat exchange system. For example, referring to FIG. 1A, a generalized industrial processing unit is indicated at 65*a* and is positioned downstream of heat exchange system 35 and has inlet 63 in valved fluid communication with outlet (e.g., second outlet) 45 of the heat exchange system 35 via streams 40 and 42. In certain embodiments, the industrial processing unit is configured to receive the low-pressure first fluid from the heat exchange system and utilize residual heat energy contained in the stream to, for example, operate or facilitate operation of one or more operations of the industrial processing unit. For example, industrial processing unit is configured, in some embodiments, to receive the heated first fluid from heat exchange system via streams 40 and 42 and generate power therefrom on a smaller scale than power generation system 53 to operate industrial processing unit 65*a*. In certain embodiments, optional blower 20*b* may be in valved fluid communication with the inlet of industrial processing unit 65*a*, such that the heated first fluid from heat exchange system 35 is forced by optional blower 20*b* to industrial processing unit 65*a* via stream 42.

The low-pressure first fluid received by the industrial processing unit may be any of a variety of suitable temperatures. In some embodiments, for example, the temperature of the low-pressure first fluid received by the industrial processing unit may be greater than or equal to 100° C., greater than or equal to 200° C., greater than or equal to 300° C., or greater than or equal to 400° C. In certain embodiments, the temperature of the low-pressure first fluid received by the industrial processing unit may be less than or equal to 500° C., less than or equal to 400° C., less than or equal to 300° C., or less than or equal to 200° C. Combinations of the above recited ranges are also possible (e.g., the temperature of the low-pressure first fluid received by the industrial processing unit is greater than or equal to 100° C. and less than or equal to 500° C., the temperature of the low-pressure first fluid received by the industrial processing unit is greater than or equal to 200° C. and less than or equal to 300° C. Other ranges are also possible.

According to certain embodiments, the industrial processing unit may be or include any of a variety of industrial systems that may be used for any of a variety of industrial applications. In certain embodiments, for example, the industrial processing unit is a water purification system (e.g., a desalination system), a chemical separation system (e.g., a distillation system), a chemical reactor, and/or an industrial generator (e.g., a steam boiler). In certain embodiments, the industrial generator (e.g., steam boiler) may be used to power a steam turbine (e.g., in a Rankine cycle) to produce supplemental electrical power. In some embodiments, the heated first fluid exiting the heat exchange system can be used to provide heat to power an absorption chiller, which can be used, for example, to produce chilled water for an air conditioner and/or refrigeration system. According to some embodiments, the industrial processing unit can comprise one or more heat exchangers for extracting heat from the low-pressure fluid exiting the heat exchange system. In certain embodiments, the heated first fluid exiting the heat exchange system can be used to provide heat for general space heating purposes (e.g., via an air to liquid heat exchanger).

According to certain embodiments, the industrial processing unit is free of any gas turbines and is not used for generating electrical power.

Fuel-Fired Combustion Unit

In some embodiments, the power generation system may further comprise or be operatively associated with a fuel-fired heating unit. The fuel-fired heating unit, in some embodiments, is configured to heat or further heat the heated first fluid prior to introducing the heated first fluid to the heat exchange system and/or to independently provide a sufficient quantity of the heated first fluid to the heat exchange system—as described above—to operate the power generation system. According to some embodiments, the fuel-fired heating unit may advantageously raise the temperature of the heated first fluid by burning fuel to supply additional heat, so that the heated first fluid may be used to heat the second fluid used to power the gas turbine, and/or to power an industrial process, and/or to provide heat for general space heating purposes. One of ordinary skill in the art would be capable of selecting an appropriate fuel-fired heating or heating device to provide the required amount of supplemental heat, given the power demands and operating conditions of a given system. For example, the fuel-fired heating unit may comprise an induced flow combustor.

In some embodiments, the fuel-fired heating unit is positioned upstream of the heat exchange system and in fluid communication with the heat exchange system, and in valved fluid communication with one or both of the fluid chamber of solar receiver and the thermal storage unit. For example, referring to FIG. 1A, system 10 comprises fuel-fired combustion unit 26. Fuel-fired combustion unit 26 is positioned upstream of heat exchange system 35 and in valved fluid communication with heat exchange system 35 via steam 34 and damper 66m. The fuel-fired combustion unit 26 is also in valved fluid communication with the fluid chamber of solar receiver 14 via streams 28, 29, and 32 and dampers 66d, 66e, 66j, and 66i, and with thermal storage unit 24 via streams 28 and 64 via dampers 66d and 66h (or via streams 28, 19, and via dampers 66c and 66k, as shown in FIG. 2A, for example).

Fuel Energy System

In certain embodiments, the power generation system may further comprise or be operatively associated with an a fuel production/energy system. The fuel production/energy system, may, in some embodiments, be configured to produce and/or store one or more of a combustible fuel, electrical power, and/or a pressurized working fluid. Advantageously, such a configuration may provide a combination heating and power generation system configured to operate completely standalone, using, for example, the combustible fuel that is produced by the fuel production/energy system may be used in the supplemental combustor of the power generation system and/or for other fuel needs such as transportation, etc. In certain embodiments, the described configuration may be particularly useful in locations that are remote from fuel transportation infrastructure. In some such embodiments, the combustible fuel that is produced by the fuel energy system may be combusted by the fuel-fired combustion unit, to heat or further heat the heated first fluid prior to introducing the heated first fluid to the heat exchange system and/or to independently provide a sufficient quantity of the heated first fluid to the heat exchange system, as explained herein.

Figure 8A:
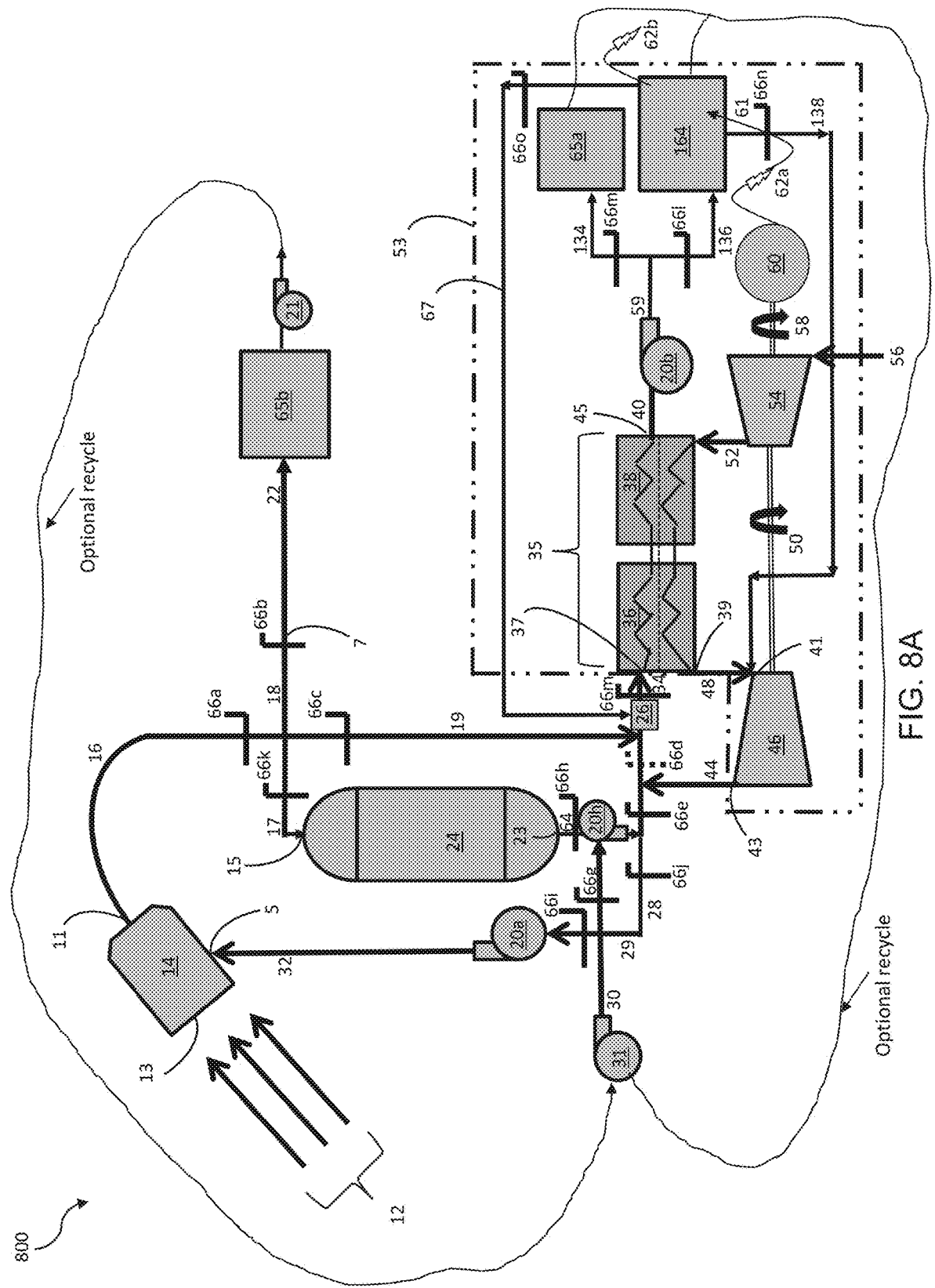
FIG. 8A shows, in accordance with certain embodiments, a schematic diagram of sunlight operation of a concentrated solar combination heating and power generation system with a fuel energy system for supplemental fuel production.

FIG. 8A shows, in accordance with certain embodiments, a schematic diagram of sunlight operation of a concentrated solar combination heating and power generation system with a fuel production/energy system for both heat energy production and power generation. Referring to FIG. 8A, system 800 is similar to systems described above but also comprises fuel production/energy system 164. Fuel production/energy system 164 can optionally be positioned remotely in certain cases, but as illustrated is positioned downstream of heat exchange system 35 and has an inlet in valved fluid communication with outlet 45 of heat exchange system 35 via streams 40, 59, and 136 and optional blower 20b. In other embodiments, the fuel production/energy system may not have any fluidic connectivity with power generation system 53, but rather may be powered solely by electrical power 62a produced by power generation system 53 (e.g., in an embodiment where hydrogen is produced via electrolysis, as described below). In the illustrated embodiment, the fuel production/energy system is optionally configured to receive one or more of the heated first fluid from heat exchange system 35 (e.g., via streams 40, 59, and 136 and optional blower 20b) and/or electrical power 62a produced by electric generator 60 (e.g., via electrical power stream 61). In certain embodiments, at least a portion of the heated first fluid from heat exchange system 35 may be delivered to one or both of fuel production/energy system 164 (via streams 40, 59, 136, and blower 20b) and industrial processing unit 65a (via streams 40, 59, 134, and blower 20b).

As mentioned above, in certain embodiments, the fuel production/energy system is configured to produce one or more of a combustible fuel (e.g., that is suitable to be combusted by the fuel-fired combustion unit, electrical power, and/or (optionally) a pressurized working fluid (e.g., that is suitable to power the gas turbine). In some embodiments, for example, fuel energy system 164 produces a combustible fuel. Fuel energy system 164 may, in certain embodiments, have an outlet in valved fluid communication with an inlet of fuel-fired combustion unit 26 via stream 67. As a result, the combustible fuel produced by fuel energy system 164 may be combusted in fuel-fired combustion unit 26, to, for example, heat or further heat the heated first fluid prior to introducing the heated first fluid to heat exchange system 35 and/or to independently provide a sufficient quantity of the heated first fluid to heat exchange system 35 to operate power generation system 53.

In certain embodiments, the combustible fuel in the fuel energy system is hydrogen and/or oxygen produced by electrolysis. For example, in some embodiments, fuel energy system 164 may utilize electrical power 62a produced by the electric generator, as explained herein, via electrical power stream 61 to produce a combustible fuel, such as hydrogen, via, for example, the electrolysis of water. Such water splitting reactions that produce hydrogen gas (and oxygen gas) would be understood by a person of ordinary skill in the art. Other combustible fuel producing reactions may also be utilized by the fuel energy system.

In some embodiments, following the production of the combustible fuel (e.g., hydrogen gas), the combustible fuel flows via stream 67 to fuel-fired combustion unit 26 where it is combusted. In certain embodiments, fuel energy system 164 is configured to store the combustible fuel, which may be used to power the fuel-fired combustion unit during, for example, periods of little or no sunlight in which the temperature of the heated first fluid needs to be increased. In some embodiments, the combustible fuel may be used for applications instead of, or in addition to, being combusted in the fuel-fired combustion unit. Such applications may include using the combustible fuel to power fuel cell vehicles and/or machinery.

The fuel production/energy system may, in some embodiments, produce a pressurized working fluid (e.g., pressurized heated air) that is suitable to power the gas turbine of power generation system 53. In certain embodiments, for example, fuel energy system 164 may have an outlet in valved fluid communication with inlet 41 of gas turbine 46 via stream 138. In some embodiments, the oxygen that is produced by the electrolysis of water, as explained above, may be used in a supplemental combustion process (e.g., an oxy-combustion process) to produce the high temperature fluid that can boost or supplement the compressed heated second fluid that enters inlet 41 of turbine 46.

In certain embodiments, the fuel production/energy system may produce additional electrical power. Referring to FIG. 8A, for example, fuel production/energy system 164 may produce electrical power 62b.

Figure 8B:
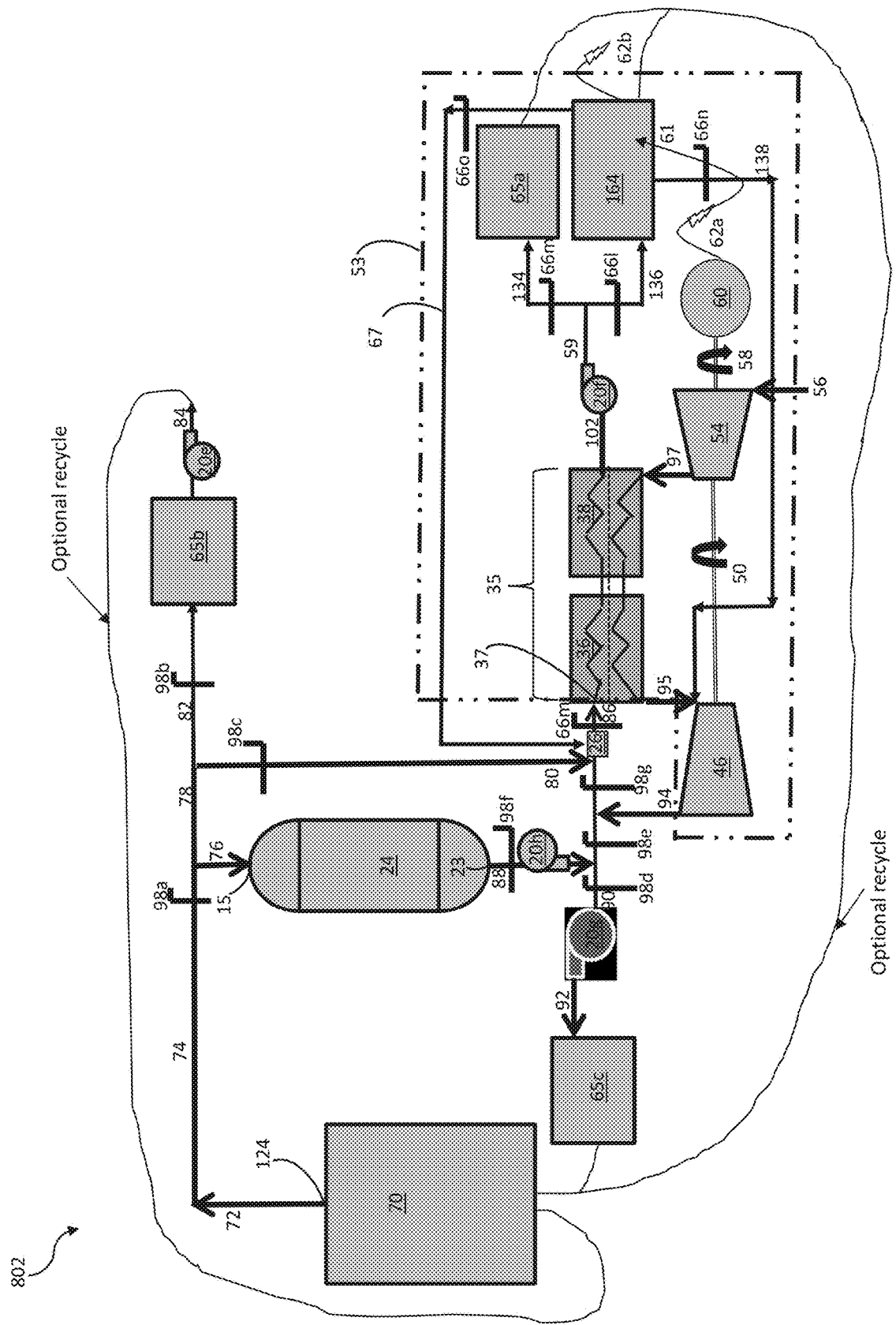
FIG. 8B shows, in accordance with certain embodiments, a schematic diagram of operation of a waste heat utilization and storage system with a fuel energy system for supplemental fuel production.

The fuel production/energy system described herein may be implemented into a system that utilizes an industrial source heat or waste heat (instead of or in addition to a solar receiver, as described above) to produce a working heated fluid. For example, FIG. 8B shows, in accordance with certain embodiments, a schematic diagram of the operation of a waste heat utilization and storage system with a fuel production/energy system for heat energy production and power generation. As shown in FIG. 8B, system 802 comprises fuel production/energy system 164 that may be configured to produce a combustible fuel (e.g., hydrogen via water electrolysis) suitable to be combusted by fuel-fired combustion unit 26 via stream 67, electrical power 100*b*, and/or a pressurized working suitable to power gas turbine 46 via stream 138 in a similar fashion and for similar purposes as described above in the context of FIG. 8A.

Heated Fluid Diversion Outlet Conduit

In certain embodiments the system comprises a heated fluid diversion outlet conduit. The heated fluid diversion outlet conduit, in some embodiments, is configured to divert at least a portion of the heated first fluid from the power generation system. The heated first fluid may, in certain embodiments, be used to provide heat for general space heating purposes and/or to provide heat for an industrial process. In general, the temperature of the diverted first fluid stream is substantially higher than that used above for industrial processing unit 65*a*. In certain embodiments, for example, the temperature of the diverted first fluid stream may be any of the above-mentioned temperatures or ranges for heated fluid produced by the solar receiver and/or industrial heat source mentioned previously, such as greater than or equal to 700° C., greater than or equal to 800° C., greater than or equal to 900° C., greater than or equal to 1000° C., or greater than or equal to 1100° C. In some embodiments, the temperature of the diverted fluid stream may be less than or equal to 1200° C., less than or equal to 1100° C., less than or equal to 1000° C., less than or equal to 900° C., or less than or equal to 800° C.

In some embodiments, the outlet conduit is positioned upstream of the inlet of the thermal storage unit and the inlet of the heat exchange system and has an inlet in valved fluid communication with the fluid outlet of the fluid chamber of the solar receiver and with the thermal storage unit. For example, referring to FIG. 1A, system 10 includes heated fluid diversion outlet conduit 22. Heated fluid diversion outlet conduit 22 is positioned upstream of inlet 15 of thermal storage unit 24 and inlet 37 of heat exchange system 35 and has an inlet 7 (for example, after damper 66*b*) in valved fluid communication with fluid outlet 11 of the fluid chamber of solar receiver 14 via streams 16 and 18 and with thermal storage unit 24 via streams 17 and 18.

It may be particularly advantageous, in some embodiments, to flow the heated first fluid (e.g., from the fluid chamber of the solar receiver) to heated fluid diversion outlet conduit 22 in order to provide heat (e.g., for general space heating purposes and/or for an industrial process). In some aspects, the system may be configured to flow the heated first fluid to heated fluid diversion outlet conduit 22 without flowing the heated first fluid to power generation system 53. FIG. 1B shows, in accordance with certain embodiments, a schematic diagram of sunlight operation of a concentrated solar combination heating and power generation system used for heating only. As shown in FIG. 1B, incident solar radiation 12 heats the first fluid within the fluid chamber of solar receiver 14 to provide a heated first fluid. The heated fluid flows via streams 16 and 18, to heated fluid diversion outlet conduit 22 via motive force of optional blower 21 to provide heat for space heating purposes and/or for an industrial process, without providing any of the heated first fluid to power generation system 53. In certain embodiments, the heated fluid in heated fluid diversion outlet conduit 22 may be used to power industrial processing unit 65*b*. Industrial processing unit 65*b* may be any of the industrial processing units described above with respect to industrial processing unit 65*a*. It should be understood that, while FIG. 1B shows sunlight operation of a concentrated solar combination heating and power generation system used for heating only, heated fluid diversion outlet conduit 22 may also be used to power industrial processing unit 65*b* as system 10 is generating power via power generation system 53 (e.g., heat exchange system 35, turbine 46, compressor 54, generator 60), as shown in FIG. 1A and FIG. 2A. Optional blower 21 may provide the motive force to provide the heated fluid to heated fluid diversion outlet conduit 22 and/or industrial processing unit 65*b*.

It is also possible to flow the heated first fluid from thermal storage to the heated fluid diversion outlet conduit 22 during periods of little or no sunlight (e.g., nighttime). For example, referring to FIG. 2A, the heated first fluid is made to flow (e.g., by optional blower 21) from thermal storage unit 24, via streams 17 and 18, to heated diversion outlet conduit 22 to provide heat (e.g., for general space heating purposes and/or for an industrial process, such as industrial processing unit 65*b*). In some cases, it may be advantageous to send all of the heated first fluid from storage to heated fluid diversion outlet conduit 22 during periods of little or no sunlight (e.g., nighttime) without sending any of the heated first fluid to power generation system 53. FIG. 2B shows, in accordance with certain embodiments, a schematic diagram of operation from storage of a concentrated solar combination heating and power generation system for heating only. As shown in FIG. 2B, in some embodiments, the heated first fluid is made to flow (e.g., by optional blowers 21 and/or 31) from thermal storage unit 24, via streams 17 and 18, to heated diversion outlet conduit 22 to provide heat (e.g., for general space heating purposes and/or for an industrial process, such as industrial processing unit 65*b*) without flowing the heated first fluid to power generation system 53.

According to certain embodiments, the heated fluid diversion outlet conduit may be operated without the need for use of the solar receiver or the thermal storage to supply heat energy. For example, in some embodiments, the heated fluid diversion outlet conduit may use a first fluid that has been heated by an option fuel powered heater—e.g., optional combustor 26. It may be particularly advantageous to have a fuel powered option for providing heated fluid to diversion outlet conduit 22 during lengthy periods of little or no sunlight (e.g., cloudy days and/or nighttime). In some embodiments, heated fluid diversion outlet conduit 22 may be fed a first fluid heated by a heater powered by (e.g., via combustion of) a source of fuel (not shown in FIG. 3) without such first flowing to/through either solar receiver 14 or thermal storage unit 24. FIG. 3 shows both the heated fluid diversion outlet conduit 22 and power generation system 53 as supplied by first fluid heated by optional combustor 26. In some cases, the first fluid heated by optional combustor 26 is supplied only to fluid diversion outlet conduit 22 and is not used for operating power generation system 53 by, for example, closing dampers 66*d* and 66*m*.

Make-Up Inlet Conduit

According to certain embodiments, the system comprises a make-up inlet conduit. The make-up inlet conduit is configured, in some embodiments, to introduce make-up and/or recycled fluid into the system. Advantageously, the make-up inlet conduit may, in some embodiments, increase the overall efficiency of the system by recycling fluid from the industrial processing unit and/or fluid diversion outlet conduit after it has been used, and/or directly from the low-pressure first fluid outlet of the heat exchange system. In some embodiments, the make-up inlet conduit may be configured to provide additional ambient air to the system, which may be useful, for example, for regulating the flow of fluid through the system and/or adjusting the temperature of the heated fluid, as previously described.

In some embodiments, a make-up inlet conduit is connected upstream of and in fluid communication with the fluid inlet of the fluid chamber of the solar receiver and the thermal storage unit. For example, referring to FIGS. 1A, 2A, and 3, system 10 comprises make-up inlet conduit 30. In certain embodiments, make-up inlet conduit 30, including optional blower 31, is configured to feed make-up fluid upstream of and in fluid communication with fluid inlet 5 of the fluid chamber of solar receiver 14 via streams 29 and 32, also via another optional blower 20a. In some embodiments, make-up inlet conduit 30, including optional blower 31, is configured to feed make-up fluid upstream of and in fluid communication with thermal storage unit 24.

In certain embodiments, one or more make-up inlet conduits may be configured to receive recycled fluid from one or more fluidic outlets of the overall system and/or one or more of the industrial processing units. For example, in certain embodiments, make-up inlet conduit 30 (and/or optional make-up inlet conduits such as feeding blower 20a in FIG. 1A, blowers 20d and 20c in FIG. 4A, or stream 80 in FIG. 5B) may be connected downstream and in fluid communication with an outlet of the system and/or any industrial processing unit (e.g., 65a and/or 65b) to recycle fluid that may still be at an elevated temperature. See, for example, the optional recycle stream from blower 21 to blower 31 and/or the optional recycle stream from industrial processing unit 65a to blower 31, as shown in FIG. 1A. Configuring the system in this way may advantageously limit the amount of heat that is wasted, thereby increasing the overall efficiency of the system.

Power Generation Systems for Using Multiple Heat Exchangers in Series for Use with High Temperature Gas Heat Sources In certain embodiments, a power generation system may be configured to generate electrical power from a solar receiver and/or industrial or other sources of waste heat and may be packaged and/or used as a stand-alone, compartmentalized, self-contained, and/or transportable system for such purposes. In certain embodiments, the industrial or other heat source may be an industrial source of waste heat, either in the form of a hot gas (e.g., air) or hot surface(s) that can be used to generate a hot gas (e.g., air). In certain cases, the system can be simplified and does not include thermal storage or a solar receiver or other source of heated fluid, but is configured to be operatively connected too at least one, several, or all such sources. Certain such systems may also advantageously in certain cases be able to generate power from industrial heat sources without the need for a combustor to generate additional heat for the system. In certain cases, such systems could be sufficiently compact to be portable or transportable. In certain embodiments, the system may be designed to use one or more commercially available turbines or microturbines as described further below. In certain such embodiments, a turbine or microturbine may include an integrated compressor and integrated recuperator (heat exchanger), and the system may include one or more additional heat exchangers arranged in series with the integrated recuperator turbine and be constructed of materials enabling the additional heat exchanger(s) to handle heat sources (e.g., industrially produced sources of hot air) having a temperature exceeding the permissible operating temperature of the recuperator. The turbine or microturbine including the integrated compressor and/or integrated recuperator (heat exchanger) may, in some embodiments, be enclosed within a common housing, position on a common mounting frame or skid, and/or be configured to be integral or non-separable. In this way, the systems may in certain embodiments through the use of multiple heat exchangers in series permit use of the system with very high temperature heat sources (e.g., any of the above-mentioned temperatures or temperature ranged for the fluid heated by an industrial heat source and/or solar receiver, such as 500° C.-1500° C., 850° C.-1000° C., or 700° C.-1300° C.; up to 1200° C. or up to 1700° C., or up to 1800° C.) while reducing the size and cost of the heat exchanger(s) that need to be configured to withstand such temperatures, since only the upstream heat exchanger(s) will experience temperatures that call for special materials of construction. A particular exemplary configuration of such system of illustrated in FIG. 9 described below.

Figure 9:
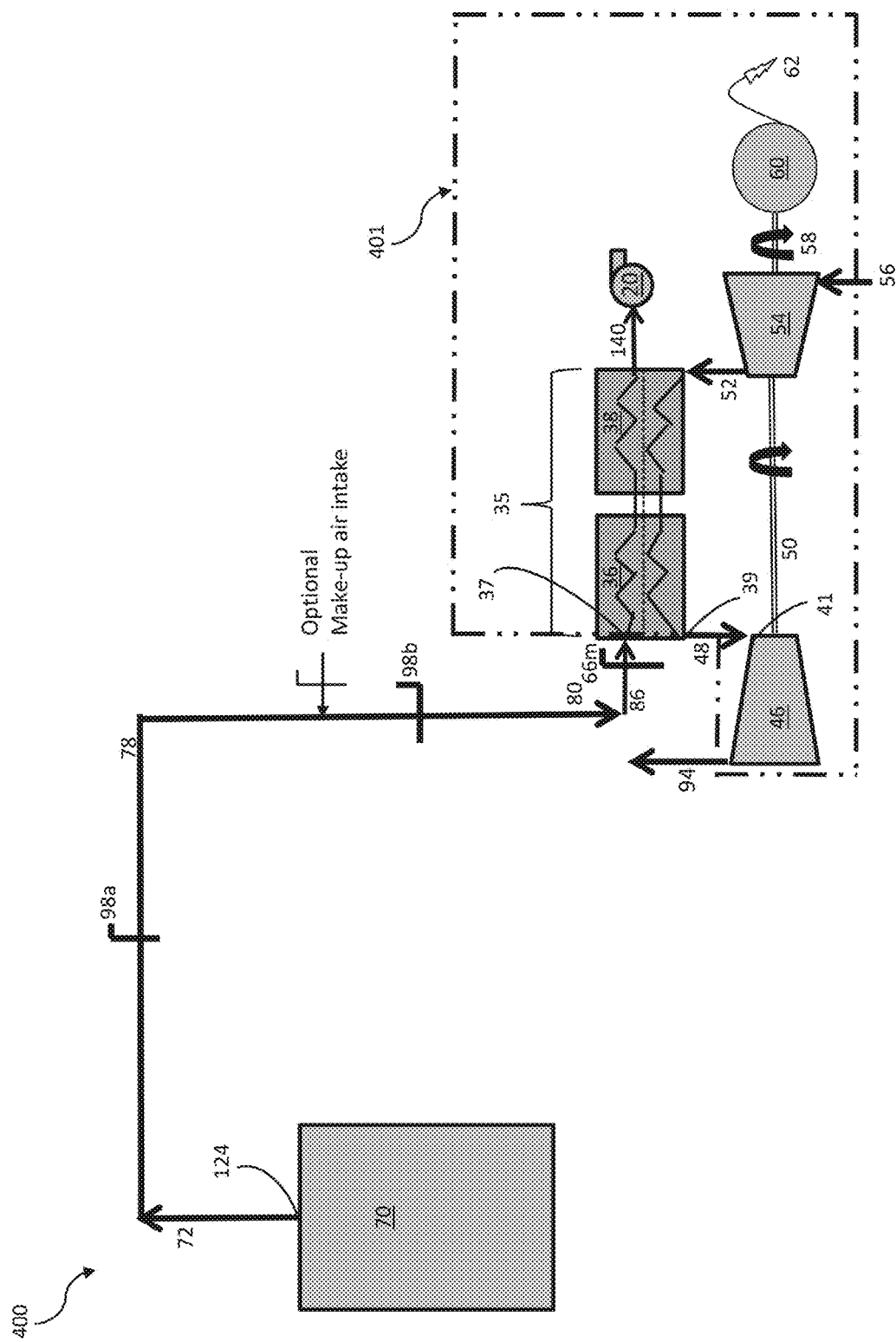
FIG. 9 shows, in accordance with certain embodiments, a schematic diagram of operation of a heat (e.g., waste heat or other non-solar heat source) utilization system for power generation.

As mentioned above, a system described herein may comprise a heat exchange system comprising a dual (or more than two in some cases) heat exchanger array. For example, in certain embodiments, the heat exchange system comprises a first heat exchanger and a second heat exchanger. FIG. 9 shows, in accordance with certain embodiments, a schematic diagram of a waste heat utilization system for power generation. As shown in FIG. 9, a power generating system 400 may, in some embodiments, include a power block 401 that comprises heat exchange system 35 comprising first heat exchanger 36 and second heat exchanger 38, a compressor 54, a turbine 46, and a generator 60. In certain embodiments, first heat exchanger 36 and second heat exchanger 38 may be positioned in series.

According to certain embodiments, the heat exchange system (e.g., the dual heat exchanger array) may be positioned downstream from an industrial source of heated fluid 70. In some embodiments, as is explained herein in greater detail, the industrial source of heated fluid may be configured to produce a heated fluid at a temperature or within a temperature range of any value stated previously, such as between greater than or equal to 500° C. and less than or equal to 1500° C. (or, e.g., in the following ranges: 850° C.-1000° C., or 700° C.-1300° C.; or 800° C.-1800° C., up to 1200° C., or up to 1700° C., or up to 1800° C.) and at a pressure of less than or equal to 2 atmospheres absolute, and in certain cases at ambient atmospheric pressure. Referring to FIG. 9, heat exchange system 35 is positioned downstream from industrial source of heated fluid 70. In some embodiments, the heat exchange system has an inlet in valved fluid communication with a fluid outlet of the industrial source of heated fluid. Referring, for example, to FIG. 9, heat exchange system 35 comprises inlet 37 in valved fluid communication with fluid outlet 124 of industrial source of heated fluid 70 via streams 72, 78, 80, and 86.

According to some embodiments, heat exchange system 35 is configured to transfer heat from the heated fluid to a second fluid, thereby producing a heated second fluid. As described herein in further detail, the heated fluid from the industrial source of heated fluid may have a high temperature at or within a temperature range of any value stated previously, such as (e.g., 500° C.-1500° C., 850° C.-1000° C., or 700° C.-1300° C.; 800° C.-1800° C.; up to 1200° C. or up to 1700° C., or up to 1800° C.)). Therefore, in some embodiments, first heat exchanger 36 may be made of (or coated with) a material that is capable of withstanding such high temperatures. In certain embodiments, only those areas directly exposed to the high temperature fluid are made of or coated with the high temperature performance material(s). For example, in certain embodiments, the first heat exchanger comprises a high-temperature capable metal alloy, such as those comprising nickel, chromium, aluminum, and/or iron. In a specific example, all or part of the first heat exchanger comprises Alloy 214® (a nickel-chromium-aluminum-iron alloy) from Haynes International. Other materials that are capable of withstanding high temperatures include, but are not limited to, refractory materials (e.g., metals or metal oxides including niobium, molybdenum, tantalum, tungsten, rhenium, titanium, vanadium chromium, manganese, zirconium, technetium, ruthenium, rhodium, hafnium, osmium, iridium), high temperature alloys available from High Performance Alloys, Inc. or Haynes International (e.g., HASTELLOY® Alloy X (HX), INCONEL® Alloy 625, INCONEL® Alloy 718, INCONEL® Alloy 600, INCONEL® Alloy 601, INCOLOY® Alloy 800H/HT, HAYNES® Alloy 25 (L605), and NITRONIC 60®). The first heat exchanger may comprise any of the aforementioned ceramics, metals, and/or alloys described herein. The first heat exchanger 36 may be sized and operated so that an outlet temperature of the fluid from the industrial source exiting the heat changer and entering second heat exchanger 38 has a temperature that is less than a temperature requiring specialized refractory or other high-temperature performance materials of construction (e.g., below 700° C. below 600° C., below 500° C., or below 400° C.). Thus, while second heat exchanger 38 may comprise, in some embodiments, any of the aforementioned materials, advantageously since it will be exposed to relatively lower temperatures, it may be in certain embodiments be fabricated using less expensive, materials metals and/or alloys as compared to first heat exchanger 36 which is designed to withstand high temperatures from the industrial source of heated gas.

Figure 10:
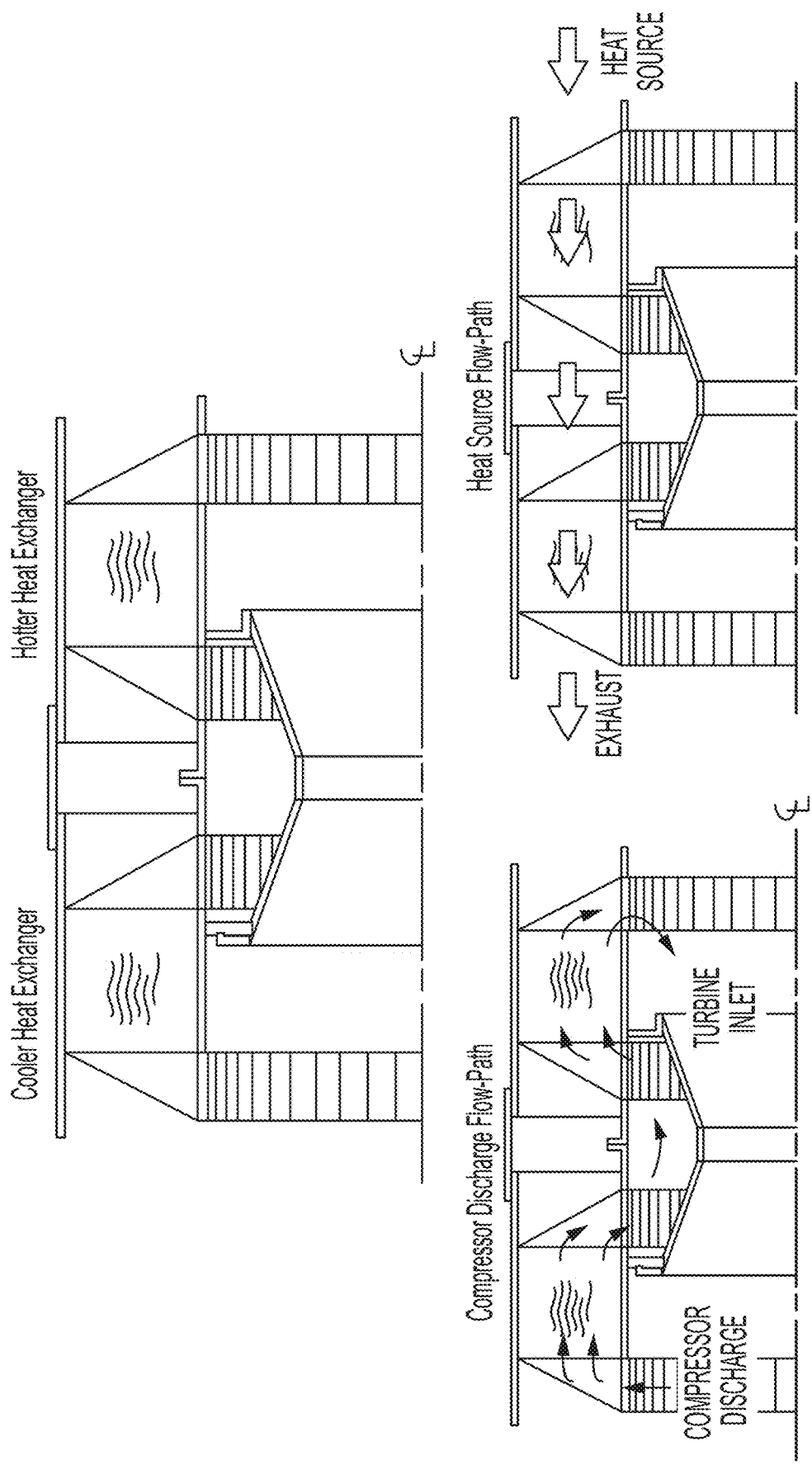
FIG. 10 shows, in accordance with certain embodiments, a schematic diagram depicting a dual heat exchanger array.

In certain embodiments, as the heated fluid from the heat source 70 passes through first heat exchanger 36, the heat from the heated fluid is transferred to the second fluid. In some embodiments, the heated fluid then passes into second heat exchanger 38 at a lower temperature (e.g., see exemplary ranges above) and continues to transfer heat to the second fluid. See, for example, FIG. 10, which shows, in accordance with certain embodiments, a schematic diagram of one embodiment of a dual heat exchanger array. The heated fluid at a lower temperature may exit second heat exchanger 28 as exhaust via stream 140 and optional blower 20.

Configuring the system with multiple heat exchangers in series, such as the depicted dual heat exchange array, advantageously provides an overall better thermal performance to cost ratio, as the effective length of the heat exchange system is increased as compared to use of a single heat exchange unit, thereby providing a comparatively better thermal effectiveness without the need to use high heat capable materials over the entire effective length. Another advantage involves the ability to fabricate each heat exchanger according to specific sizes using specific materials depending on the temperature that each respective heat exchanger will be exposed to. Mixing different alloys (e.g., an alloy capable of withstanding high temperatures and an alloy only capable of withstanding comparatively lower temperatures) in a comparatively large single heat exchanger may lead to certain complications such as dissimilar metals joining and potentially damaging thermomechanical operational strains. Therefore, in some embodiments described herein, the overall cost can be decreased by fabricating a multi- (e.g., dual-) heat exchange system including a relatively small first exchanger capable of withstanding the highest system operating temperatures and a second heat exchanger formed of materials suitable to withstand being subjected to lower temperatures.

According to some embodiments, power block unit 401 can be used independently to generate power from an industrial source of heated air. For example, in certain embodiments, system 400 can be used to generate power without the need for a combustion unit and/or solar sources of heat (e.g., a solar receiver). In certain embodiments, power block 401 comprises a turbine in fluid communication with and downstream of an outlet of second, pressurized side of the heat exchange system. Referring, for example, to FIG. 9, power block 401 comprises turbine 46 in fluid communication with and downstream of fluid outlet 39 of heat exchange system 35. According to certain embodiments, the turbine is capable of generating power from the heated second fluid. As shown in FIG. 9, for example, power block 401 may further comprise compressor 54, and generator 60, which may be used to generate electrical power 62 using, for example, primarily a Brayton cycle (or other appropriate thermodynamic power cycle). Further details regarding power generation systems in the context of further embodiments of this disclosure are explained in greater detail above.

According to certain embodiments, turbine 46, and optionally compressor 54 and heat exchanger (recuperator) 38 may be a microturbine (or a combination microturbine system), (e.g., a Brayton turbine), such as one that is commercially available from Capstone Turbine Corporation (e.g., a C200 microturbine such as a C200S ICHP turbine). Accordingly, in some embodiments related to the dual heat exchanger array, a separate second heat exchange unit 38 is not necessary as turbine 46 may include the second heat exchange unit integrated therewith.

In certain embodiments, power block 401 may be utilized in portable and/or transportable applications.

Although not depicted in FIG. 9, system 400 may optionally include a thermal storage system, which is explained above in greater detail, for operation during periods of little availability of waste/industrially sourced heat, such as during factory shut-down days or reduced capacity operation. In some embodiments, system 400 may additionally comprise an optional fuel-fired combustion unit, configured to further heat (e.g., boost) the low-pressure heated fluid prior to introducing the heated fluid to the heat exchange system for use in power generation.

Methods of Operation

Certain embodiments described herein can be used to practice methods of selectively generating power and/or heat with a concentrated solar receiver powered system. It may be advantageous, in some embodiments, to have the ability to selectively choose between using thermal energy from incident solar radiation to provide heat and/or power. In some embodiments, for example, a method of operation comprises flowing a fluid (e.g., a relatively low-pressure fluid) having a pressure less than 2 atmospheres through the concentrated solar receiver to produce a heated fluid. The relatively low-pressure fluid can originate from any suitable source. For example, in certain embodiments, the relatively low-pressure fluid is air from the ambient atmosphere. Referring to FIG. 1A, for example, which illustrates a method for daytime solar operation for heat and electricity production, a fluid having a pressure less than 2 atmospheres is made to flow through the fluid chamber of solar receiver 14, and incident solar radiation 12 is used to heat the fluid, thereby producing a heated first fluid. In certain embodiments, at least a portion of the low-pressure fluid can be recycled within the system, for example to further increase the temperature, via a fluidic pathway comprising streams 16, 19, 28, 29, and 32. In certain embodiments, the fluidic pathway can include a fluidic loop, such that substantially no fluid is expelled from the pathway during operation.

In certain embodiments, once the relatively low-pressure fluid has been heated within the solar receiver to a desired degree, the heated fluid exiting the solar receiver through stream 16 in FIG. 1A can be diverted to flow to the power generating system, thermal storage unit 24, and/or heated fluid diversion outlet conduit 22, since each of the power generating system, the thermal storage unit, and the heated fluid diversion outlet conduit are fluidically connected to the solar receiver. For example, in some embodiments, the heated fluid is selectively flowed from the fluid chamber of solar receiver 14 to heat exchange system 35 via streams 16, 19, and 34, wherein heat exchange system 35 is configured to transfer heat from the heated fluid to a second pressurized fluid to operate the power generating system. Prior to flowing the heated fluid to heat exchange system 35, the heated fluid may be further heated via fuel-fired combustion unit 26. A second compressed and pressurized fluid heated by heat exchange system 35 is fed to turbine 46 (e.g., gas turbine) via stream 48 to generate electrical power 62 via rotating shaft(s) 50 and 58 to drive generator 60. See, for example, also FIG. 1C. In some embodiments, heated first fluid can also be selectively flowed from the fluid chamber of solar receiver 14 to thermal storage unit 24 via streams 16 and 17, wherein thermal storage unit 24 is configured to store heat derived from the solar receiver. See, for example, FIGS. 1A-1C. In yet another mode of operation, the heated first fluid is selectively flowed from the fluid chamber of solar receiver 14 to heated fluid diversion outlet conduit 22 via streams 16 and 18 to provide heat for an industrial process. See, for example, FIG. 1B.

Any combination of flow paths may be selected as a destination of the first fluid after it is heated by incident solar radiation in the fluid chamber of the solar receiver. For example, in certain modes of operation, the heated first fluid is made to simultaneously flow from the fluid chamber of solar receiver 14 to each of heat exchange system 35 supplying heat to run the power generating system, thermal storage unit 24, and heated fluid diversion outlet conduit 22. In other modes of operation, the heated first fluid can be directed from the fluid chamber of solar receiver 14 to only one of the power generating system, thermal storage unit 24, or heated fluid diversion outlet conduit 22 at any given time. For example, the heated first fluid can be made to flow from the fluid chamber of solar receiver 14 to heat exchange system 35 of the power generating system (e.g., by, for example, having dampers 66a,66c, and 66m open and dampers 66k, 66b, and 66d closed), followed by directing flow of the heated first fluid to thermal storage unit 24 (e.g., by, for example, having dampers 66a and 66k open and dampers 66b and 66c closed), followed by sending the heated first fluid to heated fluid diversion outlet conduit 22 (e.g., by, for example, having dampers 66a and 66b open and dampers 66c and 66k closed). In another operating mode, the heated first fluid is directed from the fluid chamber of solar receiver 14 to thermal storage unit 24, followed by flowing the heated fluid from the thermal storage unit 24 to heat exchange system 35 of power generation system 53, and/or heated fluid diversion outlet conduit 22. In yet another configuration, the heated fluid is made to flow from the fluid chamber of solar receiver 14 to heated fluid diversion outlet conduit 22, followed by flowing the heated first fluid to the power generating system and/or thermal storage unit 24. These are but a few of the options for operating the illustrative systems, and other modes of operation are possible.

Exemplary Solar Receiver Configurations

Figure 6:
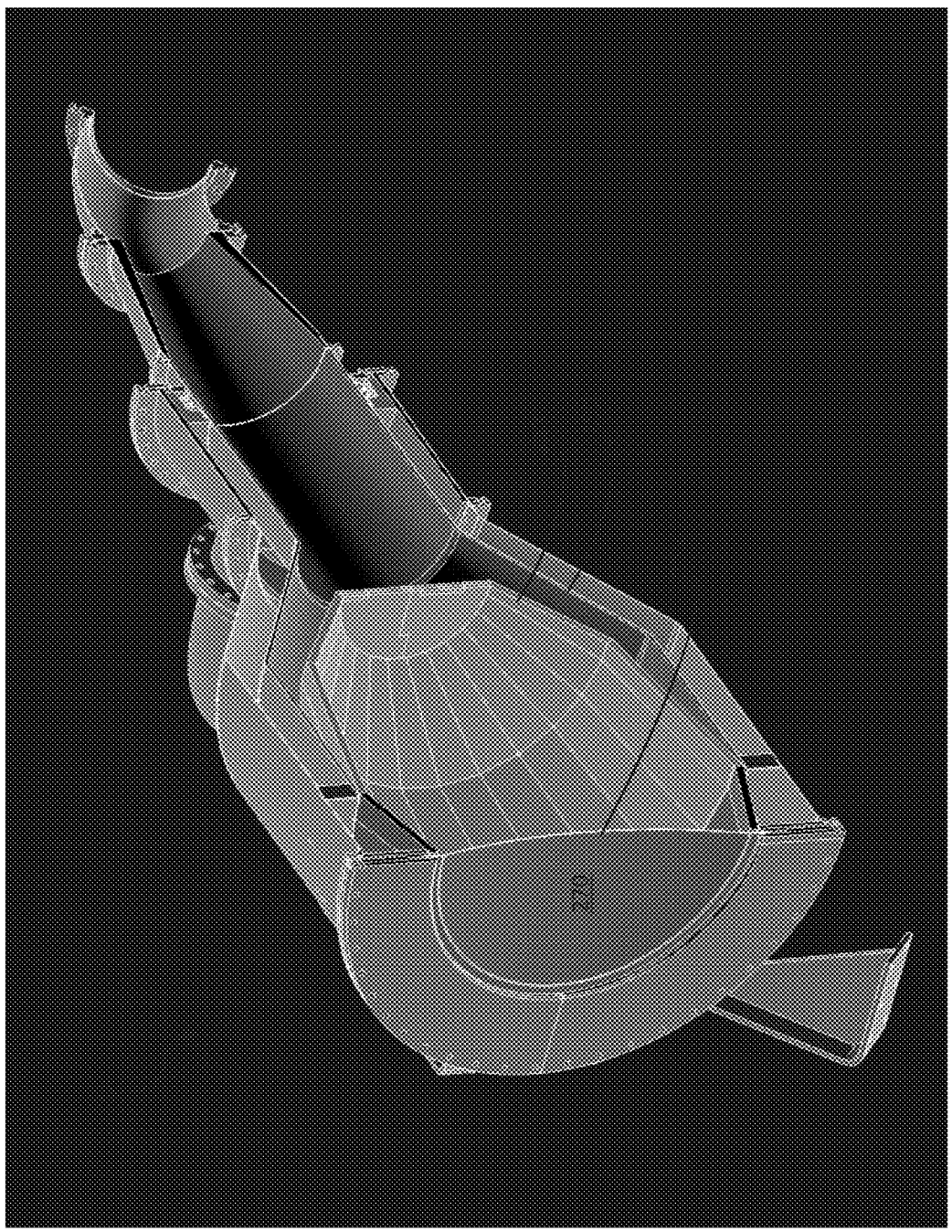
FIG. 6 shows, in accordance with certain embodiments, a schematic diagram of a solar receiver.

An exemplary solar receiver 14 is shown in FIG. 6, which can be designed and constructed to be used in conjunction with one or more of the systems described herein. Exemplary solar receivers may comprise low-pressure fluid chamber 250 that is designed and constructed to provide an insulated casing, which acts to reduce or eliminate thermal losses from the solar receiver and to contain a low-pressure working fluid. The low-pressure solar receiver comprises transparent object 260 positioned at the front of low-pressure fluid chamber 250 adjacent to opening 270 for receiving solar radiation.

Low-pressure fluid chamber 250 comprises solar absorber 280. Typically, solar absorber 280 is constructed of a material that can withstand relatively high temperatures (e.g., temperatures as described above, such as in excess of 1000° C., and, in some embodiments, at least 1500-2000° C.) and that has sufficient thermal properties (e.g., thermal conductivity, emissivity) to absorb thermal energy from incident solar radiation and transfer thermal energy to a working fluid passing through the solar receiver. In some cases, solar absorber 280 is constructed of a material such as a metal, (e.g., high-temperature alloy, heat resistant cast alloy), a refractory material (e.g., a ceramic) or a carbon-based material. Solar absorber 280 may be constructed of a ceramic material such as a glass ceramic, silicon carbide, silicon nitride, alumina, or silicon oxide.

Solar absorber 280 may have a high surface area to facilitate the transfer of thermal energy to a working fluid passing within the solar receiver. Solar absorber 280, in some embodiments, is designed and constructed to have a network (e.g., a honeycomb network, a shell and tube network, a foam network, etc.) of fluid passages through which the working fluid passes. Solar absorber 280 may be immobilized within the low-pressure fluid chamber 250 such that a relatively low temperature working fluid traveling within the low-pressure fluid chamber 250 is directed over and/or through the solar absorber 280, e.g., passing through a network of fluid passages of the solar absorber, so that the working fluid acquires heat from the solar absorber increasing its temperature.

According to certain embodiments, the solar absorber may have any of a variety of shapes, including, for example, an angular shape a planar shape, an elliptical shape, a parabolic shape, a disc shape, a polyhedron shape or other suitable shape.

The solar absorber is typically constructed of a material that can withstand relatively high temperatures, that can absorb incident radiation and that can readily transfer thermal energy to a working fluid that is in contact with the absorber. For example, solar absorbers may be constructed of metals, stainless steels, ceramics, heat-resistant cast alloys, high temperature metallic materials, refractory materials, thoria-dispersed alloys, graphite, or carbon-fiber-reinforced carbon-based materials. Appropriate ceramics for solar absorbers include, for example, glass ceramics, silicon carbide, silicon nitride, alumina, and silicon oxide. The solar absorber may have any of a variety of forms. As mentioned, the solar absorber may be designed and constructed to have a relatively high surface area for contact with a working fluid. Such solar absorber may comprise a plurality of channels or passages through which a working fluid can pass. The absorber may be in the form of a wire mesh, honeycomb or open cell foam configuration, for example. The solar absorber may include a black surface coating covering at least a portion of the absorber surface to facilitate absorption of incident solar radiation. In some solar receivers, the solar absorber can be a combination of both a wire mesh absorber and a ceramic absorber. In such embodiments, the wire mesh absorber can be an air inlet absorber and the ceramic absorber can be an air exit absorber. In other embodiments, the ceramic absorber can be an air inlet absorber and the wire mesh absorber can be an air exit absorber.

In some embodiments of the solar receivers, multiple segments of a solar absorber are held in position by a ceramic support structure system. In some solar receivers, flow-regulation structures are placed on the air inlet and/or outlet/exit side of the absorber. In some embodiments, a flow-regulation structure comprising an orifice plate having one or more orifices through which air may pass is included. In solar receivers, flow-regulation structures are incorporated that are made of ceramic, metal or other suitable material in which small holes are present for the passage of air. In some embodiments, such flow-regulation structure is configured to produce a relatively laminar air flow. In some embodiments, the flow-regulation structure is configured to direct air flow in a relatively uniform manner across an absorber.

The transparent object(s) acting as the window(s) of the solar receiver is/are typically positioned at the front of the low-pressure fluid chamber adjacent to the opening for receiving solar radiation. The outer rim of the transparent object may be fitted within a recess of the low-pressure fluid chamber to secure it. The transparent object(s) and the low-pressure chamber may be constructed of materials having different coefficients of thermal expansion. For example, the transparent object may be constructed of a glass material (e.g., silica, quartz, etc.), whereas the low-pressure chamber may be constructed of a metal (e.g., stainless steel, aluminum). When the transparent object and low-pressure chamber are subjected to thermal fluctuations, differential thermal expansion and contraction of the two components may occur. Thus, the connection between the transparent object(s) and the low-pressure fluid chamber can advantageously be designed and constructed to accommodate differential movement between the two components.

In some embodiments, a flexible seal is provided between an interface on the low-pressure fluid chamber and the transparent object(s). The interface may be positioned and secured within a recess within which the transparent object(s) is/are positioned and/or secured. Such recess may have an internal diameter that exceeds the outside diameter of the transparent object(s), thereby allowing expansion of the transparent object(s) within the recess. The seal is often subjected to relatively high temperatures (e.g., temperatures in excess of 500-1000° C. or more), and thus, is should be produced from a material that can withstand contemplated operating temperatures. The seal may be produced, in some embodiments, from a metal, a carbon-based material, or a silicone-based material. In some embodiments, the seal is produced from a room-temperature vulcanizing (RTV) silicone elastomer. In some embodiments, the seal is a metallic gasket. Other appropriate seal materials will be apparent to the skilled artisan.

The low-pressure fluid chamber of a solar receiver, in certain embodiments, is designed and constructed to withstand a working pressure of at least up to and including 2 atmospheres. The low-pressure fluid chamber, in certain embodiments, is designed and constructed to sustain a maximum allowable working pressure of 1 atmosphere, 1.1 atmospheres, 1.2 atmospheres, 1.3 atmospheres, 1.4 atmospheres, 1.5 atmospheres, or 2 atmospheres. As used herein, the term "maximum allowable working pressure" refers to the maximum pressure a pressure vessel can maintain (e.g., the maximum pressure that the weakest component of an assembled solar receiver can maintain). Often the maximum allowable working pressure is determined by conducting a hydrostatic pressure test. Methods for conducting a hydrostatic pressure test are well known in the art and will be apparent to the skilled artisan. In one embodiment, the maximum allowable working pressure of a solar receiver is determined by essentially completely assembling the solar receiver, capping off the fluid inlet(s) and the fluid outlet(s), and pressurizing the low-pressure chamber of the solar receiver with an inert gas (e.g., air). The low-pressure chamber is pressurized, in this embodiment, with the inert gas at a relatively slow rate (e.g., at a rate in a range of 1 psi/second to 5 psi/second) until the low-pressure chamber can no longer maintain pressure. The highest pressure maintained during the test is the maximum allowable working pressure of the solar receiver. In certain embodiments, the weakest component of the solar receiver is the seal between the transparent object and the low-pressure chamber.

The transparent object(s) may have a variety of shapes. For example, the transparent object may have a planar shape, such as a planar disc or a planar object having a polygonal cross-section such as a rectangular or square cross-section. The transparent object may have a relatively slight curvature inward toward the solar absorber. The transparent object may have a semi-circular shape, a parabolic shape, an elliptical shape, etc. In some embodiments, a curvature inward toward the solar absorber serves to minimize tensile stress due to thermal expansion in the transparent object. Thus, in certain embodiments, the transparent object has a certain radius of curvature. The transparent object may, for example, have a radius of curvature of 0.1 meters foot to 15 meters, 0.1 meters to 3 meters, 0.1 meters foot to 1.5 meters, or 0.1 meters to 1 meter. The transparent object may have a radius of curvature of up to 0.1 meters, 0.5 meters, 1 meter, 1.5 meters, 2 meters, 5 meters, 7 meters, 10 meters, 15 meters, or more.

Solar receivers that are useful or potentially useful in the context of the disclosed systems and methods may be designed to operate at low-pressure (e.g., up to and including 2 atmospheres). Because the transparent object(s) is/are subjected to relatively small hydrostatic stresses under such low-pressure operation, it/they may be constructed to have a relatively large geometric area/diameter and relatively small thickness. In some embodiments, the transparent object has a diameter in a range 0.5 meter to 5 meters, 2 meters to 4 meters or 0.5 meter to 2 meters. In some embodiments, the transparent object has a diameter of 0.5 meters, 1 meter, 1.2 meters, 1.4 meters, 1.6 meters, 1.8 meters, 2 meters, 3 meters, 4 meters, 5 meters or more. In some embodiments, the diameter of a transparent object (e.g., a transparent object that has a certain radius of curvature) is the diameter of the rim of the transparent object (e.g., the edge of the transparent object that fits with a recess of the low-pressure chamber).

The thickness of the transparent object may influence the extent to which the transparent object absorbs solar radiation, with relatively thick transparent objects typically absorbing more solar radiation than relatively thin transparent objects. Consequently, the thickness of the transparent object influences the extent to which the transparent object is subjected to thermal stress during operation of the solar receiver. Accordingly, the transparent object may have a relatively small thickness, in order to minimize thermal stress. In some embodiments, the thickness of the transparent object is in a range of 0.5 centimeters to 10 centimeters, 1 centimeter inch to 5 centimeters, or 1 centimeter inch to 3 centimeters. In some embodiments, the thickness of the transparent object is 0.5 centimeters, 1 centimeter, 3 centimeters, 4 centimeters, 5 centimeters, 7 centimeters, 10 centimeters or more. However, the invention is not limited to transparent objects having these thicknesses. Other thicknesses may be suitable in some cases.

In some embodiments, the solar receiver includes a transparent object (which may be or be part of a window) that is composed quartz silica glass. The transparent object may have a curved shaped to contain and distribute internal pressure, and to tolerate thermal stresses from differential temperature exposure. The curved shape of the transparent object also can limit the formation of destructively high tensile stresses. The transparent object may be designed to accommodate implementations that give rise to relatively high temperatures at its center portion and relatively cooler temperatures at portions in proximity its edges. Thus, the transparent object may function in some implementations as a thermal hinge to accommodate thermal growth without developing destructively high tensile stresses. A curved (or bowl shape) of the transparent object can facilitate, and to an extent direct, flow of a relatively low temperature fluid toward and through the solar absorber. The relatively low temperature fluid may also function to cool the transparent object as it passes over the internal surfaces of the transparent object.

In some embodiments the transparent object is constructed of one piece (e.g., a single solid quartz silica glass window). However, in other embodiments, the transparent object is constructed of several segments that are fitted together, joined together or butted together. In some embodiments, a transparent object having a diameter in a range of 2 meters to 4 meters, or more, is constructed of multiple segments (e.g., 2, 3, 4 or more segments).

Figure 7B:
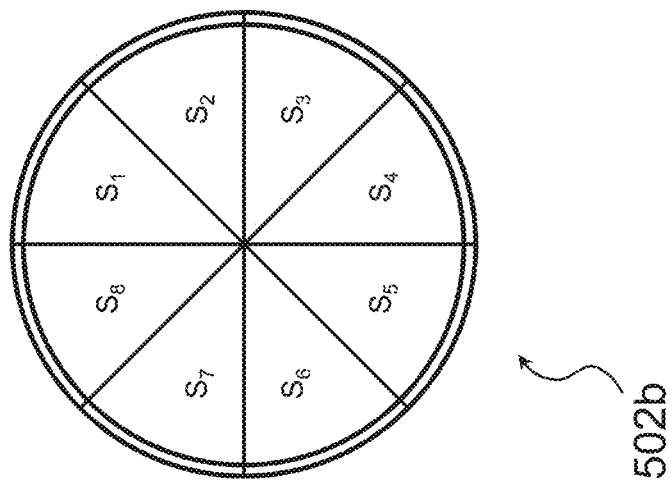
FIG. 7A-7B show, in accordance with certain embodiments, a schematic diagram of a plurality of transparent objects that can form a segmented window of a solar receiver of some embodiments.
Figure 7A:
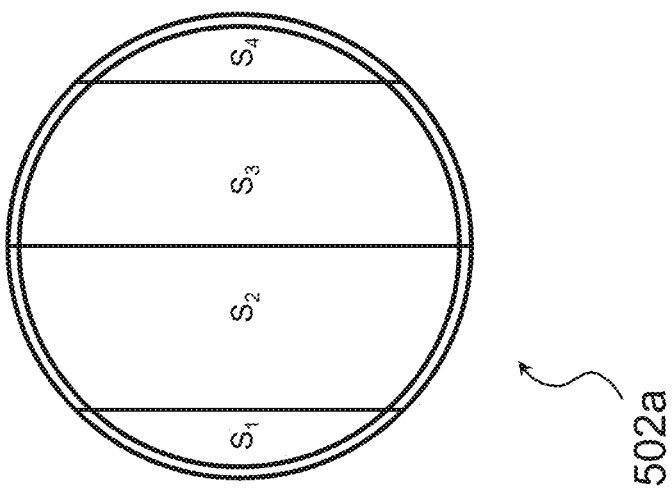

FIGS. 7A and 7B illustrate examples of pluralities of transparent objects arranged to produce segmented windows for a receiver. The segmented window 502a in FIG. 7A is composed of four elongated longitudinally arranged transparent objects $S_1$-$S_4$. The segmented window 502b in FIG. 7B is composed of eight radially arranged transparent objects $S_1$-$S_8$. These illustrations are not intended to be limiting. Other appropriate arrangements and pluralities of transparent objects may be used to produce segment windows that permit the passage of solar radiation into the low-pressure fluid chamber. In some embodiments, the plurality of transparent objects are half tubes (e.g., tubes that have been cut length-wise) and are arranged side by side at the opening of the receiver. In some embodiments, the tubes are up to 0.1 meters or more in diameter. In some embodiments, the convex side of a tube faces the absorber, and the concave side faces heliostats that direct concentrated solar radiation toward the opening of the receiver. In other embodiments, the concave side of a tube faces the absorber, and the convex side faces the heliostats. In some embodiments, the tubes are made of quartz silica.

In some embodiments, the solar receiver is configured such that concentrated solar radiation received through the opening in the solar receiver passes through the plurality of transparent objects into the low-pressure fluid chamber and impinges upon the solar absorber. In some embodiments, the low-pressure fluid chamber defines a fluid flow path from the fluid inlet to the fluid outlet, in which, between the fluid inlet and the fluid outlet, the fluid flow path extends across at least a portion of the plurality transparent objects and through one or more passages within the solar absorber. In some embodiments, the plurality of transparent objects is configured such that when the pressure within the low-pressure fluid chamber is lower than the environmental pressure surrounding the solar receiver, a fluid (e.g., ambient air) surrounding the solar receiver is drawn into the low-pressure fluid chamber through gaps between transparent objects of the plurality. In some embodiments, the low-pressure fluid chamber is configured such that the fluid (e.g., ambient air) that is drawn into the low-pressure fluid chamber through gaps between transparent objects of the plurality enters the fluid flow path within the low-pressure fluid chamber and passes through the solar absorber. In some embodiments, as the fluid (e.g., ambient air) is drawn into the low-pressure fluid chamber through gaps between transparent objects of the plurality it cools the transparent objects.

In some embodiments, the low-pressure solar receivers are fitted with a secondary concentrator. In certain embodiments, the secondary concentrators described herein are also described and shown in FIGS. 8A-8C in International Patent Application Serial No. PCT/US2013/031627, filed Mar. 21, 2012, and entitled "Multi-Thermal Storage Unit Systems, Fluid Flow Control Devices, and Low Pressure Solar Receivers for Solar Power Systems and Related Components and Uses Thereof", which is incorporated herein by reference in its entirety. The secondary concentrator serves to collect concentrated solar radiation from a primary concentrator (e.g., a heliostat field) or other source, and direct that solar radiation into the opening of the solar receiver. The secondary concentrator, in some embodiments, improves the solar collection efficiency of the solar receiver. The second concentrator is often constructed with a plurality of reflective panels, each reflective panel typically having a reflective surface and a predetermined shape. The plurality of reflective panels is typically arranged in a configuration that facilitates reflection of incident solar radiation toward the receiver opening. In some embodiments, the plurality of reflective panels is arranged such that the secondary concentrator has an overall parabolic shape, although other shapes may be suitable. For example, the secondary concentrator may have an elliptical shape, a semi-circular shape, a hyperbolic shape, etc.

A cross-section of the secondary concentrator that is parallel with the opening of the receiver may also have a variety of shapes. For example, the cross-section of the secondary concentrator that is parallel with the opening of the receiver may have a circular shape, an elliptical shape, a polygonal shape, a rectangular shape, etc.

The size and shape of the secondary concentrator (e.g., the diameter of the outer most portion of the secondary concentrator, the depth of the secondary concentrator, etc.) may vary depending on a variety of factors, including, for example, the desired collection efficiency, the size and arrangement of the primary concentrator(s), the size of the opening of the receiver, the thermal properties of the solar absorber, etc. In some embodiments, the ratio of the depth of the secondary concentrator to the diameter of the opening of the receiver is 1, 1.25, 1.5, 2, 2.5, 3, 4, 5, or more. In some embodiments, the ratio of the depth of the secondary concentrator to the diameter of the opening of the receiver is in a range of 1 to 1.5, 1 to 2.5, 1 to 3, 1 to 4, or 1 to 5. In some embodiments, the ratio of the outer most diameter of the secondary concentrator to the diameter of the opening of the receiver is 1.5, 2, 2.5, 3, 3.5, 4, 4.5, 5.5, 6 or more. In some embodiments, the ratio of the depth of the secondary concentrator to the diameter of the opening of the receiver is in a range of 1.5 to 2, 1.5 to 3, 1.5 to 4, 1.5 to 5, or 1.5 to 6.

The following patents and patent applications are incorporated herein by reference in their entirety for all purposes: U.S. Patent Publication No. 2002/0124991, published on Sep. 12, 2002, filed Feb. 1, 2002, entitled "Low Cost High Efficiency Automotive Turbines"; U.S. Pat. No. 6,681,557, issued on Jan. 27, 2004, filed Feb. 1, 2002, entitled "Low Cost High Efficiency Automotive Turbines"; U.S. Pat. No. 5,259,444, issued on Nov. 9, 1993, filed Nov. 5, 1990, entitled "Heat Exchanger Containing a Component Capable of Discontinuous Movement"; U.S. Pat. No. RE37134, issued on Apr. 17, 2001, filed Mar. 25, 1995, entitled "Heat Exchanger Containing a Component Capable of Discontinuous Movement"; U.S. Publication No. 2007/0089283, published on Apr. 26, 2007, filed Oct. 17, 2006, entitled "Intermittent Sealing Device and Method"; U.S. Publication No. 2008/0251234, published on Oct. 16, 2008, filed Apr. 16, 2007, entitled" Regenerator Wheel Apparatus"; U.S. Publication No. 2009/0000761, published on Jan. 1, 2009, filed Jun. 29, 2007, entitled "Regenerative Heat Exchanger with Energy-Storing Drive System"; U.S. Publication No. 2009/0000762, published on Jan. 1, 2009, filed Jun. 29, 2007, entitled "Brush-Seal and Matrix for Regenerative Heat Exchanger and Method of Adjusting Same"; U.S. Publication No. 2006/0054301, published on Mar. 16, 2006, filed Dec. 16, 2004, entitled "Variable Area Mass or Area and Mass Species Transfer Device and Method"; International Patent Application Serial No. PCT/US2011/052051, filed Sep. 16, 2011, and entitled, "Concentrated Solar Power Generation Using Solar Receivers"; and International Patent Application Serial No. PCT/US2013/031627, filed Mar. 21, 2012, and entitled "Multi-Thermal Storage Unit Systems, Fluid Flow Control Devices, and Low Pressure Solar Receivers for Solar Power Systems and Related Components and Uses Thereof".

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A concentrated solar combination heating and power generation system, comprising:
a solar receiver comprising:
a fluid chamber comprising a fluid inlet, a fluid outlet, and an opening for receiving concentrated solar radiation;
a solar absorber housed within the fluid chamber; and
a transparent object that defines at least a portion of a wall of the fluid chamber;
wherein concentrated solar radiation received through the opening passes through the transparent object into the fluid chamber and impinges upon the solar absorber to produce a heated first fluid having a first pressure that is less than 2 atmospheres;
a thermal storage unit comprising a vessel containing a thermal storage medium therein, and having a fluid inlet in valved fluid communication with the fluid outlet of the fluid chamber of the solar receiver and a fluid outlet;
a power generation system comprising:
a heat exchange system comprising at least a first heat exchange unit, the heat exchange system positioned downstream of the solar receiver and the thermal storage unit and having an inlet in valved fluid communication with the fluid outlet of the fluid chamber of the solar receiver and in valved fluid communication with the fluid outlet of the thermal storage unit, such that the heat exchange system can receive the heated first fluid selectively from either or both of the fluid chamber of the solar receiver and the thermal storage unit,
the heat exchange system being configured to transfer heat from the heated first fluid to a second fluid to produce a heated second fluid having a second pressure, the second pressure being greater than the first pressure; and
a gas turbine in fluid communication with and downstream of an outlet of the heat exchange system, configured to receive the heated second fluid at a gas turbine inlet and generate power therefrom; and
a heated fluid diversion outlet conduit for diverting at least a portion of the heated first fluid away from flowing to the power generation system, the heated fluid diversion outlet conduit having an inlet in valved fluid communication with the fluid outlet of the fluid chamber of the solar receiver and with the thermal storage unit and positioned upstream of the inlet of the heat exchange system and the inlet of the thermal storage unit,
wherein the heated fluid diversion outlet conduit is configured and positioned to permit the heated first fluid flowing from the fluid outlet of the fluid chamber of the solar receiver to selectively be directed away from the concentrated solar combination heating and power generation system without flowing through the thermal storage unit and without flowing through the power generation system.

2. The concentrated solar combination heating and power generation system of claim 1, wherein the heated fluid diversion outlet conduit is further configured and positioned to permit the heated first fluid flowing from the fluid outlet of the fluid chamber of the solar receiver to be recycled to a make-up inlet conduit connected upstream of and in fluid communication with the fluid inlet of the fluid chamber of the solar receiver.

3. The concentrated solar combination heating and power generation system of claim 1, wherein the gas turbine further comprises a gas turbine exhaust outlet in valved fluid communication with the fluid inlet of the fluid chamber and with the thermal storage unit, such that a substantially uncompressed exhaust of the gas turbine having a pressure of less than 2 atmospheres can be selectively fed to either or both of the fluid chamber of the solar receiver and the thermal storage unit.

4. The concentrated solar combination heating and power generation system of claim 1, wherein the heat exchange system comprises a second heat exchange unit positioned in series with the first heat exchange unit.

5. The concentrated solar combination heating and power generation system of claim 1, wherein the power generation system further comprises an industrial processing unit positioned downstream of the heat exchange system and having an inlet in valved fluid communication with a second outlet of the heat exchange system, configured to receive the heated first fluid from the heat exchange system and generate power therefrom to operate the industrial processing unit.

6. The concentrated solar combination heating and power generation system of claim 5, wherein the industrial processing unit is a water purification system, a chemical separation system, a chemical reactor, and/or an industrial generator.

7. The concentrated solar combination heating and power generation system of claim 6, wherein the water purification system is a desalination system.

8. The concentrated solar combination heating and power generation system of claim 6, wherein the chemical separation system is a distillation system.

9. The concentrated solar combination heating and power generation system of claim 6, wherein the industrial generator is a steam generator.

10. The concentrated solar combination heating and power generation system of claim 1, wherein the first pressure is between 0.9 atmospheres and 1.1 atmospheres.

11. The concentrated solar combination heating and power generation system of claim 1, wherein the heated first fluid is air at ambient pressure.

12. A combination heating and power generation system, comprising:
an industrial source of a heated first fluid between greater than or equal to 200° C. and less than or equal to 2000° C. and at a first pressure of less than or equal to 2 atmospheres;
a thermal storage unit comprising a vessel containing a thermal storage medium therein, and having a fluid inlet in valved fluid communication with a fluid outlet of the industrial source of the heated first fluid and a fluid outlet;
a power generation system comprising:
a heat exchange system comprising at least a first heat exchange unit, the heat exchange system positioned downstream of the industrial source of the heated first fluid and the thermal storage unit and having an inlet in valved fluid communication with the fluid outlet of the industrial source of the heated first fluid and in valved fluid communication with the fluid outlet of the thermal storage unit, such that the heat exchange system can receive the heated first fluid selectively from either or both of the industrial source of the heated first fluid and the thermal storage unit, the heat exchange system being configured to transfer heat from the heated first fluid to a second fluid to produce a heated second fluid having a second pressure, the second pressure being greater than the first pressure; and a gas turbine in fluid communication with and downstream of an outlet of the heat exchange system, configured to receive the heated second fluid at a gas turbine inlet and generate power therefrom; and a heated fluid diversion outlet conduit for diverting at least a portion of the heated first fluid away from flowing to the power generation system, the heated fluid diversion outlet conduit having an inlet in valved fluid communication with the fluid outlet of the industrial source of the heated first fluid and with the thermal storage unit and positioned upstream of the inlet of the heat exchange system and the inlet of the thermal storage unit, wherein the heated fluid diversion outlet conduit is configured and positioned to permit the heated first fluid flowing from the fluid outlet of the industrial source of the heated first fluid to selectively be directed away from the combination heating and power generation system without flowing through the thermal storage unit and without flowing through the power generation system.

13. The combination heating and power generation system of claim 12, wherein the industrial source of the heated first fluid is an industrial hot air producing system.

14. The combination heating and power generation system of claim 12, wherein the industrial source of the heated first fluid is an industrial heat source supplying heat to a heat exchanger to produce the heated first fluid.

15. The combination heating and power generation system of claim 12, wherein the heated fluid diversion outlet conduit is further configured and positioned to permit the heated first fluid flowing from the fluid outlet of the industrial source of the heated first fluid to be recycled to an inlet of the combination heating and power generation system.

16. A method of selectively generating power or heat with a concentrated solar receiver, comprising:

flowing a fluid having a pressure less than 2 atmospheres through the concentrated solar receiver to produce a heated fluid; and selectively flowing the heated fluid from the solar receiver to each of:
- a power generating system comprising a heat exchanger configured to transfer heat from the heated fluid to a second pressurized fluid, which is fed to a gas turbine to generate power;
- a thermal storage unit configured to store heat derived from the heated fluid; and
- a heated fluid diversion outlet conduit positioned upstream of the power generating system and configured to: (i) divert at least a portion of the heated fluid away from flowing to the power generating system and the thermal storage unit; and (ii) provide heat for an industrial process, wherein the industrial process is free of any gas turbines and is not used for generating electrical power;

wherein each of the power generating system, the thermal storage unit, and the heated fluid diversion outlet conduit are fluidically connected to the solar receiver.

17. The method of claim 16, wherein prior to flowing the heated fluid to the heat exchange system, the heated fluid is flowed through a combustor to increase the temperature of the heated fluid.

18. The method of claim 16, wherein the fluid is air.

* * * * *